United States Patent
Collins

(10) Patent No.: US 11,294,552 B2
(45) Date of Patent: *Apr. 5, 2022

(54) SYSTEMS AND METHODS FOR GEOSPATIAL VALUE SUBJECT ANALYSIS AND MANAGEMENT

(71) Applicant: The Travelers Indemnity Company, Hartford, CT (US)

(72) Inventor: Dean M. Collins, Manchester, CT (US)

(73) Assignee: The Travelers Indemnity Company, Hartford, CT (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/879,912

(22) Filed: May 21, 2020

(65) Prior Publication Data
US 2020/0285374 A1 Sep. 10, 2020

Related U.S. Application Data

(63) Continuation of application No. 14/316,099, filed on Jun. 26, 2014, now Pat. No. 10,684,753, which is a
(Continued)

(51) Int. Cl.
*G06F 3/0484* (2013.01)
*G06F 16/532* (2019.01)
(Continued)

(52) U.S. Cl.
CPC .......... *G06F 3/04842* (2013.01); *G06F 16/29* (2019.01); *G06F 16/532* (2019.01); *G06Q 40/08* (2013.01)

(58) Field of Classification Search
CPC .. G06F 3/04845; G06F 16/9537; G06F 16/29; G06F 2221/2111; G06F 3/04842;
(Continued)

(56) References Cited

U.S. PATENT DOCUMENTS 5,978,769 A 11/1999 Brown et al.
7,143,051 B1 11/2006 Hanby et al.
(Continued)

FOREIGN PATENT DOCUMENTS

| WO | WO 199519597 | 7/1995 |
| WO | WO2011050248 | 4/2011 |
| WO | WO2011126448 | 10/2011 |

OTHER PUBLICATIONS

"Assessing and Managing Flood Risk in the 21st Century", White Paper, CoreLogic, Inc., 7 pp.
(Continued)

*Primary Examiner* — Yuk Ting Choi
(74) *Attorney, Agent, or Firm* — RowanTree Law Group, PLLC; Carson C. K. Fincham

(57) ABSTRACT

Location information may be gathered, managed, stored, and/or otherwise utilized to determine unique geo-referenced locations. The geo-referenced locations may be utilized to inform various processes and decisions such as insurance underwriting, risk assessment, pricing, and risk/loss control. Geo-referenced location information may also be utilized to allow for user-defined or customized value subject data gathering, analysis, and management.

16 Claims, 23 Drawing Sheets

Related U.S. Application Data continuation-in-part of application No. 13/836,429, filed on Mar. 15, 2013, now Pat. No. 9,953,369.

(60) Provisional application No. 61/616,629, filed on Mar. 28, 2012.

(51) Int. Cl.
  G06F 16/29 (2019.01)
  G06F 3/04842 (2022.01)
  G06Q 40/08 (2012.01)

(58) Field of Classification Search
  CPC ............. G06F 15/532; G06F 17/30241; G06F 17/30864; G06F 17/3087; G06F 16/532; G06T 19/20; G06T 2200/24; G06Q 40/88; G06Q 30/0205; G06Q 30/0256; G06Q 40/08
  See application file for complete search history.

(56) References Cited

U.S. PATENT DOCUMENTS

| | | | |
|---|---|---|---|
| 7,383,125 B2 | 6/2008 | De Silva et al. | |
| 7,627,491 B2 | 12/2009 | Feyen et al. | |
| 7,668,651 B2 | 2/2010 | Searight et al. | |
| 7,769,608 B1 | 8/2010 | Woll et al. | |
| 7,769,609 B1 | 8/2010 | Woll | |
| 7,949,548 B2 | 5/2011 | Mathai et al. | |
| 7,953,548 B2 | 5/2011 | Vengroff et al. | |
| 7,966,203 B1 | 6/2011 | Pietrzak | |
| 8,046,245 B1 | 10/2011 | Woll et al. | |
| 8,103,445 B2 * | 1/2012 | Smith ................. | G09B 29/007 701/425 |
| 8,229,768 B1 | 7/2012 | Hopkins, III | |
| 8,229,769 B1 | 7/2012 | Hopkins, III | |
| 8,386,280 B2 | 2/2013 | Mathai et al. | |
| 8,504,393 B2 | 8/2013 | Stewart et al. | |
| 8,624,911 B1 | 1/2014 | Miller | |
| 2002/0133289 A1 * | 9/2002 | Miyaki ................. | G01C 21/36 701/400 |
| 2004/0117358 A1 | 6/2004 | von Kaenel | |
| 2004/0186753 A1 | 9/2004 | Kim et al. | |
| 2006/0061566 A1 | 3/2006 | Verma et al. | |
| 2006/0100912 A1 | 5/2006 | Kumar et al. | |
| 2007/0273558 A1 | 11/2007 | Smith | |
| 2008/0248815 A1 | 10/2008 | Busch | |
| 2009/0005968 A1 | 1/2009 | Vengroff | |
| 2009/0092232 A1 | 4/2009 | Geldenbott et al. | |
| 2010/0063851 A1 | 3/2010 | Andrist et al. | |
| 2010/0094548 A1 * | 4/2010 | Tadman ................. | G06Q 50/16 701/533 |
| 2010/0121886 A1 | 5/2010 | Koshiba et al. | |
| 2010/0153140 A1 | 6/2010 | Helitzer et al. | |
| 2011/0040691 A1 | 2/2011 | Martinez | |
| 2011/0320319 A1 | 12/2011 | Streich | |
| 2012/0066005 A1 | 3/2012 | Stewart et al. | |
| 2012/0072247 A1 | 3/2012 | Rosauer et al. | |
| 2012/0142343 A1 * | 6/2012 | Wohld ................. | H04W 72/02 455/432.1 |
| 2012/0271659 A1 | 10/2012 | Zizzamia et al. | |
| 2013/0132127 A1 | 5/2013 | Mathai et al. | |
| 2013/0197807 A1 | 8/2013 | Du et al. | |
| 2013/0262152 A1 | 10/2013 | Collins et al. | |
| 2013/0262153 A1 | 10/2013 | Collins et al. | |
| 2013/0262530 A1 | 10/2013 | Collins et al. | |
| 2014/0304007 A1 | 10/2014 | Kimball et al. | |

OTHER PUBLICATIONS

International Search Report for PCT/US2013/034189 dated Jul. 9, 2013, 5 pp.
Written Opinion for PCT/US2013/034189 dated Jul. 9, 2013, 5 pp.
Office Action for U.S. Appl. No. 13/836,707 dated Dec. 5, 2013, 22 pp.
"Big Data Analytics: Location Intelligence Conference", Claraview, Washington, D.C., 7 pp.
"Amica Insurance Selects Weather Fusion's HailScope to Power Custom Mapping Applications for Claims Handling", PRWeb, downloaded from http://www.prweb.com/releases/2013/8/prweb11075752.htm, 2 pp.
Office Action for U.S. Appl. No. 13/836,707 dated Aug. 6, 2014, 25 pp.
Office Action for U.S. Appl. No. 13/857,981 dated Sep. 22, 2014, 24 pp.
International Preliminary Report on Patentability for PCT/US2013/034189 dated Oct. 1, 2014, 6 pp.
Office Action for U.S. Appl. No. 13/836,429 dated Apr. 20, 2015; 16 pps.
Final Office Action for U.S. Appl. No. 13/836,429 dated May 25, 2016; 13 pps.
Office Action for U.S. Appl. No. 13/836,429 dated Feb. 7, 2017; 15 pps.
Final Office Action for U.S. Appl. No. 13/836,429 dated Jul. 27, 2017; 14 pps.
Notice of Allowance for U.S. Appl. No. 13/836,429 dated Dec. 6, 2017; 2 pps.
Notice of Allowance for U.S. Appl. No. 13/836,429 dated Dec. 29, 2017; 2 pps.
Office Action for U.S. Appl. No. 13/836,604 dated Jun. 8, 2015; 15 pps.
Office Action for U.S. Appl. No. 14/316,099 dated Sep. 14, 2016; 12 pps.
Final Office Action for U.S. Appl. No. 14/316,099 dated Feb. 15, 2017; 20 pps.
Office Action for U.S. Appl. No. 14/316,099 dated Jan. 8, 2019; 18 pps.
Final Office Action for U.S. Appl. No. 14/316,099 dated Apr. 22, 2019; 23 pps.
Office Action for U.S. Appl. No. 14/316,099 dated Aug. 9, 2019; 24 pps.
Final Office Action for U.S. Appl. No. 14/316,099 dated Dec. 16, 2019; 15 pps.
Notice of Allowance for U.S. Appl. No. 14/316,099 dated Feb. 13, 2020; 7 pps.

* cited by examiner

| LOCATION ID 344a-1 | STRUCTURE ID 344a-2 | ADDRESS 344a-3 | CITY 344a-4 | STATE 344a-5 | ZIP 344a-6 | STRUCTURE POLYGON 344a-7 | PARCEL POLYGON 344a-8 | POINT 344a-9 | POINT CONFIDENCE 344a-10 |
|---|---|---|---|---|---|---|---|---|---|
| 7G1D188 | 1 | 123 MAIN STREET | ANYTOWN | VA | 00000 | 41.749207,-72.550711; 41.749311,-72.550751; 41.749523,-72.550601; 41.749088,-72.550501; 41.749207,-72.550711 | | 41.749207,-72.550701 | 8 |
| 892E6D | 2 | 7 OAK STREET | MAYBERRY | TN | 12345 | | 35.749207,-72.550711; 41.749311,-72.550751; 41.749523,-72.550601; 41.749088,-72.550501; 41.749207,-72.550711 | | N/A |
| JHD66D | 3 | 44 SOUTH 8TH STREET | BIG CITY | RI | 99999 | 41.749207,-72.550711; 41.749311,-72.550751; 41.749523,-72.550601; 41.749088,-72.550501; 41.749207,-72.550711 | 41.749207,-72.550711; 41.749311,-72.550751; 41.749523,-72.550601; 41.749088,-72.550501; 41.749207,-72.550711 | | N/A |

| | | THE CANDIDATE BUILDING IS ACTUALLY... 342 | SAME ADDRESS: | DIFFERENT ADDRESSES: |
|---|---|---|---|---|
| CANDIDATE BUILDING NAME IS... | SAME AS IN DATABASE: | THE SAME BUILDING | MOST COMMON | COMMON |
| | | A DIFFERENT BUILDING | LESS COMMON | LESS COMMON |
| | DIFFERENT THAN IN DATABASE: | THE SAME BUILDING | COMMON | LEAST COMMON |
| | | A DIFFERENT BUILDING | COMMON | MOST COMMON |

*FIG. 3D*

SYSTEMS AND METHODS FOR GEOSPATIAL VALUE SUBJECT ANALYSIS AND MANAGEMENT

CROSS-REFERENCE TO RELATED APPLICATIONS

The present application claims benefit and priority to, and is a Continuation of U.S. patent application Ser. No. 14/316,099 filed on Jun. 26, 2014 and titled "SYSTEMS AND METHODS FOR GEOSPATIAL VALUE SUBJECT ANALYSIS AND MANAGEMENT", and issued as U.S. Pat. No. 10,684,753 on Jun. 16, 2020, which itself claims benefit and priority to and is a Continuation-In-Part (CIP) of U.S. patent application Ser. No. 13/836,429 filed on Mar. 15, 2013 and titled "SYSTEMS AND METHODS FOR CERTIFIED LOCATION DATA COLLECTION, MANAGEMENT, AND UTILIZATION", which issued as U.S. Pat. No. 9,953,369 on Apr. 24, 2018 and which itself claims benefit and priority to U.S. Provisional Patent Application No. 61/616,629 filed on Mar. 28, 2012 and titled "SYSTEMS AND METHODS FOR CERTIFIED LOCATION DATA COLLECTION, MANAGEMENT, AND UTILIZATION", the entirety of each such application hereby being incorporated by reference herein.

BACKGROUND

Location data, such as address data associated with a customer, is often imprecise, incomplete, provided in non-standardized formats, and/or overlaps or conflicts with other location information. Such deficiencies in location information cause various location-based attributes to remain hidden, which may for example, hinder the effectiveness of various business decisions. Insurance and/or other underwriting or risk-based product quotations or sales may, for example, be adversely affected by utilization of currently-available address or location data. Business decisions based on location information also typically suffer from decreased accuracy, reliability, and/or usability in standard systems.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 3A is a block diagram of an example data storage structure of a system according to some embodiments;

FIG. 3D is a block diagram of an example rule set of a system according to some embodiments;

DETAILED DESCRIPTION

Figure 1:
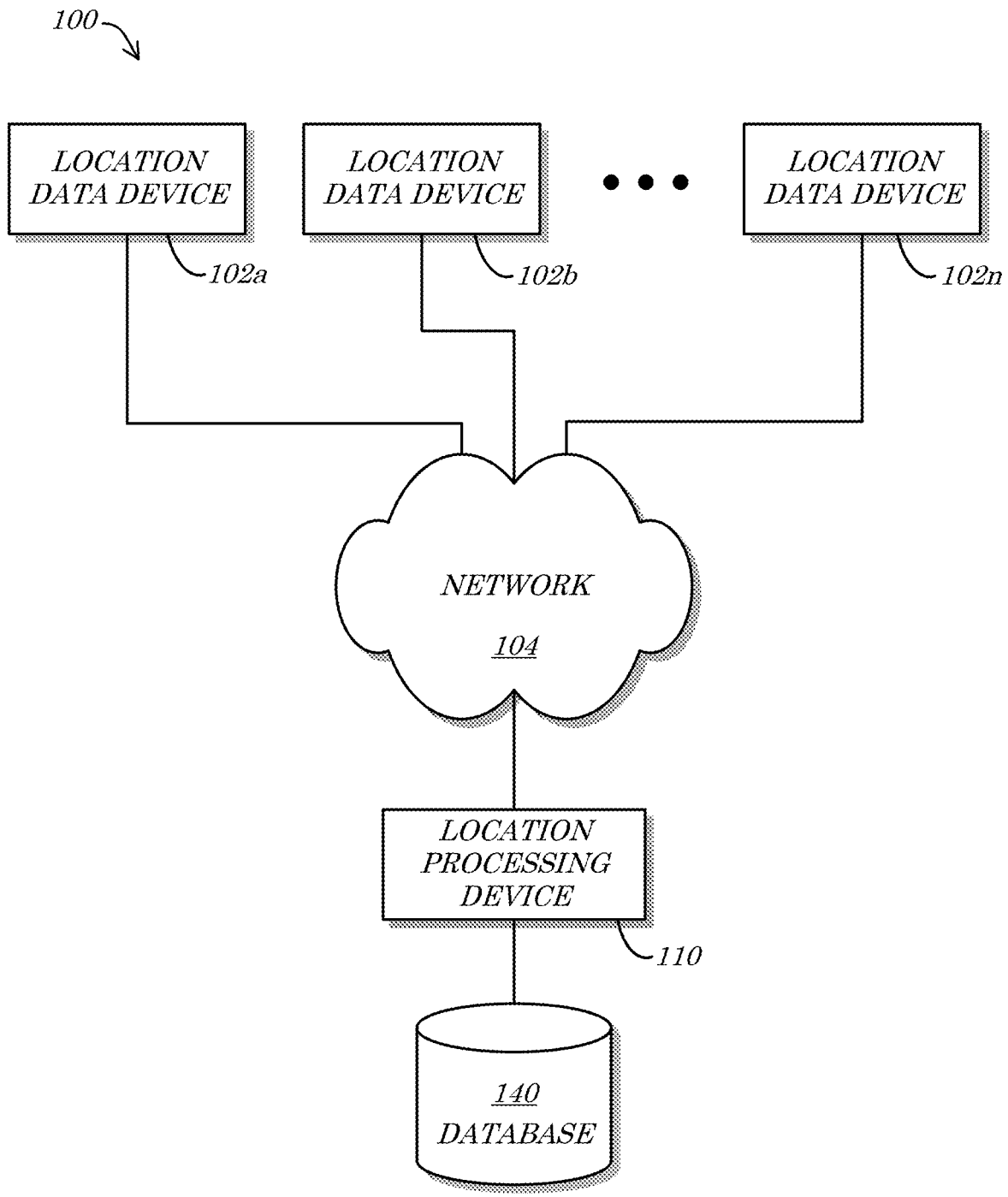
FIG. 1 is a block diagram of a system according to some embodiments.

Embodiments described herein are descriptive of systems, apparatus, methods, and articles of manufacture for geospatial value subject analysis and management as well as certified location data collection, management, and utilization. In some embodiments, for example, location data may be collected, retrieved, aggregated, sorted, filtered, standardized, and/or otherwise processed to define relationships between various location data elements or types. According to some embodiments, location data may be stored, processed, and/or presented in a manner that facilitates enhanced value subject definition and/or analysis. Users of location data provided in accordance with embodiments herein, for example, may be provided with a specially-programmed interface that permits free-form value subject definition and/or access to desired value subject data in the absence of provided address information (e.g., utilizing a Graphical User Interface (GUI)-based value subject selection tool).

As utilized herein, the term "value subject" generally refers to a physical area and/or object that is defined and analyzed with respect to risk. Value objects may comprise, for example (but are not limited to), parcels of land, buildings, other structures (e.g., cellular telephone transmission towers, water tanks/towers, and/or smoke stacks), road segments, travel routes, etc. According to some embodiments, a value subject may comprise a set, group, and/or collection of items, locations, and/or objects that are insured based on an assumption that such items, locations, and/or objects are likely subject to the same peril, likelihood of peril, and/or magnitude of peril. According to some embodiments, a value subject may comprise a series or group of points, lines, or polygons, such as in association with or defining particular road or surface segments, such as those described in co-pending U.S. patent application Ser. No. 13/723,685 filed on Dec. 21, 2012 and titled "SYSTEMS AND METHODS FOR SURFACE SEGMENT DATA", the surface segment concepts and descriptions of which are hereby incorporated by reference herein. According to some embodiments, a value subject may comprise a series or group of points, lines, or polygons, such as in association with or defining particular risk zones, such as those described in U.S. Pat. No. 8,682,699 issued on Mar. 25, 2014 and titled "SYSTEMS AND METHODS FOR CUSTOMER-RELATED RISK ZONES", the risk zone concepts and descriptions of which are hereby incorporated by reference herein. In some embodiments, a particular and/or unique value subject may be identified and/or defined by one or more certified locations.

As utilized herein, the term "certified location" generally refers to a location that is uniquely identifiable. In some embodiments, for example, a certified location comprises a specific geo-referenced point or set of points defining a discrete area and/or object (e.g., a uniquely identifiable place on the earth). According to some embodiments, the level of granularity of data descriptive of a certified location may change over time. A single building on a parcel of land may comprise a certified location when owned and/or operated by a single entity, for example, but in the case that the building is sub-divided and/or becomes associated with more than the single entity (e.g., acquires multiple tenants), more detailed data may be stored distinguishing the different portions of the building (e.g., uniquely). In some embodiments, a certified location comprises a point and/or polygon representing a unique location and identified by a unique identifier (e.g., a certified location certificate number).

In accordance with some embodiments herein, uniqueness and/or granularity of certified location data may be dependent upon an existing data set. In the case of a database of customer data, for example, a street address may be unique within the dataset, but may not be unique with respect to geo-spatial, geo-political, civil, municipal, and/or other considerations and/or data sets. More than one person or business may occupy the street address, for example, but only one of such individuals may be a customer for which data is currently stored. In such embodiments, the street address may comprise a certified location until more detailed data and/or granularity is required to distinguish the information descriptive of the location of the customer from information descriptive of a location of another (e.g., new and/or prospective) customer.

As utilized herein, the term "customer" may generally refer to any type, quantity, and or manner of entity with or for which location, underwriting product and/or policy, and/or underwriting product risk and/or premium information may be determined in accordance with embodiments described herein. A customer may comprise an individual, personal, and/or business insurance policy holder, for example, and/or may comprise an individual, family, business, and/or other entity that seeks to price and/or obtain an insurance and/or other underwriting product and/or policy as described herein. A customer may have an existing business relationship with other entities described herein, such as an insurance company for example, or may not yet have such a relationship—i.e., a "customer" may comprise a "potential customer" (e.g., in general and/or with respect to a specific product offering).

As utilized herein, the term "polygon" may generally refer to any type, quantity, representation, and/or configuration of an area and/or volume that is or becomes known or practicable. According to some embodiments, a polygon may identify and/or define a particular value subject. In some embodiments, polygons may comprise regular polygons, irregular polygons, and/or any other two or three-dimensional shape and/or orientation that is or becomes known or practicable—e.g., circles, ellipses, cones, pyramids, cylinders, and/or combinations of various shapes. A land parcel, which is representative of one type of polygon/area for example, may be defined in accordance with some embodiments by one or more geospatial points and/or coordinates. In some embodiments, a polygon may be identified by a representative (e.g., best available) point and/or coordinate. According to some embodiments, a polygon may be identified by a plurality of points and/or coordinates such as may be representative of (and/or define) one or more vertices, midpoints, endpoints, intersections, and/or other geometric features of a polygon. Polygons may comprise a variety of shapes and may be defined by various entities. Polygons (and/or value subjects) may be defined as (or by) tax parcels and corresponding geospatial survey points, for example, or may be manually drawn on a map by an insurance underwriter, analyst, agent, data customer, other user, etc. (e.g., to define a polygon as an area of interest to the insurance business, which may or may not correspond in whole or in part to one or more tax or zoning parcel boundaries). In some embodiments, a polygon may define a certified location representing an area and/or object for which an insurance and/or underwriting product is written (e.g., a value subject such as a particular building, land parcel, apartment, and/or structure—e.g., a cell tower). According to some embodiments, a polygon may define a certified location representative of an area and/or object associated with (but different from) an area and/or object for which an insurance and/or underwriting product is written (e.g., a property and/or structure adjacent to an insured property and/or value subject).

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, LAN, WAN, Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

In cases where video signals or large files are being sent over the network, a broadband network may be used to alleviate delays associated with the transfer of such large files, however, such an arrangement is not required. Each of the devices may be adapted to communicate on such a communication means. Any number and type of machines may be in communication via the network. Where the network is the Internet, communications over the Internet may be through a website maintained by a computer on a remote server or over an online data network, including commercial online service providers, and/or bulletin board systems. In yet other embodiments, the devices may communicate with one another over RF, cable TV, and/or satellite links. Where appropriate, encryption or other security measures, such as logins and passwords, may be provided to protect proprietary or confidential information.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

As used herein, "determining" includes calculating, computing, deriving, looking up (e.g., in a table, database, or data structure), ascertaining, and/or recognizing.

A "processor" means any one or more microprocessors, Central Processing Unit (CPU) devices, computing devices, microcontrollers, and/or digital signal processors. As utilized herein, the term "computerized processor" generally refers to any type or configuration of primarily non-organic processing device that is or becomes known. Such devices may include, but are not limited to, computers, Integrated Circuit (IC) devices, CPU devices, logic boards and/or chips, Printed Circuit Board (PCB) devices, electrical or optical circuits, switches, electronics, optics and/or electrical traces. A sub-class of computerized processors, as utilized herein, may comprise "mechanical processors" which may generally include, but are not limited to, mechanical gates, mechanical switches, cogs, wheels, gears, flywheels, cams, mechanical timing devices, etc.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an insurance company may, for example, comprise various specialized computers that interact to perform risk assessments, insurance premium calculations, insurance product sales, geospatial value subject analysis and/or management, and/or value subject data sales, as described herein.

Turning first to FIG. 1, a block diagram of a system 100 according to some embodiments is shown. In some embodiments, the system 100 may comprise a plurality of location data devices 102*a-n*. The location data devices 102*a-n* may collect and/or store data descriptive and/or indicative of a location of one or more objects or areas (such as value subjects). The location data devices 102*a-n* may, for example, comprise one or more sensors, databases, and/or third-party data and/or sensing devices configured and/or situated to determine location data. According to some embodiments, any or all of the location devices 102*a-n* may be in communication with a network 104. In some embodiments, the location data gathered and/or stored by one or more of the location data devices 102*a-n* can be queried, collected, sensed, looked-up, and/or otherwise obtained and/or determined by a location processing device 110 (e.g., via the network 104). The location processing device 110 may, for example, comprise one or more computers and/or servers in communication with the location data devices 102*a-n* (e.g., via the network 104). The location processing device 110 may, in some embodiments, utilize the location information from the location devices 102*a-n* to determine and/or define one or more certified locations (e.g., points and/or polygons), define and/or identify one or more value subjects, and/or provide (e.g., for sale) value subject and/or certified location data. In some embodiments for example, the location processing device 110 may offer the location information, certified location information, and/or value subject information for sale and/or subscription to various entities, for various purposes. In some embodiments, the location processing device 110 (and/or the location data devices 102*a-n*) may be in communication with a database 140. The database 140 may store, for example, location data obtained from the location data devices 102*a-n*, certified location data and/or value subject data defined by the location processing device 110, and/or instructions that cause various devices (e.g., the location processing device 110 and/or the location data devices 102*a-n*) to operate in accordance with embodiments described herein.

The location data devices 102*a-n*, in some embodiments, may comprise any type, configuration, and/or combination of sensor, computing, mobile electronic, location-sensing (e.g., Global Positioning System (GPS)), network, user, and/or communication devices that are or become known or practicable. The location data devices 102*a-n* may, for example, comprise one or more Personal Computer (PC) devices, computer workstations (e.g., underwriter workstations), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, a location data device 102a-n may comprise one or more of a digital or analog camera/video device (e.g., a Closed-Circuit TV (CCTV) camera, a webcam, satellite imaging device, aerial imaging device, robotic imaging device, and/or a Pan-Tilt-Zoom (PTZ)-enabled camera), an optical sensor, a laser sensor, a RADAR, LADAR, or SONAR sensor, a thermal sensor, an electrical current sensor, an electro and/or magnetic field sensor, a distance sensor, an acoustic sensor, any other type of sensor, and/or any combinations thereof. In some embodiments, the location data devices 102a-n may comprise tracking devices that are attached to/carried by people, e.g., cell phones or Personal Digital Assistant (PDA) devices (and/or location determining hardware and/or software thereof or associated therewith), or the like, Radio-Frequency Identification (RFID) tags, Bluetooth® devices, or other location tracking devices located on or within people or objects, or on or within clothing or items (e.g., jewelry, watches, etc.) attached to people or objects, and capable of monitoring, storing and/or transmitting their location.

The network 104 may, according to some embodiments, comprise a Local Area Network (LAN; wireless and/or wired), Wide Area Network (WAN; wireless and/or wired), cellular telephone network, Bluetooth® network, Near-Field Communication (NFC) network, and/or Radio Frequency (RF) network with communication links between the location data devices 102a-n, the location processing device 110, and/or the database 140. In some embodiments, the network 104 may comprise direct communications links between any or all of the components 102a-n, 110, 140 of the system 100. The location processing device 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A location data device 102a-n may, for example, be connected to the location processing device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the location data devices 102a-n and the location processing device 110, for example, and/or may comprise the Internet, with communication links between the location data devices 102a-n and the database 140, for example.

According to some embodiments, the location processing device 110 may comprise a device (or system) owned and/or operated by or on behalf of or for the benefit of an insurance company and/or data provider. The insurance company may utilize location information and/or certified location information, in some embodiments, to manage, analyze, design, rate, price, and/or otherwise structure insurance and/or other underwriting products, and/or define, facilitate, and/or influence other insurance and/or business processes. Certified location information may, for example, enhance the accuracy of insurance risk assessments and thus lead to more profitable and/or reliable insurance product offerings. In some embodiments, certified location information may be utilized to provide discounted premiums and/or other incentives or benefits to insurance customers. An insurance company may provide a discount to a customer willing to allow the insurer (or a third party benefiting the insurer) access to certified location information (and/or access to location information via which the certified location information may be determined). Discounts may be provided, for example, for various levels of increasing detail of location information that a customer is willing to provide to an insurance company. According to some embodiments, location and/or certified location information may be utilized to provide value subject identification and/or definition functionality to end-users. One or more of the location data devices 102a-n may be utilized by a user, for example, to access stored value subject data (e.g., stored in the database 140) via the location processing device 110 (e.g., for a fee).

In some embodiments, the database 140 may comprise any type, configuration, and/or quantity of data storage devices that are or become known or practicable. The database 140 may, for example, comprise an array of optical and/or solid-state hard drives configured to store location data provided by (and/or requested by) the location data devices 102a-n, certified location data (e.g., defined and/or determined by the location processing device 110), value subject data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the location data devices 102a-n may comprise the database 140 or a portion thereof, for example, and/or the location processing device 110 may comprise the database or a portion thereof.

In some embodiments, various user interfaces (not explicitly shown in FIG. 1; such as the interfaces 620, 920, 1520 of FIG. 6, FIG. 9, and/or FIG. 15 herein) may be utilized to enhance the ability to comprehend or utilize location data, value subject data, and/or certified location data (which may often represent complex geo-spatial relationships). An application for a mobile device (such as an Apple® iPhone® application, for example) may, in some embodiments, provide a visual indication of certified location data and/or value subject data gathered by (and/or from) the location data devices 102a-n and/or processed by the location processing device 110. According to some embodiments, certified location data and/or value subject data may be depicted visually on a map and/or as a layer on a map, such as may be provided, for example, by Google® Maps. Such visually-depicted data may comprise real-time, delayed, historical (e.g., historical aggregate, average, trend), predefined, and/or predicted data. In such a manner, for example, a customer of certified location and/or value subject data may utilize a mobile and/or other device to view a map (and/or other graphical depiction) of certified locations and/or value subjects and utilize the map to inform, facilitate, and/or conduct business decision-making processes (such as risk assessments and/or underwriting decisions). In some embodiments, the customer/user may utilize such a map and/or interface to define a value subject and/or define an area for which data (e.g., certified location data and/or value subject data) is desired. As described herein, such a definition may comprise an indication of one or more geospatial points, lines, and/or polygons (e.g., provided as input via the interface).

Figure 2A:
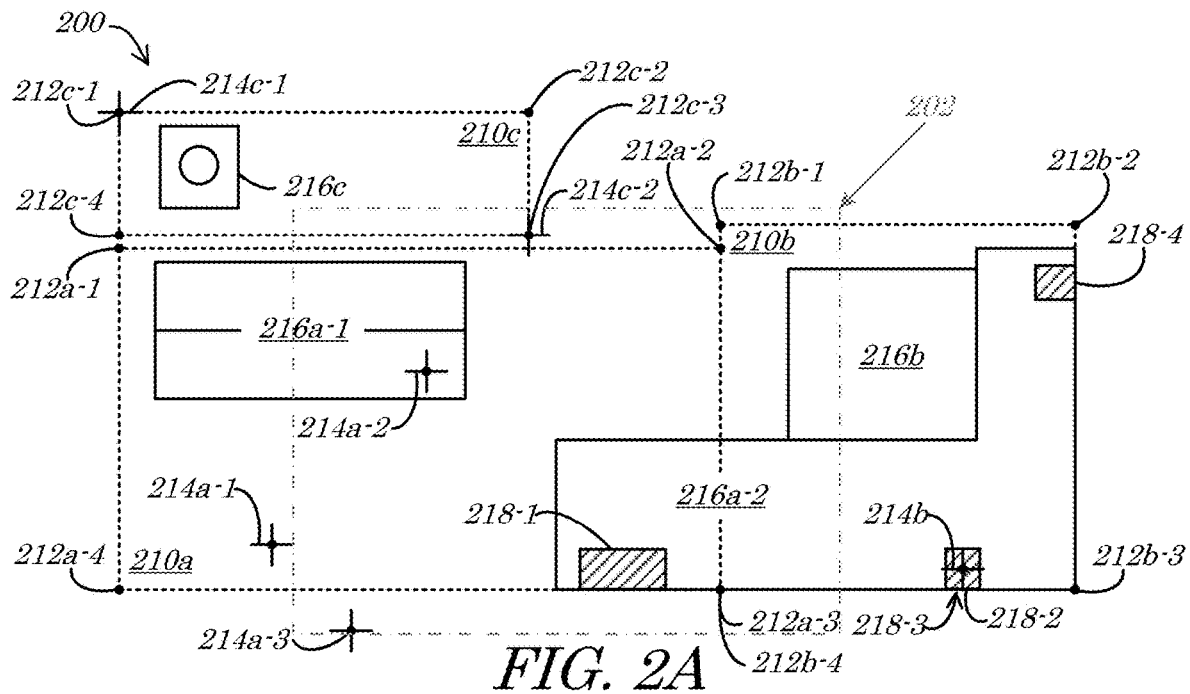
FIG. 2A is a top view of an example location according to some embodiments.
Figure 2B:
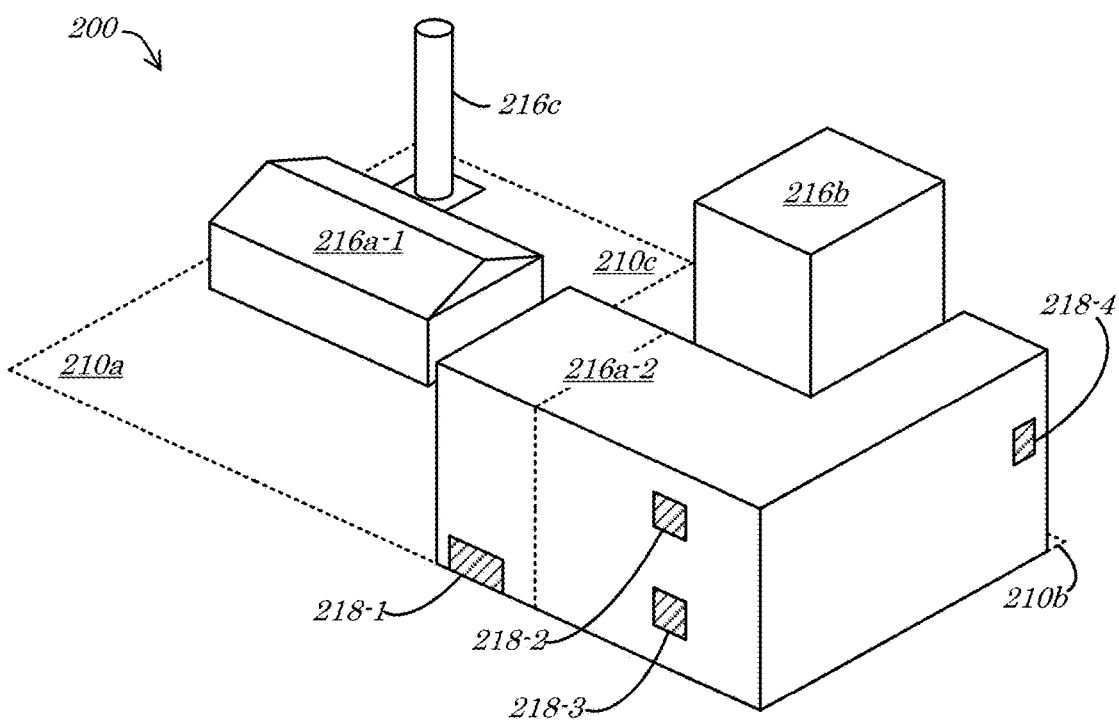
FIG. 2B is a perspective view of the example location of FIG. 2A, according to some embodiments.
Figure 2C:
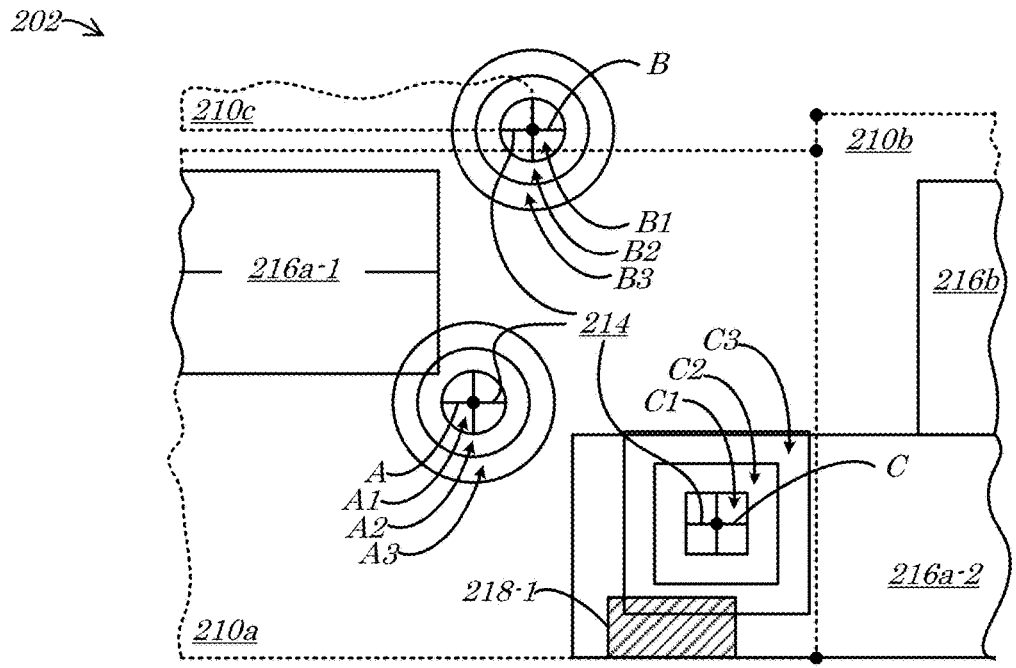
FIG. 2C is a top view of a portion of the example location of FIG. 2A, according to some embodiments.

Referring now to FIG. 2A, FIG. 2B, FIG. 2C, and FIG. 2D, a top view of an example location 200, a first perspective view of the example location 200, a zoomed-in top view of a portion 202 of the example location 200, and a second perspective view of the example location 200 according to some embodiments are shown, respectively. The example location 200 may comprise a city block and/or a portion of a certain area or zone such as a census tract, voting district, United States Geological Survey (USGS) quadrangle, media market, and/or zip code, for example. In some embodiments, as depicted in FIG. 2A, FIG. 2B, FIG. 2C, and/or FIG. 2D, for example, the example location 200 may comprise a plurality of polygons 210a-c (e.g., land parcels and/or value subjects). The polygons 210a-c may, in some embodiments, be defined by municipalities and comprise tax and/or assessment parcels. In some embodiments, polygons 210a-c may be defined by other entities (e.g., by an insurance company employee) and/or be based on other geographic, economic, social, political, and/or other demographic and/or business factors (e.g., based on risk and/or other underwriting characteristics).

Figure 2D:
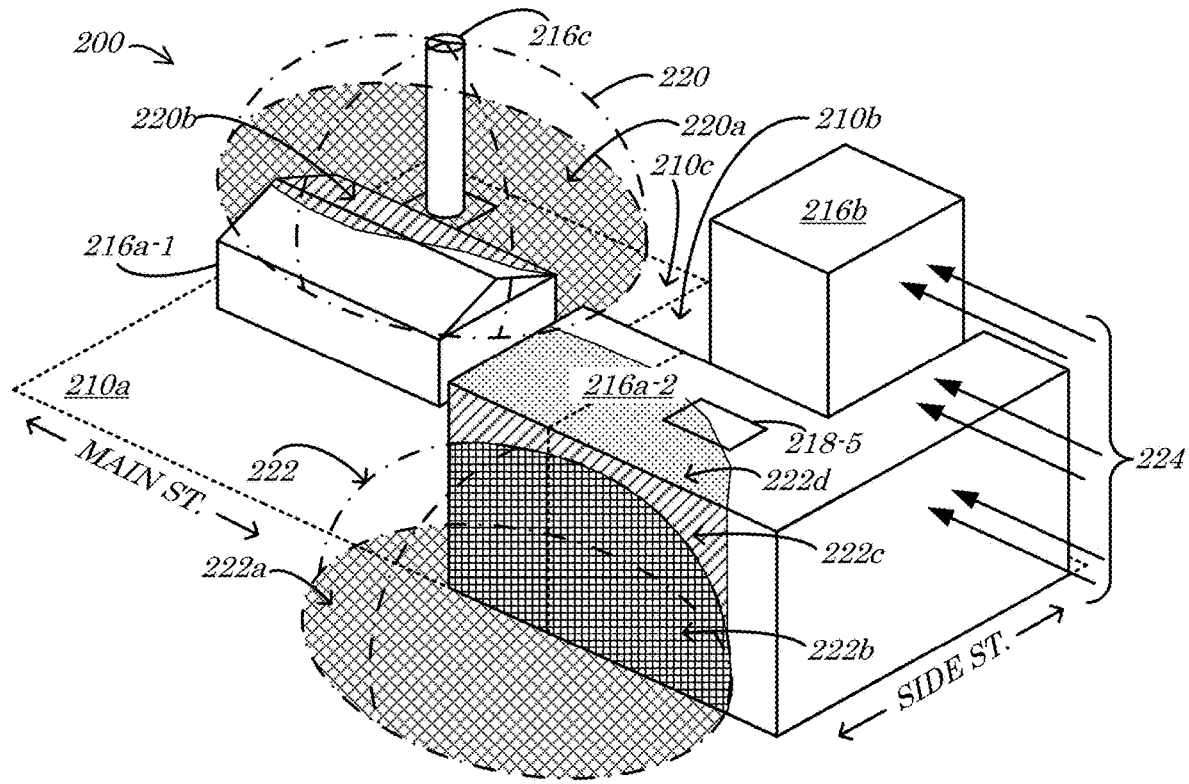
FIG. 2D is a perspective view of the example location of FIG. 2A, according to some embodiments.

According to some embodiments, the polygons 210a-c may comprise and/or be defined by one or more vertices 212 (depicted in FIG. 2A and FIG. 2C, but not replicated in FIG. 2B or FIG. 2D, for clarity). A first polygon 210a may, for example, be defined and/or bounded by a first vertex 212a-1 (depicted at the upper-left of the first polygon 210a), a second vertex 212a-2 (depicted at the upper-right of the first polygon 210a and bordering with a second polygon 210b), a third vertex 212a-3 (depicted at the lower-right of the first polygon 210a and also bordering with the second polygon 210b), and a fourth vertex 212a-4 (depicted at the lower-left of the first polygon 210a). In some embodiments, the second polygon 210b and/or a third polygon 210c may be defined by and/or comprise vertices 212b-1, 212b-2, 212b-3, 212b-4 and 212c-1, 212c-2, 212c-3, 212c-4, respectively. In some cases, such as in the case that the third vertex 212a-3 of the first polygon 210a and the fourth vertex 212b-4 of the second polygon 210b coincide, a single graphical point may be described and/or defined with reference to either or both of the overlapping vertices 212a-3, 212b-4. Although each of the polygons 210a-c is depicted in FIG. 2A, FIG. 2B, FIG. 2C, and/or FIG. 2D as comprising a rectilinear shape, a polygon 210a-c may comprise any type and/or configuration of shape that is or becomes known or practicable, and may accordingly comprise and/or be defined by any number of vertices 212. According to some embodiments, such as in the case that a polygon 210a-c comprises an ellipse, circle, and/or other non-rectilinear shape (not shown in FIG. 2A or FIG. 2B), one or more of the vertices 212a-1, 212a-2, 212a-3, 212a-4, 212b-1, 212b-2, 212b-3, 212b-4, 212c-1, 212c-2, 212c-3, 212c-4 may be utilized to identify any desired geometric point, midpoint, center, centroid, intersection, inflection, tangent, moment, etc.

In some embodiments, other (e.g., non-vertex) points 214 may be associated with and/or define the polygons 210a-c. Points 214 may represent and/or define, for example, non-vertex attributes of a given polygons 210a-c. In some embodiments, such as in the case that the non-vertex attribute comprises a geometric attribute, the points 214 may represent and/or define one or more of a centroid of a polygon 210a-c, an offset from a corner or side of a polygon 210a-c, a midpoint of a line segment connecting two vertices 212, and/or may identify one or more features of a polygon 210a-c (e.g., topological locations, zone boundary locations, structure locations, user-defined locations, and/or other reference locations). In some embodiments, the points 214 may be defined by one or more coordinates such as 'x', 'y', and/or 'z' coordinates, GPS coordinates, Latitude and Longitude coordinates, etc. According to some embodiments, one or more three-dimensional shapes (e.g., polyhedrons, ellipsoids, pyramids, cylinders, and/or combinations thereof, etc.) may be utilized to identify and/or locate one or more structures. A structure may be completely bounded and/or enclosed or encompassed by a three-dimensional polygon shape and/or representation, for example, or may be partially bounded, enclosed, and/or encompassed. Various sensing devices such as a Light Detection and Ranging (LiDAR) device may be utilized in some embodiments to acquire and/or verify data descriptive of such three-dimensional polygons. In some embodiments, the points 214 may be utilized to define and/or identify a particular polygon 210a-c (and/or a feature thereof).

According to some embodiments, a first point 214a-1 may be identified as existing within the first polygon 210a. The first point 214a-1 may, for example, comprise a single coordinate point of-record (e.g., in a municipal assessor's office or defined by a user via a GUI) in association with the first polygon 210a. In some embodiments, a second point 214a-2 may identify a feature of the first polygon 210a. As depicted at the example location 200 of FIG. 2A, FIG. 2B, FIG. 2C, and/or FIG. 2D, for example, the polygons 210a-c may comprise and/or have situated thereupon one or more structures 216. The second point 214a-2, for example, may identify a location of a first structure 216a-1 (e.g., a building such as a warehouse) of the first polygon 210a. In some embodiments, one or more structures 216 may exist on a polygon 210a-c. In some embodiments, a structure such as a second structure 216a-2 (e.g., a building such as an apartment building) may extend across and/or exist in multiple polygons 210a-c (in the case of the second structure 216a-2, for example, existing in both the first and second polygons 210a-b—e.g., first and second value subjects). According to some embodiments, the example location 200 may comprise one or more customer locations 218 (e.g., areas, objects, value subjects, and/or points or boundaries associated with one or more individuals and/or entities such as a customer of a business).

In some embodiments, a first customer location 218-1 may identify a portion of the second structure 216a-2, within the first polygon 210a, where a first customer (not explicitly shown) resides, does business, etc. In some embodiments, a third point 214b in the second polygon 210b may identify a second location 218-2 of a second customer (e.g., a customer of an insurance business as described with respect to some embodiments herein). As depicted, for example, the third point 214b may identify the second location 218-2 in the second structure 216a-2 on the second polygon 210b. According to some embodiments, the third point 214b and/or the second location 218-2 of the second customer may coincide with, conflict with, and/or be equivalent or similar to a third location 218-3 of a third customer. As depicted in FIG. 2B, for example, the second location 218-2 may define an area of an upper floor of the second structure 216a-2, while the third location 218-3 may define an area of a lower floor of the second structure 216a-2, beneath the second location 218-2. In some embodiments, the third point 214b may be associated with elevation, height, and/or floor data that defines the second location 218-2. In some embodiments, a fourth location 218-4 of a fourth customer may be identified in another portion of the second structure 216a-2 on the second polygon 210b.

In some embodiments, one or more points 214 may coincide with, identify, and/or define one or more vertices 212 of the polygons 210a-c. As depicted with respect to the third polygon 210c, for example, a fourth point 214c-1 may define a location of the first vertex 212c-1 of the third polygon 210c and/or a fifth point 214c-2 may define a location of the third vertex 212c-3 of the third polygon 210c. In such a manner, for example, coordinate data associated with the fourth and fifth points 214c-1, 214c-2 may define a geospatial relationship between the third polygon 210c and other geospatially referenced objects and/or areas (e.g., the other polygons 210a-b).

FIG. 2A and FIG. 2B are generally provided to illustrate (via the example location 200) various difficulties associated with identifying, defining, and/or otherwise determining certified locations and/or value subjects—especially with respect to customers of a business. While much data regarding the example location 200 may exist, for example, such data is generally stored and accessible only to the extent determined useful by any entity that gathered or obtained such data. The data is almost certainly not standardized and often overlaps or conflicts with other data sets utilized for various purposes. The data may be incomplete, inaccurate, and/or may include (or lack) alternative spellings and/or identifiers (e.g., "vanity" addresses). These and other issues substantially hinder determination of certified locations and/or value subjects, particularly certified locations and/or value subjects of customers and certified locations and/or value subjects defined by end-users.

As an example, surveying data regarding the first polygon 210a may be memorialized on a municipal map (e.g., a zoning map) that defines geo-referenced coordinates for each vertex 212a of the first polygon 210a. The map may also define coordinates for each corner of the first structure 216a-1. This data (e.g., the coordinates) is merely displayed on a static map, however, and is not stored in a database or otherwise accessible to being queried or utilized electronically. Nor is this data typically stored in association with other location information, such as street address data. Thus, in the case an address of the first customer at the first location 218-1 is known, the zoning information and/or coordinate data is not likely known nor readily identifiable or searchable. Similarly, if a coordinate of the first location 218-1 is known, street address information may not be discernible based upon that information. Further, non-vertex points 214 such as the first and second points 214a-1, 214a-2 are likely not noted on the zoning maps. Thus, if the first customer (or an information provider or providers who are providing information about that customer or that address, polygon, value subject, parcel, and/or structure) provides one or more of the first and second points 214a-1, 214a-2 as coordinate information descriptive of the first location 218-1 (e.g., via a mobile device), there may be no efficient manner to determine from such coordinate information a street address (or other valid value subject identifier) of the customer, much less which polygon 210a-c the customer is on, much less which structure 216a-c the customer is in.

Even in the case that address information is available for a particular polygon 210a-c, the address information generally comprises a range of street addresses that have been allocated to that particular polygon 210a-c—some or many of which may not be in use. Street address information for the first polygon 210a may indicate, for example, that addresses from one (1) to one hundred (100) "Main Street" are assigned to the first polygon 210a. In the case that it is known that the first location 218-1 of the first customer has a street address of fifty (50) "Main Street", the street address may be utilized to determine that the first location 218-1 is within the first polygon 210a. The street address does not, however, allow for the determination of which of the first structure 216a-1 and the second structure 216a-2 the first location 218-1 is within, nor does it provide any information regarding geospatial orientation of the first location 218-1 (e.g., the street address and/or the polygon and/or parcel information do not allow for the determination of how far the first location 218-1 is from the second or third locations 218-2, 218-3). In some embodiments, a polygon 210a-c may only be associated with one of a plurality of addresses located at the polygon 210a-c. The polygon 210a-c may have a "legal" and/or tax address, for example, and all other mailing addresses at the polygon 210a-c may not be "legal" and/or tax addresses, and may accordingly not be stored in association with the polygon 210a-c.

In some cases, the first polygon 210a may only be associated with a single exterior point or coordinate 214a-3 that does not fall within the actual boundaries of the first polygon 210a. The exterior point 214a-3 may, for example, have been assigned to represent the location of the first polygon 210a at a time when geospatial accuracies were lower and/or may represent the best available geospatial information descriptive of the first polygon 210a.

Similarly, while street address information may be utilized to determine that the first location 218-1 is within the first polygon 210a and the fourth location 218-4 is within the second polygon 210b, there is currently no manner to discern that both locations 218-1, 218-4 are within the same second structure 216a-2. Nor does knowledge that the second location 218-2 and the fourth location 218-4 are in the second polygon 210b allow for specific identification of a certified location and/or value subject for either respective customer, as there is no information distinguishing between the second structure 216a-2 and the third structure 216b (e.g., particularly in the case that the second and third structures 216a-2, 216b are connected and/or are otherwise considered to comprise the same and/or overlapping street addresses). In some embodiments, structures 216 (and/or polygons 210a-c) may not be associated with street address information. In the case that a structure comprises a structure not operated as a home or business, such as the fourth structure 216c for example, no mailing address may be required, assigned, and/or otherwise applicable. Similarly, a polygon 210a-c may comprise and/or define a non-address area such as a field, stream, intersection, zone, region, etc.

In some embodiments, accuracies, confidence levels, and/or probabilities associated with points 214 (and/or other location data) may be utilized to make determinations regarding certified location and/or value subject data. As depicted in FIG. 2C, for example, the portion 202 of the example location 200 may comprise three different points 214 labeled "A", "B", and "C", respectively. In some embodiments, the points "A", "B", and/or "C" may be similar to and/or associated with one or more of the points 214 depicted in FIG. 2A. The second point 214a-2 of FIG. 2A may, for example, be based on and/or otherwise associated with the point "A" of FIG. 2C. In some embodiments for example, the point "A" may comprise a representation of location information acquired with respect to and/or determined to be descriptive of the first structure 216a-1.

According to some embodiments, the point "A" may be determined to be associated with one or more confidence levels "A1", "A2", and/or "A3" (e.g., areas, zones, and/or volumes). A first set and/or pre-determined distance/radius from the point "A" may be determined to represent a first confidence level "A1", a second set and/or pre-determined distance/radius from the point "A" may be determined to represent a second confidence level "A2", and/or a third set and/or pre-determined distance/radius from the point "A" may be determined to represent a third confidence level "A3". In some embodiments, the confidence levels "A1", "A2", "A3" may be utilized to determine a likelihood and/or probability (e.g., a weight, score, etc.) that the point "A" accurately represents and/or identifies (e.g., locates) the first structure 216a-1. In the case that it is known that the point "A" is supposed to represent the first structure 216a-1, for example, because the second confidence level "A2" overlaps with a portion of the first structure 216a-1, an inference may be made that the point "A" (and/or related location information) is not as accurate is it could be and/or as desired (such as in a case where the first confidence level "A1" overlapped with a portion of the first structure 216a-1), but is not inaccurate. In some embodiments, a score and/or weight may be assigned to the point "A" based on one or more of the confidence levels "A1", "A2", and/or "A3" and their relation to various location components, such as polygons 210a-c, structures 216a-1, 216a-2, 216b and/or customer location 218-1.

In some embodiments, inaccuracy may be assumed in a case where the point "A" is supposed to represent the second structure 216a-2. As the second structure 216a-2 falls outside of even the third confidence level "A3", it may be assumed that the point "A" is inaccurate or suspect (e.g., a low likelihood of being accurate and/or useful). In some embodiments, a relative comparison of the proximity of the point "A" to the different structures 216a-1, 216a-2 may be utilized to determine which (if any) structure 216a-1, 216a-2 the point "A" is likely associated with (and/or descriptive of). As the point "A" is closer to the first structure 216a-1 than the second structure 216a-2 (utilizing the confidence levels "A1", "A2", and/or "A3" or straight distance measurements), for example, it may be determined that the point "A" is descriptive of and/or associated with the first structure 216a-1 (as opposed to the second structure 216a-2).

According to some embodiments, such as in the case of the point "B", confidence levels "B1", "B2", and/or "B3" may be utilized to determine a likelihood of accuracy (and/or association) of the point "B". As even the tightest depicted confidence level "B1" overlaps or includes portions of both the first polygon 210a and the third polygon 210c, for example, it may be determined that point "B" has a low confidence score/rank due to the close proximity of the various polygons 210a, 210c. In some embodiments, a rank, weight, and/or score may be assigned to the point "B" with respect to each proximate polygon 210a-c, structure 216a-1, 216a-2, 216b, and/or customer/business location 218-1. The point "B" may be determined to have a qualitative rank of "VERY HIGH" or a quantitative rank of "0" with respect to the third polygon 210c, for example, may be determined to have a "HIGH" and/or "1" rank/score with respect to the first polygon 210a, and/or may be determined to have a "LOW" and/or "14" rank/score with respect to the second polygon 210b. According to some embodiments (as described in more detail hereinafter), such confidence levels "B1", "B2", "B3" (and/or "A1", "A2", "A3"), weights, scores, and/or rankings may be utilized with respect to points 214 (such as points "A" and/or "B") and/or other location information for comparative analysis to determine certified location and/or value subject data.

In some embodiments, such as depicted with respect to point "C" in FIG. 2C, confidence levels "C1", "C2", "C3" may be defined, expressed, and/or depicted in various manners (e.g., not limited to radial and/or circular projects and/or areas). Rectilinear confidence levels "C1", "C2", "C3" as depicted in FIG. 2C, for example, may be useful in various cases such as in the case that the point "C" is known (or believed) to be within the second structure 216a-2. In the case that data descriptive of the point "C" is received from a field agent and/or customer known to have a customer location 218-1, for example, the confidence levels "C1", "C2", "C3" may be utilized to determine (i) whether the customer location 218-1 information already on file is accurate, (ii) a layout and/or configuration of the customer location 218-1 (and/or the second structure 216a-2), and/or (iii) how likely it is that the customer location 218-1 is within the second structure 216a-2 (e.g., as opposed to the third structure 216b). Similarly, confidence levels "C1", "C2", "C3" may comprise height and/or elevation data and/or extend into, cross, and/or define one or more horizontal planes (e.g., representing different floors of the second structure 216a-2). In such a manner, for example, the confidence levels "C1", "C2", "C3" may be utilized to rank, score, and/or determine a likelihood that the customer location 218-1 is on a given floor of the second structure 216a-2 (and/or to assist in determining features of the second structure 216a-2, such as number of floors).

In some embodiments, other location-related information may be depicted and/or utilized in conjunction with the example location 200. As depicted in FIG. 2D, for example, one or more of a fall risk zone 220, a terrorist risk zone 222, and/or a weather risk zone 224 may be associated with the example location 200, one or more of the polygons 210a-c, one or more of the structures 216a-1, 216a-2, 216b, 216c, and/or one or more customer and/or business locations 218 (most not reproduced in FIG. 2D for clarity of depiction). According to some embodiments, such risk zones 220, 222, 224 may be determined, calculated, depicted, and/or utilized based on certified location and/or value subject data gathered, compiled, aggregated, analyzed, and/or otherwise processed as described herein. Once the spatial (e.g., geo-spatial and/or relational) relationships of the polygons 210a-c, the structures 216a-1, 216a-2, 216b, 216c, and/or the business locations 218 are determined, for example, different risks, likelihoods of risk, and/or risk scores or weights may be determined and/or visualized.

With respect to the fall risk zone 220, for example, assuming the height of the fourth structure 216c is known or determined, the fall risk zone 220 may be calculated, graphed, and/or depicted to define a fall risk area 220a (and/or volume) that is subject to risk due to objects falling from the fourth structure 216c (and/or due to a collapse of the fourth structure 216c itself). In some embodiments, such as depicted in FIG. 2D, in the case that the fall risk area 220a (and/or volume) overlaps with and/or includes the first structure 216a-1, a structure risk area 220b may be defined that represents an area, portion, and/or volume of the first structure 216a-1 that is subject to risk due to potential problems with the fourth structure 216c. In some embodiments, the structure risk area 220b may be utilized to determine a likely magnitude of potential loss occurring to the first structure 216a-1 due to the fourth structure 216c. In some embodiments, such loss prediction determinations may include analysis of other data descriptive of the fourth structure 216c. In the case that the fourth structure 216c comprises a radio tower or antenna mast, for example, and assuming the structure risk area 220b as depicted in FIG. 2D, it may be determined that likely damage to the first structure 216a-1 may be limited to roofing and/or roof member damage (e.g., as opposed to severe structural damage, internal building system losses, etc.).

In some embodiments, terrorist risk zone 222 may be utilized to determine how relationships in location information (e.g., certified location and/or value subject information) are likely to affect risk. As depicted in FIG. 2D, for example, in the case that an explosion and/or other catastrophic accident and/or terrorist event in front of the second structure 216a-2 (e.g., on "Main St.") is modeled to occur, the terrorist risk zone 222 may be defined and/or depicted. In some embodiments, such as in the case that the terrorist risk zone 222 comprises a hemispherical shape as depicted, a ground blast zone 222a, a building surface blast zone 222b, a peripheral building surface damage zone 222c, and/or a structural failure zone 222d may be determined.

According to some embodiments, such as in the case that the first polygon 210a is associated with and/or comprises mailing addresses on "Main St." and the second polygon 210b is associated with and/or comprises mailing addresses on "Side St.", in the absence of certified location and/or value subject information that allows visualization (and/or computation) based on the actual physical and/or locational relationships as depicted at the example location 200, one would not be able to easily determine that the terrorist risk zone 222 (due to a threat/event on "Main St.") may impact addresses on "Side St." As depicted, for example, unless it is known (e.g., via utilization of certified location and/or value subject systems and methods described herein) that the second structure 216a-2 comprises addresses on both "Main St." and "Side St.", the potential risk of loss may be grossly underestimated. Assume, for example, that an insurance company has many customers (not shown) in the second structure 216a-2 situated in/on the first polygon 210a (and accordingly all having mailing, business, domicile, and/or tax addresses on "Main St."). A new potential customer comes forth and requests an insurance policy protecting their home/business located at "2 Side St."—and situated as depicted at the fifth customer location 218-5 in FIG. 2D. Without access to certified location information and the various relationships associated therewith as described herein, the insurance company may see no particular risk in underwriting a policy for the new customer (even if the potential threat represented by the terrorist risk zone 222 is known), and may accordingly take on the new account/ policy. Similarly, in the case that a data customer and/or risk assessment agent attempts to retrieve data associated with the fifth customer location 218-5, such as to determine a risk associated with the fifth customer location 218-5, typical systems would require an address to be entered and stored data in association with the address would then be retrieved. According to some embodiments herein, the agent/customer could instead utilize an interface (not explicitly shown in FIG. 2A, FIG. 2B, FIG. 2C, and/or FIG. 2D; such as the interfaces 620, 920, 1520 of FIG. 6, FIG. 9, and/or FIG. 15 herein) to define one or more points, lines, and/or polygons that define an area (e.g., a value subject) for which data is desired. The input location data could then, for example, be mapped/transformed into a desirable geospatial data format/ structure/layout, and utilized to query associated data.

With the advantage of embodiments described herein, the insurance company could realize that the fifth customer location 218-5 actually falls within the terrorist risk zone 222 (and/or the structural failure zone 222d associated therewith) due to a potential "Main St." event. Such information may accordingly be utilized to determine, with a much higher degree of accuracy and/or confidence, whether underwriting such a policy would be within the risk appetite for the insurance company. Similarly, existing policies and/ or exposures may be reviewed to determine an overall risk/loss level associated with any given event (such as represented by the terrorist risk zone 222). Such information may then be utilized to reduce risk (e.g., by modifying, cutting, and/or freezing policies and/or policy underwriting) to within acceptable limits (e.g., presuming that previous "blind" practices have resulted in overexposure due to incomplete location relationship information). Such information may also or alternatively be utilized to redefine existing value subject data and/or boundaries and/or to define new value subject data, e.g., via point, line, and/or polygon data entered by a user via an interface (such as the interfaces 620, 920, 1520 of FIG. 6, FIG. 9, and/or FIG. 15 herein).

In some embodiments, the weather risk zone 224 may be utilized to determine locational relationship-based damage and/or risk likelihoods. In the case of a wind, hail, storm surge, and/or other weather events, such as depicted by the weather risk zone 224, for example, it may be determined that certain locational elements, such as structures 216a-1, 216a-2, 216b, may be more or less likely to result in claims, damage, and/or losses due to a particular event. Upper-level floors of the third structure 216b may be exposed to the weather risk zone 224, for example, while lower-level floors may be shielded by the second structure 216a-2. Such risk information may be utilized to develop risk scores for different certified locations and/or value subjects such as, for example, different apartments/businesses in the same structure 216a-1, 216a-2, 216b. In the absence of certified location information and/or relationships, too much or too little risk exposure may be experienced with respect to underwriting products sold for the example location 200. In the case that the weather risk zone 224 represents a known high likelihood of wind damage, for example, the risk coverage associated with policies written for customers in the third structure 216b may be lower than desired (e.g., the shielded lower floors have lower risk), resulting in lower revenue and/or profits than are possible/desirable. The availability and knowledge of the locational relationships based on certified location data allow for such otherwise missed revenues and/or profits to be realized while maintaining desired levels of risk exposure. Certified location data also may, for example, allow for the dynamic, customized, and/or user-initiated definition of value subjects and/or the retrieval of risk (and/or other) data associated therewith.

According to some embodiments, any or all of the components 210a-c, 212a-c, 214a-c, 216a-c, 218, 220, 222, 224 of and/or associated with the example location 200 may be similar in configuration and/or functionality to any similarly named and/or numbered components described herein. Fewer or more components 210a-c, 212a-c, 214a-c, 216a-c, 218, 220, 222, 224 and/or various configurations of the components 210a-c, 212a-c, 214a-c, 216a-c, 218, 220, 222, 224 may be included in and/or in association with the example location 200 without deviating from the scope of embodiments described herein. While multiples of some components 210a-c, 212a-c, 214a-c, 216a-c, 218 are depicted and while single instances of other components 218, 220, 222, 224 are depicted, for example, any component 210a-c, 212a-c, 214a-c, 216a-c, 218, 220, 222, 224 depicted in and/or in association with the example location 200 may comprise a single object and/or component, a combination of objects and/or components 210a-c, 212a-c, 214*a-c*, 216*a-c*, 218, 220, 222, 224, and/or a plurality of objects and/or components, as is or becomes desirable and/or practicable.

Figure 3B:
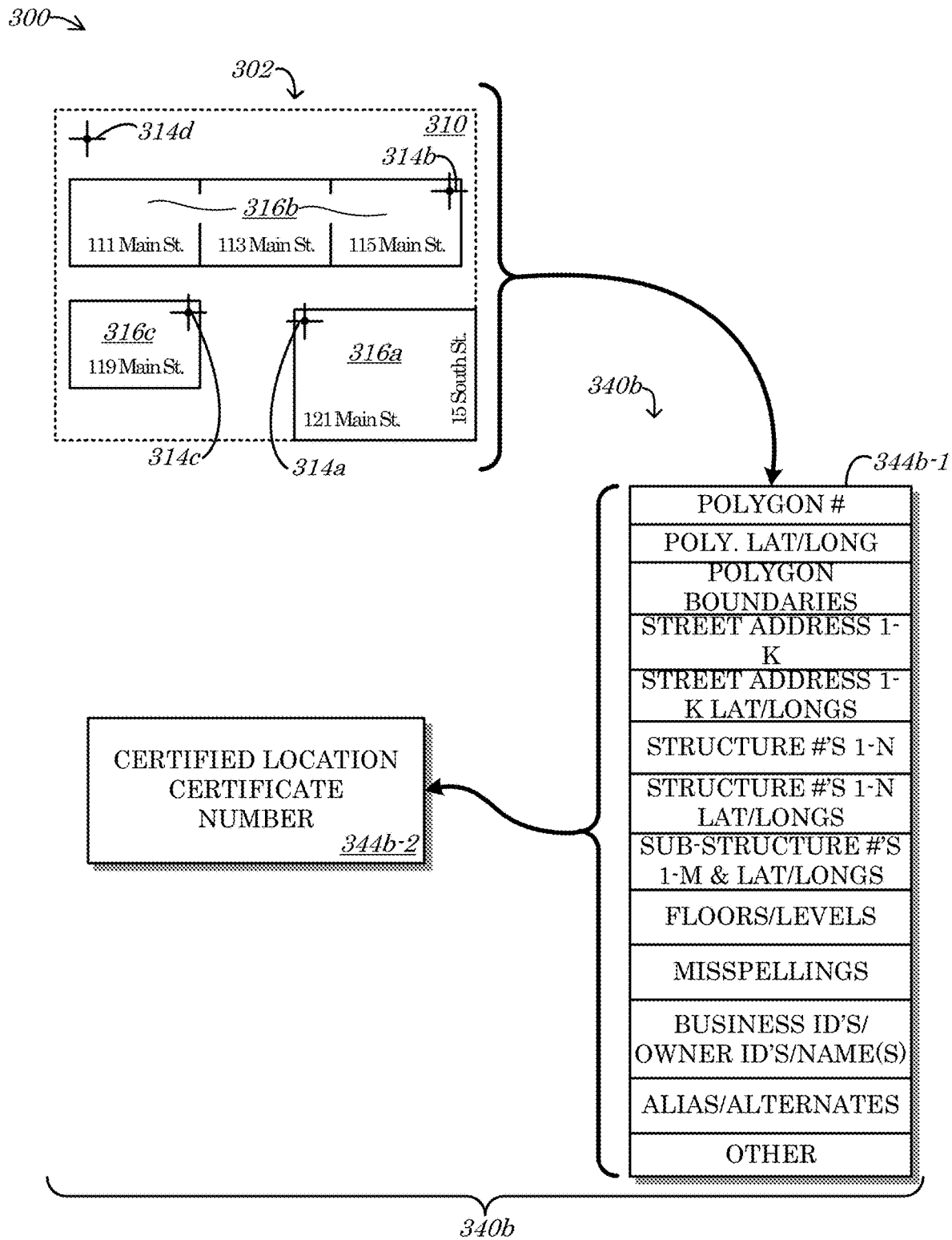
FIG. 3B is a block diagram of an example location data set mapped to an example data storage structure of a system according to some embodiments.

Turning now to FIG. 3A, FIG. 3B, FIG. 3C, and FIG. 3D, block diagrams of various components of a system 300 in accordance with some embodiments are shown. In FIG. 3A, a first example data storage structure 340*a* of the system 300 according to some embodiments is shown. The first example data storage structure 340*a* may, for example, depict how data representing some of the various aspects and/or objects and/or components depicted in FIG. 2A, FIG. 2B, FIG. 2C, and/or FIG. 2D may be stored. In some embodiments, the first example data storage structure 340*a* may comprise a location ID field 344*a*-1, a structure ID field 344*a*-2, an address field 344*a*-3, a city field 344*a*-4, a state field 344*a*-5, a zip field 344*a*-6, a structure polygon field 344*a*-7, a parcel polygon field 344*a*-8, a point field 344*a*-9, and/or a point confidence field 344*a*-10. As depicted, for example, a particular structure at "123 Main Street" in "Anytown, VA" may be defined by a series of coordinates stored in the structure polygon field 344*a*-7 (any or all of which may be similar to the vertices 212 and/or points 214 of FIG. 2A and/or FIG. 2C), thereby defining a polygon representing (and/or defining) the structure. In some embodiments, a point may be associated with the address and/or the structure and coordinate data for the point may be stored in the point field 344*a*-9. According to some embodiments, a confidence level (and/or likelihood or probability) descriptive of the association between the point and the structure and/or the address may be stored in the point confidence field 344*a*-10 (such as data descriptive of one or more of the confidence levels, scores, ranks, and/or weights "A1", "A2", "A3", "B1", "B2", "B3", "C1", "C2", and/or "C3" of FIG. 2C). In some embodiments, although not explicitly shown in FIG. 3A, one or more other confidence levels may also or alternatively be stored, such as representing a confidence level of an association between a structure and a parcel and/or representing a confidence level associated with any particular polygon (e.g., a parcel and/or structures boundaries) —such as data descriptive of one or more of the confidence levels, scores, ranks, and/or weights "A1", "A2", "A3", "B1", "B2", "B3", "C1", "C2", and/or "C3" of FIG. 2C. In some embodiments, such as in the case that the first example data storage structure 340*a* stores certified location and/or value subject information, the location ID field 344*a*-1 may comprise a certified location and/or value subject identifier and/or certificate, such as a unique, encoded, and/or encrypted identifier.

In some embodiments, location and/or location relationship data may be gathered and/or stored in a variety of ways. In FIG. 3B, for example, a block diagram of an example location data set 302 (e.g., comprising data descriptive of a polygon 310, one or more points 314*a-d*, and/or one or more structures 316*a-c*) mapped to a second example data storage structure 340*b* of the system 300 according to some embodiments is shown. Data descriptive of (and/or derived from) the various points 314*a-d*, structures 316*a-c*, and/or polygon 310, for example, may be mapped to and/or otherwise stored in a location data table 344*b*-1. In some embodiments, the location data table 344*b*-1 may be utilized to develop, calculate, and/or otherwise define or determine a certified location and/or value subject metric such as the depicted certified location certificate number 344*b*-2. The certified location certificate number 344*b*-2 may be similar to the location ID field 344*a*-1, for example, and/or may otherwise comprise a unique identifier of a particular geo-location (such as a value subject). In some embodiments, the location data table 344*b*-1 may be configured to store information descriptive of one or more "alias/alternates", as depicted. An alias and/or alternate may, for example, comprise an alias for an address (and/or structure), such as a 'vanity' address or local or informal name or variant, and/or a common (in general and/or with respect to a specific individual—such as a specific underwriter and/or agent) misspelling and/or mistake. In such a manner, for example, one or more users may be permitted to interface with the system 300 utilizing one or more informal, vanity, and/or incorrect address, structure, and/or other identifiers, while maintaining the ability of the system 300 to identify unique, e.g., certified, locations.

Figure 3C:
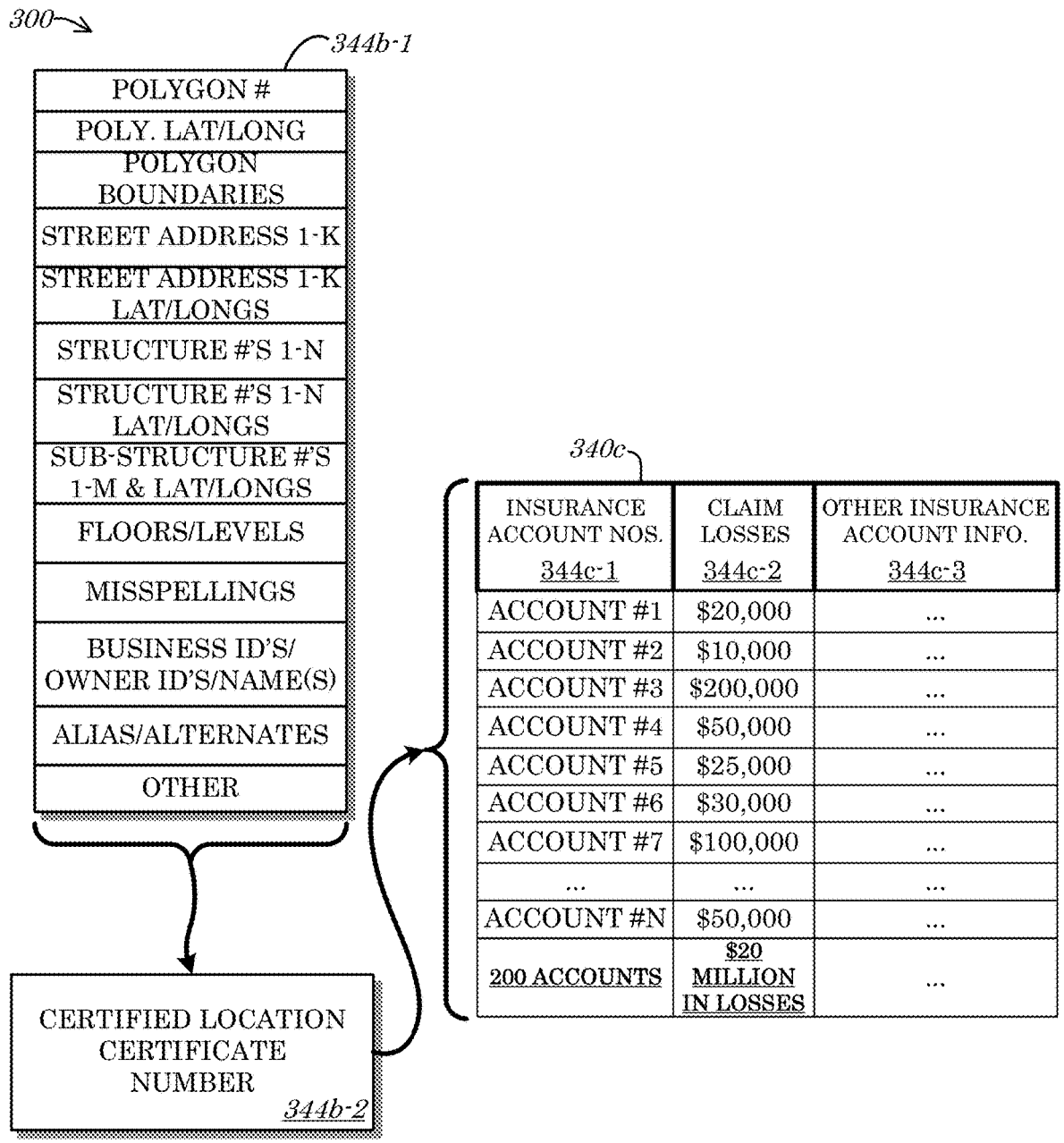
FIG. 3C is a block diagram of an example data storage structure of a system according to some embodiments.

According to some embodiments, such as depicted in FIG. 3C, a block diagram of a third example data storage structure 340*c* of the system 300 according to some embodiments is shown. The third example data storage structure 340*c* may, for example, be utilized in conjunction with the location data table 344*b*-1 and/or the certified location certificate number 344*b*-2 to determine various aggregate insurance (and/or other business) metrics for the particular certified location certificate number 344*b*-2 (e.g., and accordingly for the particular certified location and/or value subject for which the certified location certificate number 344*b*-2 is descriptive). The third example data storage structure 340*c* may, in some embodiments (such as depicted in FIG. 3C), comprise an insurance account numbers field 344*c*-1, a claim losses field 344*c*-2, and/or an other insurance account information field 344*c*-3. The certified location certificate number 344*b*-2 (and/or the location data table 344*b*-1) may be utilized, for example, to determine aggregate losses (actual and/or predicted), exposure and/or risk levels, and/or other certified location-based and/or value subject-based metrics for any given polygon, parcel, structure, etc. Such information may then be utilized, in some embodiments, to provide and/or sell a subset of location data to a user and/or to determine whether and/or to what extent (or on what terms) an insurance policy and/or other underwriting product should be written, sold, re-written, renewed, modified, etc.

In some embodiments, various rules and/or logic may be implemented, consulted, defined, and/or determined with respect to determining whether a given location is unique and/or whether and/or to what extent the location bears a relationship to one or more other locations. Referring to FIG. 3D, for example, a block diagram of an example rule set 342 of the system 300 according to some embodiments is shown. The example rule set 342 may, for example, provide guidance regarding how likely a particular outcome may be with respect to incoming and/or stored data. Assume, for example, that data descriptive of one or more locations and/or locational elements is already stored in a database (e.g., one or more of the example data storage structures 340*a-c*; otherwise, not shown in FIG. 3A, FIG. 3B, FIG. 3C, and/or FIG. 3D). The data may define one or more polygons, value subjects, parcels, points, structures, addresses, and/or customer locations. In some embodiments, new information may be received, such as with respect to a potential new customer, account, etc.

According to some embodiments, the new information may be descriptive of a particular building (e.g., as depicted with respect to the example rule set 342; or a value subject in some embodiments). The building may accordingly be considered a "candidate building" (e.g., a candidate for a new policy and/or a candidate for being a new building not yet represented in and/or by the stored data). As depicted in FIG. 3D, the candidate building's name may be compared (in accordance with the example rule set 342) to existing/ stored building names. Similarly, the candidate building address may be compared to existing/stored addresses. Inferences, probabilities, decisions, and/or decision inputs may accordingly be defined based on such comparisons. For example, in the case that the candidate building name is the same as (and/or substantially similar to; e.g., spelling and/or abbreviation variants) one already stored in a database, and the candidate building address matches (and/or substantially matches; e.g., spelling and/or abbreviation variants) the address for the similarly-named building, it can be inferred that the most common conclusion would be that the buildings are the same. In some embodiments, in such a case, the example rule set 342 may dictate that the two buildings should be considered the same. In which case, for example, any new data may be merged with and/or reconciled with existing/stored data with respect to the building.

In some embodiments, such as in the case that the candidate building name is the same/similar to a known building and the addresses are also the same/similar, this may be considered a "less common" indicator that the buildings are different. The buildings in such a case could be different, such as in the case that the name provided is "residence hall" and, for example, many "residence hall" buildings exist on a given college campus. The probabilities, weights, and/or logic associated with such "most common" and/or "less common" results based on a given data set may be utilized, in some embodiments, to inform a rules-based decision making process regarding whether the incoming data is likely to be descriptive of a location for which data is already stored. In such a manner, for example, certified location data and/or value subject data may be supplemented with incoming data to expand the certified location and/or value subject data set based on determinations regarding whether the incoming data is indeed 'new'. According to some embodiments, new and/or conflicting data may be processed by and/or through one or more rules (such as the example rule set 342) to correct errors in and/or update existing certified location and/or value subject data with newer, more accurate, and/or supplemental data.

According to some embodiments, such as in the case that the candidate building name is the same/similar to a known building but the addresses are different, this may be considered a "common" indicator that the buildings are the same. The buildings in such a case could be the same, such as in the case that a single building with a single name is situated on a street corner and/or otherwise comprises addresses on multiple streets.

In some embodiments, such as in the case that the candidate building name is the same/similar to a known building but the addresses are different, this may be considered a "less common" indicator that the buildings are different. The buildings in such a case could be different, such as in the case that the name actually identifies an area (such as "State House Square") comprising multiple buildings.

According to embodiments, such as in the case that the candidate building name is different from a known building but the addresses are the same/similar, this may be considered a "common" indicator that the buildings are the same. The buildings in such a case could be the same, such as in the case that the names comprise variants and/or local, slang, and/or unofficial names. For example, in the case that the two names are "Chem" and "Chemistry"—both descriptive of a particular chemistry building having a particular address.

In some embodiments, such as in the case that the candidate building name is different from a known building but the addresses are the same/similar, this may be considered a "common" indicator that the buildings are different. The buildings in such a case could be different, such as in the case that the names comprise various company and/or other informal designations, such as department names.

According to some embodiments, such as in the case that the candidate building name is different from a known building and addresses are different, this may be considered a "most common" indicator that the buildings are different. The buildings in such a case are likely different, for example, if the candidate is "Library" at "12 Learning Lane" while the stored data is "Math Building" at "14 College Way".

In some embodiments, such as in the case that the candidate building name is different from a known building and addresses are different, this may be considered a "least common" indicator that the buildings are the same. The buildings in such a case may sometimes be the same, for example, in the case that a particular building with different input name variants straddles and/or spans addresses on two or more roads (or road names). For example, if the candidate is "Chem" at "1 Oak St." and the stored info is "Chemistry" at "12 University Dr." (or "Route 1", where "Route 1" and "Oak St." coincide), the buildings may be considered the same.

Rules sets, logic, and/or instructions, such as the example rule set 342, may be utilized to compare location information other than or in addition to the building name and address data described with respect to FIG. 3D. While the system 300 is depicted in FIG. 3A, FIG. 3B, FIG. 3C, and FIG. 3D as comprising the various example data storage structures 340*a-c* and other components 302, 310, 314*a-d*, 316*a-c*, 342, 344*a-c*, fewer or more such components 302, 310, 314*a-d*, 316*a-c*, 340*a-c*, 342, 344*a-c* may be included in the system 300 without deviating from the scope of some embodiments.

In some embodiments, fewer or more data fields than are shown may be associated with the example data storage structures 340*a-c*. Only a portion of one or more databases and/or other data stores is necessarily shown in any of FIG. 3A, FIG. 3B, FIG. 3C, and/or FIG. 3D, for example, and other database fields, columns, structures, orientations, quantities, and/or configurations may be utilized without deviating from the scope of some embodiments. According to some embodiments, any or all of the components 302, 310, 314*a-d*, 316*a-c*, 340*a-c*, 342, 344*a-c* of the system 300 may be similar in configuration and/or functionality to any similarly named and/or numbered components described herein.

According to some embodiments, systems, methods, and articles of manufacture described herein may be utilized to gather location data (e.g., via the location data devices 102*a-n* of FIG. 1 and/or with respect to one or more locations, such as the example location 200 of FIG. 2A, FIG. 2B, FIG. 2C, and/or FIG. 2D), form, identify, define, and/or otherwise determine relationships between the various location data (e.g., via the location processing device 110 of FIG. 1), and/or utilize such data (e.g., certified location and/or value subject data) to inform or facilitate various processes and/or perform various tasks as described herein.

Figure 4:
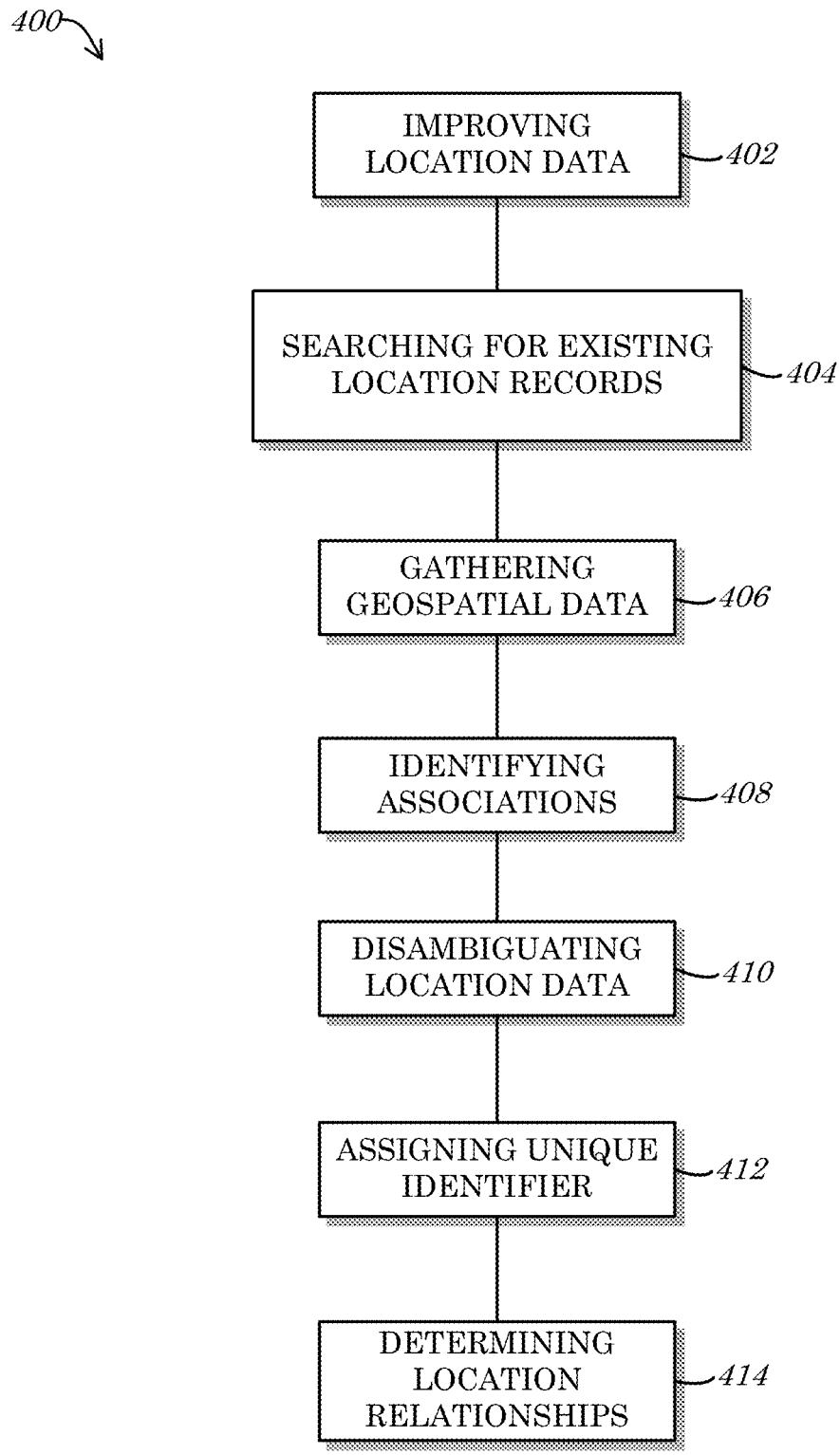
FIG. 4 is a flow diagram of a method according to some embodiments.

Turning to FIG. 4, for example, a flowchart of a method 400 according to some embodiments is shown. In some embodiments, the method 400 may be performed and/or implemented by and/or otherwise associated with one or more specialized and/or specially-programmed computers, computer terminals, computer servers, computer systems and/or networks, and/or any combinations thereof (e.g., by one or more third-party and/or insurance company and/or underwriter computers, such as, e.g., the certified location device 110 of FIG. 1). The functional diagrams and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, Universal Serial Bus (USB) mass storage device, a RAM device, a cache memory device, and/or Digital Video Disk (DVD)) may store thereon instructions that when executed by a machine (such as a computerized processor) result in performance according to any one or more of the embodiments described herein.

In some embodiments, the method 400 may comprise improving location data, at 402. The improving may comprise, for example, receiving and/or retrieving location data. According to some embodiments, the improving may comprise gathering information descriptive of (i) street address data, (ii) land parcel data, (iii) structure data, and/or (iv) coordinate data. Various data devices (e.g., the location data devices 102*a-n* of FIG. 1) and/or data sources (e.g., the database 140 of FIG. 1 and/or the example data storage structures 340*a-c* of FIG. 3A, FIG. 3B, and/or FIG. 3C) may be utilized, for example, to gather, acquire, assemble, and/or aggregate data regarding various locations. In some embodiments, the gathered data may be descriptive of and/or with respect to a plurality of customers. A business such as an insurance company may, for example, gather and/or receive data descriptive of locations of various customers and/or insured objects, places, areas, etc. According to some embodiments, the location data may be gathered and/or received from any quantity, type, and/or combination of data sources that is or becomes known or practicable.

In some embodiments, data may be retrieved and/or received from various third-party data sources. A third-party data vendor may provide street address information based on a customer's telephone number, for example, or may utilize land parcel address block assignments to determine which land parcel a customer resides on (and/or does business at). In some embodiments, location data may be manually and/or electronically sourced, mined, scanned, copied, scraped, and/or otherwise obtained from various municipal, public, private, and/or third-party sources. In some embodiments, the location data may be gathered utilizing one or more mobile devices. Customers, field agents, and/or third-party personnel may, for example, utilize a mobile computing device with location identification capabilities (e.g., GPS, Bluetooth®, and/or cell-tower triangulation) to provide location data that is received by a central controller and/or certified location system.

In some embodiments, the improving may comprise standardizing and/or de-duplicating location data received as input (e.g., from a customer) and/or validating the location data (e.g., a mailing address) against known and/or available location data (e.g., a list of known mailing address). In some embodiments, a confidence level and/or code may be established based on the quality and/or content of the location data and/or upon the results of the verification process. In some embodiments, the location data may comprise a variety of information including, but not limited to, street and/or mailing address data, vanity address data (e.g., informal place and/or street address name (e.g., "30 Rock"), area and/or attraction name data (e.g., Madison Square Garden), geospatial coordinates, an intersection identifier, suite number, floor or level number, utility information (e.g., telephone pole number), and/or building and/or structure characteristic data (e.g., brick exterior, flat roof, adjacent to town park).

According to some embodiments, the method 400 may comprise searching for existing location records, at 404. Any or all location information received, retrieved, and/or otherwise determined at 402, for example, may be utilized to query one or more databases and/or other data stores to determine whether (and/or a likelihood or probability of whether) the location data matches data already stored and/or available. In the case that a match is determined, the existing database record may be utilized and/or updated. In the case that no match is found, a new database record may be created to store the location information. According to some embodiments, such as in the case that a partial match is found, one or more algorithms and/or procedures may be executed to determine a probability associated with the match. Spelling and/or data entry variations may be analyzed, for example, to determine a likelihood that both the incoming and previously stored/available matched location information is descriptive of the same geographic point, polygon/value subject, parcel, building, etc.

In some embodiments, the method 400 may comprise gathering geospatial data, at 406. Geospatial data descriptive of the location data (received at 402 and/or identified at 404) may, for example, comprise data descriptive of various levels of geospatial detail. In some embodiments, the geospatial data may comprise detailed address information, polygon and/or polygon boundary information, parcel and/or parcel boundary information, coordinate data, and/or structure or sub-structure data. According to some embodiments, the best available geospatial data may be identified. In the case of an apartment in an apartment building, for example, the mailing address, parcel identifier, structure identifier, floor number, security system zone, and/or geographic coordinate (and/or elevation) may be determined. In some embodiments, such as in the case that the location information does not conflict/match with already stored information, any level of uniqueness (e.g., zip code, street name, mailing address) may be utilized that is or becomes practicable or desirable. It may be desirable, for example, to only search for (and/or pay for) and store enough geospatial data to uniquely identify a location data record with respect to other stored location data records.

According to some embodiments, the method 400 may comprise identifying associations, at 408. The location data and the associated geospatial data from 402, 404, and/or 406 may, for example, be compared to other known locations and/or location data records to determine one or more relationships there between (e.g., utilizing stored rules, logic, and/or instructions such as the example rule set 342 of FIG. 3D). In the case that the geospatial location data comprises a definition of a polygon defining a land parcel, for example, other known polygons (e.g., land parcel and/or structure polygons) that intersect with the polygon of the location data and/or are otherwise proximate to the polygon of the location data, may be identified. In some embodiments, the relationship may comprise the polygon of the location data being disposed within another known polygon (partially or entirely; or vice versa; such as a structure polygon residing within the boundaries of a land parcel polygon) and/or a point associated with the location data being disposed within a known polygon (e.g., a roof centroid of a structure being disposed within the polygon defining the boundaries of the structure). According to some embodiments, proximity and/or other relationships may be analyzed to determine a nature and/or likelihood of relation. In the case that a coordinate point of the location data falls near, but not within, a parcel and/or structure polygon, for example, one or more routines and/or procedures may be executed to determine a probability that the point is associated with the nearby parcel/structure (and/or to determine which nearby parcel and/or structure the point is likely associated with). In the case that two polygons descriptive of the same type of object (e.g., the same level of geospatial data), such as two land parcel polygons, overlap and/or overlap by some threshold percentage or amount (e.g., fifty percent (50%) overlap), a quality control check may be initiated to determine why such overlap exists. According to some embodiments, analysis of conflicting location data may lead to data modification decisions and/or the location and/or geospatial data may otherwise be modified (e.g., new and/or better location and/or geospatial data may be located based on an analysis).

In some embodiments, the method 400 may comprise disambiguating the location data, at 410. In the case that one or more associations are identified at 408, for example, information distinguishing associated and/or conflicting location data may be determined. In the case that two buildings are identified at a single address (or more than one building is possible based on the location data from 402), for example, distinguishing information such as coordinate data, structure type, year built, number of stories, size, etc., may be utilized to separately identify the two structures. In some embodiments, one or more stored rules, logic processes, instructions, and/or programs may be utilized to analyze, interpret, interpolate, make educated assumptions regarding, and/or otherwise process received and stored data via one or more data comparisons (e.g., utilizing stored rules, logic, and/or instructions such as the example rule set 342 of FIG. 3D).

According to some embodiments, the method 400 may comprise assigning a unique identifier, at 412. The various overlapping and/or conflicting structures from the example at 410, for example, may each be assigned a unique identifier—e.g., a "certified location" identifier, such as the certified location certificate number 344b-2 of FIG. 3B and/or FIG. 3C and/or the location ID field 344a-1 of FIG. 3A. In some embodiments, such as in the case that multiple apartments or even rooms in a building are disambiguated (e.g., at 410), the unique certified location identifier may be assigned (and/or may be unique) for each such room, apartment, etc. According to some embodiments, identifiers (e.g., unique identifiers) may be stored for every distinguishable polygon and/or point representing various geographic locations (e.g., for every value subject). In some embodiments, the assigning may comprise storing (e.g., in a database device, such as the database 140 of FIG. 1 and/or in a data storage structure such as one or more of the example data storage structures 340a-c of FIG. 3A, FIG. 3B, and/or FIG. 3C) information defining data storage relationships between (a) the street address data and the land parcel data, (b) the land parcel data and the structure data, and one or more of (c) the land parcel data and the coordinate data, and (d) the structure data and the coordinate data. In some embodiments, relationships may be automatically and/or electronically constructed based on the underlying location data. Land parcel data may be stored with indication of which street addresses correspond to a particular land parcel, for example, and/or street addresses may be stored with indications of which land parcel(s) corresponds to a particular street address. Similarly, land parcel data may be stored with indication of which structures are located on (or at least partially on) a particular land parcel, and/or structure data may be stored with indications of which land parcels are associated with a particular structure. In some embodiments, coordinates associated with a particular structure and/or land parcel may be stored in relation to the particular structure and/or land parcel. Various vertex, centroid, edge, border, and/or other coordinate points (e.g., the vertices 212 and/or the points 214 of FIG. 2A and/or FIG. 2C) descriptive of a structure and/or parcel may, for example, be stored in a database record associated with the given structure and/or parcel.

In some embodiments, the method 400 may comprise determining location relationships, at 414. The determining may comprise, for example, determining (e.g., based on the defined data storage relationships and/or the unique identifier(s) assigned at 412) which of a plurality of objects (e.g., customers, structures, value subjects, rooms, apartments) are at least one of: (1) located on the same land parcel, and (2) located in the same building. According to some embodiments, the location data may be stored in such a manner that information defining any pertinent aspect of a location may be utilized to determine any other pertinent aspect of the location. For example, in the case that a street address is known or provided, any or all of a land parcel and structure for that particular location (e.g., a certified location/value subject) may be identified utilizing the stored relationships (e.g., stored and/or defined at 404). In some embodiments, the relationships and/or the determining may comprise utilization of the coordinate information. In the case that a coordinate of a street address and/or customer location is known and/or provided (e.g., via a mobile computing device), for example, the coordinate information stored with respect to the land parcels and/or structures may be queried to determine which land parcel(s) and/or which structure(s) correspond to the provided coordinate. In the case that a range of coordinates (and/or elevation data) are stored with respect to a particular structure, such as vertex coordinates for example, a query coordinate may be compared to the structure coordinates (e.g., via a calculation, by analyzing the range of structure coordinates, by analyzing a matrix of structure coordinates, and/or any combination thereof) to determine if the query coordinate is descriptive of the structure. In some embodiments, such as in the case that a provided and/or available coordinate is utilized to identify a customer, parcel, structure, and/or address, but does not fall within the boundaries of the parcel and/or structure (e.g., the coordinate falls in or on a nearby street or sidewalk), the determining may comprise analyzing the proximity of the coordinate to other coordinates stored in association with nearby parcels and/or structures (e.g., to determine which parcel and/or structure is most likely to be represented by the coordinate). In some embodiments, one or more stored rules, logic processes, instructions, and/or programs may be utilized to determine the location relationships utilizing various available location data (e.g., utilizing stored rules, logic, and/or instructions, such as the example rule set 342 of FIG. 3D).

In such a manner, for example, it may be determined which customers (and/or other individuals or entities) share common spaces such as land parcels and/or structures. As described herein, commonality of parcel and/or structure association between customers may be utilized to inform, facilitate, and/or conduct various business processes. In one example utilized throughout herein, an insurance company may utilize knowledge of common customer attributes (e.g., mailing address, parcel ID, structure ID, zip code, floor, and/or elevation) to determine (i) how many customers exist in the same building (or on the same parcel of land), (ii) how much insurance risk has been underwritten for a given structure, parcel, and/or other value subject, (iii) whether an underwriting product for a particular structure/parcel/value subject should be written (e.g., based on current exposure and/or risk), (iv) claim/loss data for a given structure/parcel/ value subject, and/or (v) one or more prospective customers (e.g., in relation to one or more customers already underwritten in a particular building and/or on a particular parcel). In some embodiments, business decisions, such as underwriting, pricing, risk, and/or claim/loss decisions, may be based on a plurality of identifiable structures, land parcels, and/or other value subjects (e.g., based on certified location and/or value subject data) that are of particular interest— e.g., a group of buildings may be analyzed together and/or a city block may be analyzed as a whole (i.e., a particular value subject). In some embodiments, stored relationships utilized to determine certified locations may be determined with reference to one or more particular database and/or data storage structures via which such stored relationships are defined.

Figure 5A:
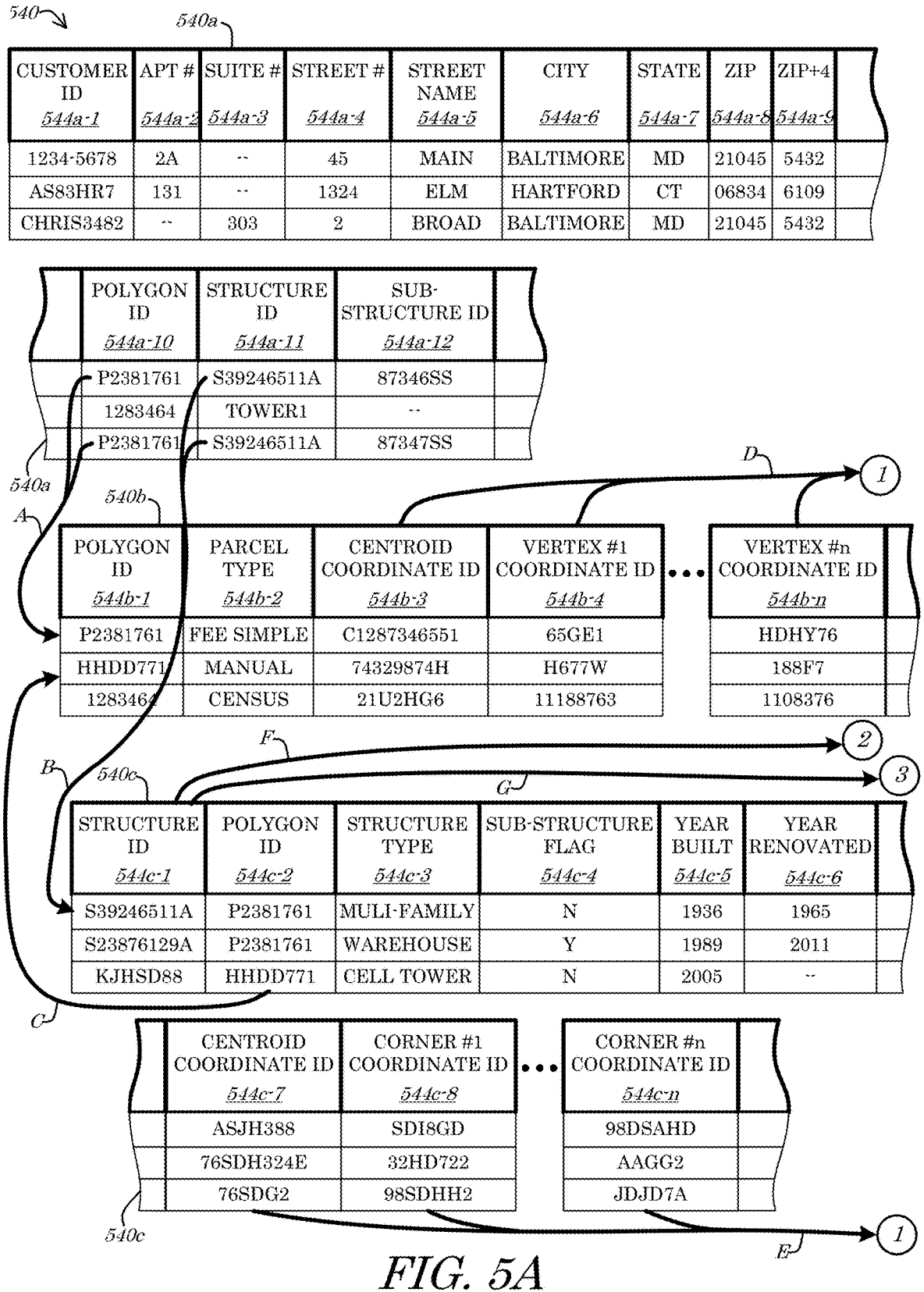
FIG. 5A and FIG. 5B are diagrams of an example data storage structure according to some embodiments.
Figure 5B:
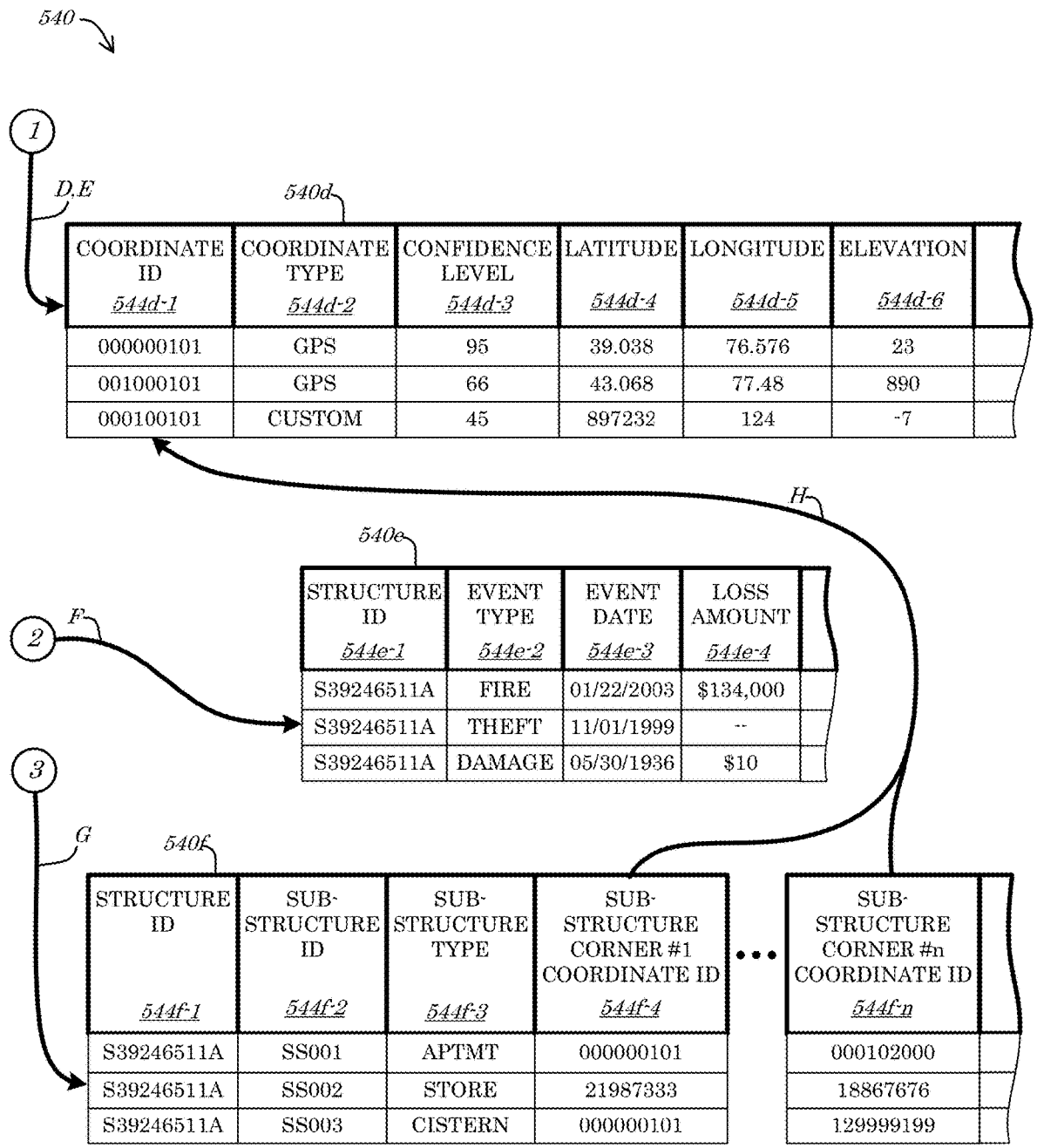

Referring to FIG. 5A and FIG. 5B, for example, diagrams of an example data storage structure 540 according to some embodiments are shown. In some embodiments, the data storage structure 540 may comprise a plurality of data tables such as a customer table 540a, a polygon table 540b, a structure table 540c, a coordinate table 540d, a structure history table 540e, and/or a sub-structure table 540f. The data tables 540a-f may, for example, be utilized (e.g., at 404 of the method 400 of FIG. 4) to store location, value subject, and/or certified location information.

The customer table 540a may comprise, in accordance with some embodiments, a customer IDentifier (ID) field 544a-1, an apartment number field 544a-2, a suite number field 544a-3, a street number field 544a-4, a street name field 544a-5, a city field 544a-6, a state field 544a-7, a zip code field 544a-8, a zip+4 field 544a-9, a polygon ID field 544a-10, a structure ID field 544a-11, and/or a sub-structure ID field 544a-12. Any or all of the ID fields 544a-1, 544a-10, 544a-11, 544a-12 may generally store any type of identifier that is or becomes desirable or practicable (e.g., a unique identifier, an alphanumeric identifier, and/or an encoded identifier). As an example of how the example data structure 540 may be utilized in accordance with some embodiments, the first and third records in the customer table 540a (i.e., customers "1234-5678" and "CHRIS3482") may correspond to the second and fourth customer locations 218-2, 218-4 of the example location 200 of FIG. 2A and FIG. 2B herein. It can be readily determined from the data in the customer table 540a that the two customers have different street/mailing addresses, albeit in the same city. An advantage of the example data structure 540 is that by utilizing the polygon ID field 544a-10, structure ID field 544a-11, and/or sub-structure ID field 544a-12, it may be readily determined that even though the addresses of the customers are different, they reside and/or do business in the same building (and on the same parcel of land).

The polygon table 540b may comprise, in accordance with some embodiments, a polygon ID field 544b-1, a parcel type field 544b-2, a centroid coordinate ID field 544b-3, a first vertex coordinate ID field 544b-4, and/or an 'n$^{th}$' vertex coordinate ID field 544b-n. The structure table 540c may comprise, in accordance with some embodiments, a structure ID field 544c-1, a polygon ID field 544c-2, a structure type field 544c-3, a sub-structure flag field 544c-4, a year built field 544c-5, a year renovated field 544c-6, a centroid coordinate ID field 544c-7, a first corner coordinate ID field 544c-8, and/or an 'n$^{th}$' corner coordinate ID field 544c-n. In some embodiments, such as in the case that different data for the year built field 544c-5 is gathered from different sources (e.g., different customers) with respect to the same structure, the data may be analyzed to determine various attributes of the year the structure was built such as, but not limited to: which year built data is likely to be correct, what the average year built is based on stored data, and/or whether the stored data is indicative of any events such as renovations (e.g., that has incorrectly been stored as an indication of what year the structure was erected). In some embodiments, the coordinate fields 544c-7, 544c-8, 544c-n may also or alternatively comprise a single field storing a representative (e.g., "best" available point) and/or aggregate point and/or coordinate value. However the point/coordinate information is stored in the polygon table 540b, the information may generally represent and/or define one or more polygons associated with and/or defining one or more parcels.

The coordinate table 540d may comprise, in accordance with some embodiments, a coordinate ID field 544d-1, a coordinate type field 544d-2, a confidence level field 544d-3, a latitude field 544d-4, a longitude field 544d-5, and/or an elevation field 544d-6. The structure history table 540e may comprise, in accordance with some embodiments, a structure ID field 544e-1, an event type field 544e-2, an event date field 544e-3, and/or a loss amount field 544e-4. The sub-structure table 540f may comprise, in accordance with some embodiments, a structure ID field 544f-1, a sub-structure ID field 544f-2, a sub-structure type field 544f-3, a sub-structure first corner coordinate ID field 544f-4, and/or a sub-structure 'n$^{th}$' corner coordinate ID field 544f-n.

In some embodiments, certified locations and/or value subjects may be defined by relationships established between two or more of the data tables 540a-f. As depicted in the example data storage structure 540, for example, a first relationship "A" may be established between the customer table 540a and the polygon table 540b. In some embodiments (e.g., as depicted in FIG. 5A), the first relationship "A" may be defined by utilizing the polygon ID field 544a-10 as a data key linking to the polygon ID field 544b-1. According to some embodiments, the first relationship "A" may comprise any type of data relationship that is or becomes desirable, such as a one-to-many, many-to-many, or many-to-one relationship. In the case that multiple customers are likely to reside and/or do business at a particular polygon (e.g., a particular land parcel and/or value subject), the first relationship "A" may comprise a many-to-one relationship (e.g., many customers per single polygon/parcel—such as the two customer records in the customer table 540a that are depicted as linking to the polygon table 540b via the first relationship "A"). In such a manner, for example, a customer and/or the customer's address may be associated and/or linked with one or more underlying polygons/land parcels/value subjects. While the example first relationship "A" represents a link and/or relationship between one or more customer and one or more certified locations and/or value subjects, in accordance with some embodiments, customer information and/or relationships may not be necessary and/or desired. Certified location and/or value subject information may be utilized without customer information, for example, to determine, plan, inform, and/or facilitate various processes such as may be implemented by various types of organizations (e.g., utility companies, municipalities, banking institutions, etc.) —e.g., by purchasing access to such data accessible via an interface provided in accordance with some embodiments herein (such as the interfaces 620, 920, 1520 of FIG. 6, FIG. 9, and/or FIG. 15 herein).

According to some embodiments, a second relationship "B" may be established between the customer table 540*a* and the structure table 540*c*. In some embodiments (e.g., as depicted in FIG. 5A), the second relationship "B" may be defined by utilizing the structure ID field 544*a*-11 as a data key linking to the structure ID field 544*c*-1. According to some embodiments, the second relationship "B" may comprise any type of data relationship that is or becomes desirable, such as a one-to-many, many-to-many, or many-to-one relationship. In the case that multiple customers are likely to reside and/or do business in a particular structure/building/value subject, the second relationship "B" may comprise a many-to-one relationship (e.g., many customers per single structure/value subject—such as the two customer records in the customer table 540*a* that are depicted as linking to the structure table 540*c* via the second relationship "B"). In such a manner, for example, a customer and/or the customer's address may be associated and/or linked with one or more particular structures/value subjects.

Utilizing the first and second relationships, "A" and "B", it may accordingly be possible to readily identify for any particular customer and/or address (or other provided location information such as points, lines, and/or polygons) one or more specific land parcels, value subjects, and/or one or more specific buildings associated therewith. In such a manner, for example, the identity and/or number of customers residing at a particular parcel/value subject/building may be determined (e.g., at 406 of the method 400 of FIG. 4). In some embodiments, such as in the case that the structure table 540*c* comprises the polygon ID field 544*c*-2, a third relationship "C" may also or alternatively be utilized to link particular structures to particular polygons/value subjects/land parcels. In some embodiments, the third relationship "C may be utilized in addition to or in place of the second relationship "B".

In some embodiments, a fourth relationship "D" may be established between the polygon table 540*b* and the coordinate table 540*d* (depicted as linking between FIG. 5A and FIG. 5B via the numeral "1"). In some embodiments (e.g., as depicted in FIG. 5A and FIG. 5B), the fourth relationship "D" may be defined by utilizing any or all of the various coordinate ID fields 544*b*-3, 544*b*-4, 544*b*-*n* as a data key linking to the coordinate ID field 544*d*-1. According to some embodiments, the fourth relationship "D" may comprise any type of data relationship that is or becomes desirable, such as a one-to-many, many-to-many, or many-to-one relationship. In the case that polygons/value subjects/parcels are likely to have unique centroids, the fourth relationship "D" utilizing the centroid coordinate ID 544*b*-3 may comprise a one-to-one relationship. In the case that multiple polygons/value subjects/parcels are likely to share coordinates (e.g., adjoining polygons/value subjects/land parcels such as the first and second polygons 210*a-b* of FIG. 2A, FIG. 2B, FIG. 2C, and/or FIG. 2D), the fourth relationship "D" may comprise a many-to-one relationship. In such a manner, for example, a polygon/value subject/parcel may be associated and/or linked with one or more coordinates. As described in accordance with some embodiments herein, the coordinates associated with a polygon/value subject/land parcel may be utilized to establish and/or verify relationships between the polygon/value subject/parcel and one or more customers, addresses, points/coordinates, and/or structures (and/or sub-structures), and/or any combinations thereof.

In some embodiments, a fifth relationship "E" may be established between the structure table 540*c* and the coordinate table 540*d* (depicted as linking between FIG. 5A and FIG. 5B via a second depiction of the numeral "1"). In some embodiments (e.g., as depicted in FIG. 5A and FIG. 5B), the fifth relationship "E" may be defined by utilizing any or all of the various coordinate ID fields 544*c*-7, 544*c*-8, 544*c*-*n* as a data key linking to the coordinate ID field 544*d*-1. According to some embodiments, the fifth relationship "E" may comprise any type of data relationship that is or becomes desirable, such as a one-to-many, many-to-many, or many-to-one relationship. In the case that structures are likely to have unique centroids, the fifth relationship "E" utilizing the centroid coordinate ID 544*c*-7 may comprise a one-to-one relationship. In the case that multiple structures are likely to share coordinates (e.g., adjoining structures such as the second and third structures 216*a*-2, 216*b* of FIG. 2A, FIG. 2B, FIG. 2C, and/or FIG. 2D), the fifth relationship "E" may comprise a many-to-one relationship. In such a manner, for example, a structure may be associated and/or linked with one or more coordinates. As described in accordance with some embodiments herein, the coordinates associated with a structure may be utilized to establish and/or verify relationships between the structure and one or more customers, addresses, polygons, value subjects, parcels, and/or sub-structures.

According to some embodiments, a sixth relationship "F" may be established between the structure table 540*c* and the structure history table 540*e* (depicted as linking between FIG. 5A and FIG. 5B via the numeral "2"). In some embodiments (e.g., as depicted in FIG. 5A and FIG. 5B), the sixth relationship "F" may be defined by utilizing the structure ID field 544*c*-1 as a data key linking to the structure ID field 544*e*-1. According to some embodiments, the sixth relationship "F" may comprise any type of data relationship that is or becomes desirable, such as a one-to-many, many-to-many, or many-to-one relationship. In the case that a structure is likely to have multiple historical events associated therewith, the sixth relationship "F" may comprise a one-to-many relationship. In the case that multiple structures are likely to share certain historical events (e.g., adjoining structures such as the second and third structures 216*a*-2, 216*b* of FIG. 2A, FIG. 2B, FIG. 2C, and/or FIG. 2D may be affected by a single fire, earthquake, etc.), the sixth relationship "F" may comprise a many-to-many relationship. In such a manner, for example, a structure may be associated and/or linked with various historical events that may be readily determined via the sixth relationship "F".

In some embodiments, a seventh relationship "G" may be established between the structure table 540*c* and the sub-structure table 540*f* (depicted as linking between FIG. 5A and FIG. 5B via the numeral "3"). In some embodiments (e.g., as depicted in FIG. 5A and FIG. 5B), the seventh relationship "G" may be defined by utilizing the structure ID field 544*c*-1 as a data key linking to the structure ID field 544*f*-1. According to some embodiments, the seventh relationship "G" may comprise any type of data relationship that is or becomes desirable, such as a one-to-many, many-to-many, or many-to-one relationship. In the case that a structure is likely to have multiple sub-structures (but a sub-structure is likely to exist only within a single particular structure), the seventh relationship "G" may comprise a one-to-many relationship. In such a manner, for example, a structure may be associated and/or linked with various sub-structures that may be readily determined via the seventh relationship "G".

According to some embodiments, an eighth relationship "H" may be established between the sub-structure table 540*f* and the coordinate table 540*d*. In some embodiments (e.g., as depicted in FIG. 5B), the eighth relationship "H" may be defined by utilizing the coordinate ID field 544*d*-1 as a data key linking to either or both of the sub-structure first corner coordinate ID field 544*f*-4 and the sub-structure '$n^{th}$' corner coordinate ID field 544*f*-*n*. According to some embodiments, the eighth relationship "H" may comprise any type of data relationship that is or becomes desirable, such as a one-to-many, many-to-many, or many-to-one relationship. In the case that a sub-structure is likely to have multiple associated coordinates, the eighth relationship "H" may comprise a many-to-one relationship. In such a manner, for example, a sub-structure may be associated and/or linked with various coordinates that may be readily determined via the eighth relationship "H". In some embodiments, a sub-structure may comprise a value subject—e.g., a particular fire-segmented portion of a building.

In some embodiments, fewer or more data fields than are shown may be associated with the data tables 540*a*-*f*. Only a portion of one or more databases and/or other data stores is necessarily shown in any of FIG. 5A and/or FIG. 5B, for example, and other database fields, columns, structures, orientations, quantities, and/or configurations may be utilized without deviating from the scope of some embodiments. According to some embodiments, such as in the case that addresses are desired to be linked to polygons, parcels, and/or structures while retaining flexibility to associate different customers with various addresses, a separate address table (not shown) may be utilized. Further, the data shown in the various data fields is provided solely for exemplary and illustrative purposes and does not limit the scope of embodiments described herein.

Figure 6:
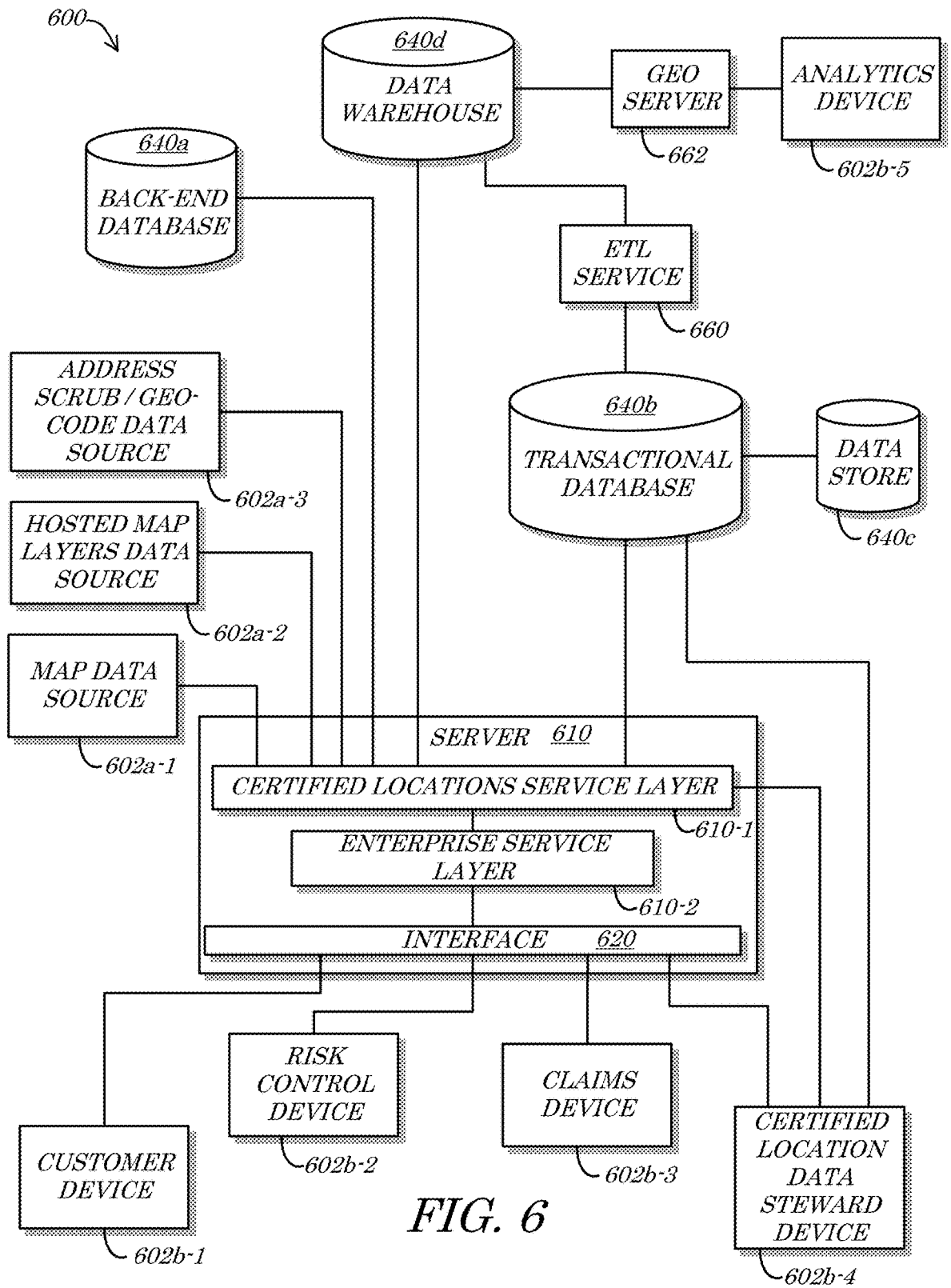
FIG. 6 is a block diagram of a system according to some embodiments.

Referring now to FIG. 6, a block diagram of a system 600 according to some embodiments is shown. In some embodiments, the system 600 may comprise a plurality of network devices 602*a*-*b* (such as data source devices 602*a* and/or user devices 602*b*), a server 610 (comprising a certified locations service layer 610-1, an enterprise services layer 610-2, and/or an interface 620), a plurality of databases 640*a*-*d*, an Extract Transform and Load (ETL) service 660, and/or a geo-server 662. According to some embodiments, any or all of the components 602*a*-*b*, 610, 620, 640*a*-*d*, 660, 662 of the system 600 may be similar in configuration and/or functionality to any similarly named and/or numbered components described herein. Fewer or more components 602*a*-*b*, 610, 620, 640*a*-*d*, 660, 662 and/or various configurations of the components 602*a*-*b*, 610, 620, 640*a*-*d*, 660, 662 may be included in the system 600 without deviating from the scope of embodiments described herein. While multiples of some components 602*a*-*b*, 640*a*-*d* are depicted and while single instances of other components 610, 620, 660, 662 are depicted, for example, any component 602*a*-*b*, 610, 620, 640*a*-*d*, 660, 662 depicted in the system 600 may comprise a single device, a combination of devices and/or components 602*a*-*b*, 610, 620, 640*a*-*d*, 660, 662, and/or a plurality of devices, as is or becomes desirable and/or practicable.

In some embodiments, the data source devices 602*a* may comprise one or more of a map data source 602*a*-1, a hosted map layers data source 602*a*-2, and/or an address scrubbing/geocoding data source 602*a*-3 which may, for example, be hosted by the certified locations service layer 610-1 (and/or the server 610). The certified locations service layer 610-1 may, for example, provide access, via the enterprise service layer 610-2 and/or interface 620, to one or more of the user devices 602*b* such as a customer device 602*b*-1, a risk control device 602*b*-2, a claims device 602*b*-3, and/or a certified location data steward device 602*b*-4. According to some embodiments, the certified locations service layer 610-1 (and/or the interface 620) may provide access to one or more of the databases 640*a*-*d*. The certified locations service layer 610-1 (and/or interface 620) may, for example, provide access to a back-end database 640*a*, a transactional database 640*b*, a data store 640*c*, and/or a data warehouse 640*d*. In some embodiments, access to the various data sources 602*a* and/or databases 640*a*-*d* may be limited and/or managed. The customer device 602*b*-1, risk control device 602*b*-2, and/or claims device 602*b*-3 may, for example, be permitted to query any or all of the various data sources 602*a* and/or databases 640*a*-*d*, but may only be able to write to (e.g., modify) the transactional database 640*b*. Certain devices (and/or users) such as the certified location data steward device 602*b*-4 may have expanded access to the system 600 and may be able to access the certified locations service layer 610-1 directly (e.g., instead of or in addition to having access via the enterprise services layer 610-2 and/or the interface 620) and/or may have write/edit access directly to the data warehouse 640*d*.

According to some embodiments, data descriptive of customer (and/or value subject) locations may be retrieved from the data sources 602*a* and/or may be entered via one or more of the network devices 602*b*. An insurance agent or data customer (and/or underwriter, actuary, and/or operations personnel) operating the customer device 602*b*-1 may, for example, enter and/or retrieve data descriptive of a location of a customer (and/or a location associated with an object desired to be insured by the customer—e.g., a value subject). In some embodiments, the location data may be stored in the transactional database 640*b*. In some embodiments, other data such as insurance policy data, coverage data, and/or underwriting rules or questions may be stored in the data store 640*c*. In such a manner, for example, the insurance agent or data customer (and/or Customer Service Representative (CSR) and/or underwriter, etc.) may access, retrieve, and/or define customer and/or value subject location information and utilize the system 600 to assess risk for, quote, and/or sell an underwriting and/or other type of product to the customer.

In some embodiments, the transactional database 640*b* may be interfaced with the data warehouse 640*d* on an intermittent basis (e.g., nightly) such as by utilizing the ETL service 660 to update the data warehouse 640*d* in a secure and controlled manner (e.g., based on the day's transactions stored in the transactional database 640*b*). According to some embodiments, the geo-server 662 may be utilized to translate data and/or provide access to the data warehouse 640*d* to a network device 602*b* such as an analytics device 602*b*-5. The analytics device 602*b*-5 may comprise a device configured to execute data mining, reporting, data visualization, and/or other data analysis tools. The analytics device 602*b*-5 may be utilized, for example, to determine relationships between customers, certified locations, value subjects, buildings, parcels, and/or to determine business-specific information such as (in the context of an insurance business) total realized losses for a particular parcel or structure, total risk or exposure for a particular parcel, value subject, and/or structure, to conduct data modeling, and/or to facilitate and/or conduct customer prospecting.

According to some embodiments, the system 600 may be utilized to determine and/or utilize certified location and/or value subject data as described in accordance with embodiments presented herein. In some embodiments, the system 600 may be utilized to dynamically determine and/or populate certified location and/or value subject data based on customer transactions (e.g., conducted by the customer device 602*b*-1). Incoming data may be compared to existing data to determine, for example, if data descriptive of a location already exists (e.g., in the transactional database 640*b* and/or the data warehouse 640*d*) or conflicts with previously stored information—e.g., a new customer provides address, point, line, and/or polygon information that is identical to a different and existing customer. In some embodiments, such comparisons and/or conflict determinations may be utilized to dynamically increase data granularity/specificity defining one or more certified locations and/or value subjects. In some embodiments, in the case that a location has already been certified, the certified location information may be utilized to reference other previously developed, stored, and/or purchased data.

Figure 7:
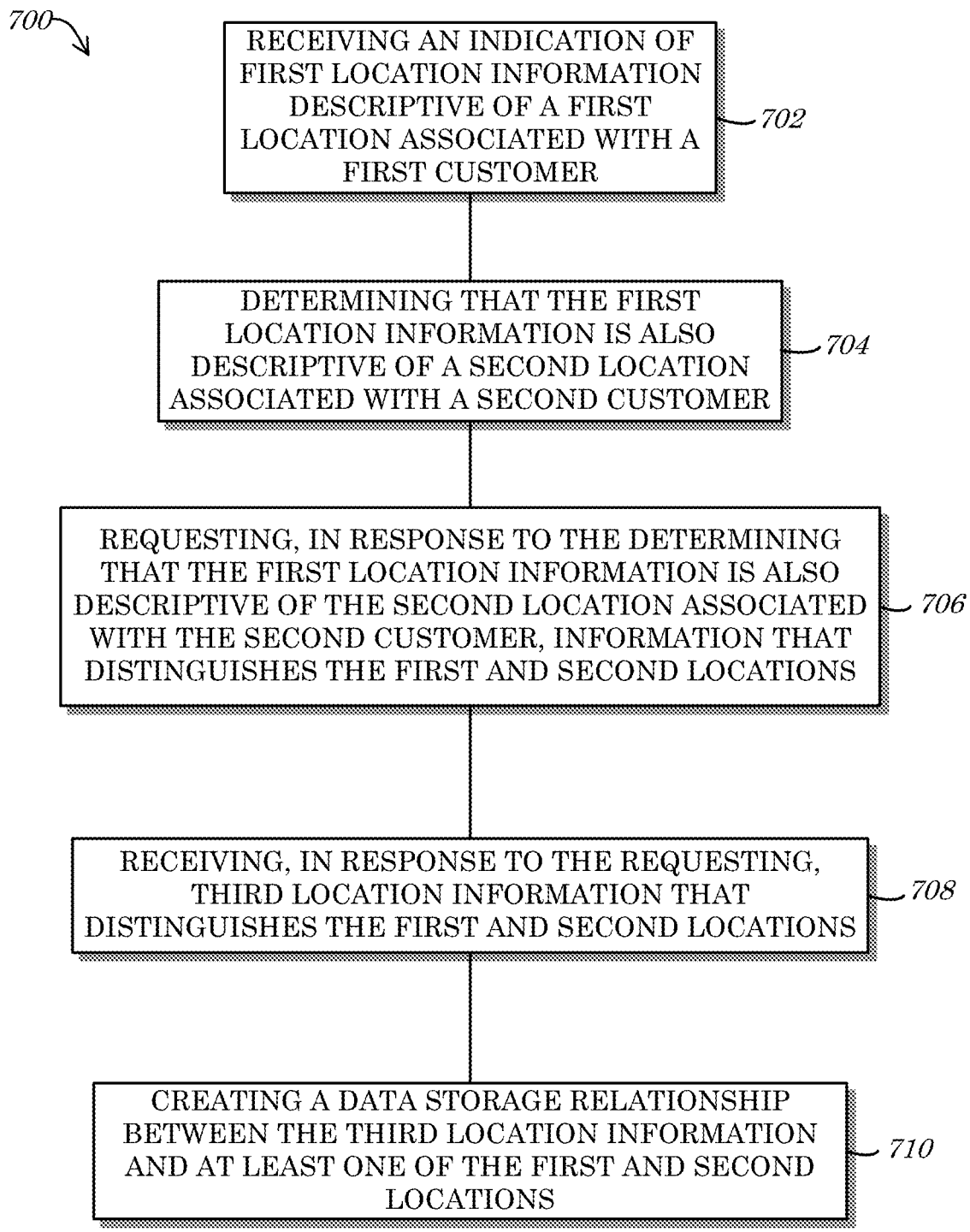
FIG. 7 is a flow diagram of a method according to some embodiments.

Turning to FIG. 7, for example, a flowchart of a method 700 according to some embodiments is shown. According to some embodiments, the method 700 may be implemented, facilitated, and/or performed by or otherwise associated with any of the systems 100, 600 of FIG. 1 and/or FIG. 6 herein. In some embodiments, the method 700 may be performed and/or implemented by and/or otherwise associated with one or more specialized and/or specially-programmed computers, computer terminals, computer servers, computer systems and/or networks, and/or any combinations thereof (e.g., by one or more third-party and/or insurance company and/or underwriter computers, such as, e.g., the location processing device 110 of FIG. 1).

According to some embodiments, the method 700 may comprise receiving an indication of first location information descriptive of a first location associated with a first customer, at 702. A customer seeking an insurance product may, for example, provide location and/or identifying information such as via a website interface and/or via a device operated by an insurance agent and/or customer service representative. In some embodiments, customer location information may be received from one or more mobile devices such as by receiving coordinate information from a mobile device operated by the customer, a field agent, and/or other personnel or entities at the desired customer location. According to some embodiments, information received from the customer may be utilized to query one or more data stores and/or data sources to determine location information of the customer. The first location information may be received from a variety of devices and/or sources such as the location data devices 102*a*-*n* of FIG. 1, the data source devices 602*a* and/or the customer device 602*b*-1, both of FIG. 6.

In some embodiments, the method 700 may comprise determining that the first location information is also descriptive of a second location associated with a second customer, at 704. A database such as the database 140 of FIG. 1 and/or the transactional database 640*b* or data warehouse 640*d* of FIG. 6 may, for example, be queried utilizing the first location information. Information corresponding to the first location information may accordingly be identified if already stored (e.g., with respect to a second location and/or second customer). In some embodiments, the descriptiveness may comprise a relationship of a certain degree, magnitude, and/or weight. In the case that a street address for the customer matches a street address for a customer record already stored in a database, for example, a first degree of matching may be determined. A second degree of matching may comprise, for example, a correspondence between a coordinate, parcel identifier, and/or structure identifier of the customers/locations. In some embodiments, such as in the case that the customer's name or other non-location information does not match that stored with respect to the identified matching location record, an initial presumption of conflicting location information may be identified (e.g., an initial presumption that the first and second customers are different individuals and/or entities). In the case that the customer name matches the one on record for the corresponding location information, a determination may be made that the customer is an existing customer (e.g., the first and second customers are the same) and/or that the first and second locations are the same.

According to some embodiments, the method 700 may comprise requesting (e.g., in response to the determining that the first location information is also descriptive of the second location associated with the second customer) information that distinguishes the first and second locations, at 706. In the case that identical information is already stored, an alert, message, and/or trigger may be initiated. An insurance agent (or the customer, if the customer is self-quoting a policy online) may be presented with a pop-up message and/or prompt, for example, requesting that the agent (and/or customer) verify that the first customer and/or the first customer's location is different than the second customer and/or the second customer's location. In some embodiments, if it is determined that the first and second customers and/or locations are different, the distinguishing information may be requested and/or actively sought (e.g., by querying data sources and/or by dispatching a field agent request for more detailed information). According to some embodiments, the distinguishing information requested and/or sought may comprise a specific type and/or piece of information. In the case that both customers' street address match, for example, structure information (e.g., suite, apartment number, floor, elevation, building color, façade type, etc.) may be requested/sought to determine if the customers are located within the same building.

In some embodiments, the method 700 may comprise receiving (e.g., in response to the requesting) third location information that distinguishes the first and second locations, at 708. The insurance agent, customer (first or second customer), an underwriter, and/or a third-party data source or supplier may, for example, provide the third location information to a central system (e.g., via a website, workstation, and/or mobile device). In some embodiments, such as in the case that the first customer and/or agent are utilizing a mobile device at the first location, the requesting at 706 and the receiving at 708 may be conducted automatically and/or without input from the customer and/or agent. An application running on the mobile device may automatically interface with a central system, for example, to provide necessary third location information such as coordinate, elevation, directional, and/or other information. In some embodiments, the customer and/or agent may send (and a central system may receive) photographs, pictures, and/or images of the location. The photos may be utilized to distinguish the first and second locations such as in the case that photos and/or descriptions of the second location are already stored and can be readily compared to the newly-received photos to identify differences between the locations. In some embodiments, image processing may be conducted to electronically distinguish the locations based on received photos (and/or other received distinguishing data).

According to some embodiments, the method 700 may comprise creating a data storage relationship between the third location information and at least one of the first and second locations, at 710. In the case that the third location information is descriptive of the first location (e.g., and is received from the first customer and/or an agent working with the first customer), for example, the third location information may be stored in a transactional database (e.g., the transactional database 640b of FIG. 6) of an insurance company system to distinguish the first and second locations. In such a manner, for example, less detailed levels of location information may be required in a processing system until a conflict or question is identified regarding the described location. For example, in the case that an existing customer has provided a street name and number defining address information for a location, no further detail or granularity of data may be required to be entered into a system. Upon entry of a new customer into the system, however, the newly entered information may be compared to the existing information to identify any potential conflicts. If a conflict or match exists and it is determined that the new customer is not the same as the existing customer, the granularity of stored data for either or both of the locations/customers may be required to be increased. Apartment numbers, structure identifiers and/or attributes, suite numbers, floor numbers, directional attributes (e.g., North-side, west wing), and/or coordinates may, for example, be required to uniquely identify the customers. As some or all of these more detailed levels of location information may be more time-consuming, expensive, and/or difficult to obtain, it may be desirable to only require their entry in the case of an identified conflict—thus reducing costs associated with a certified location system in accordance with embodiments described herein.

Figure 8:
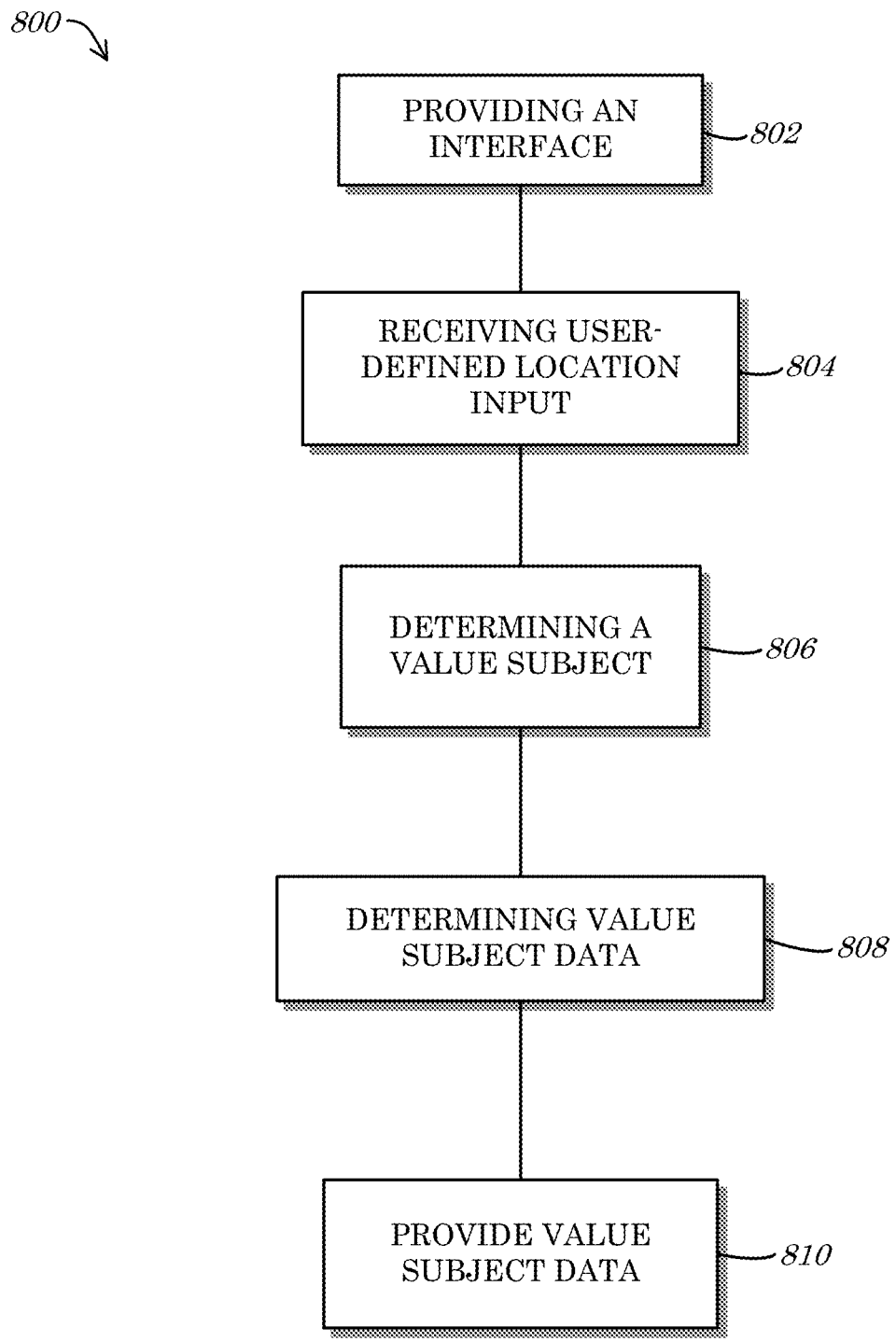
FIG. 8 is a flow diagram of a method according to some embodiments.

Referring now to FIG. 8, a flowchart of a method 800 according to some embodiments is shown. According to some embodiments, the method 800 may be implemented, facilitated, and/or performed by or otherwise associated with any of the systems 100, 600 of FIG. 1 and/or FIG. 6 herein. In some embodiments, the method 800 may be performed and/or implemented by and/or otherwise associated with one or more specialized and/or specially-programmed computers, computer terminals, computer servers, computer systems and/or networks, and/or any combinations thereof (e.g., by one or more third-party and/or insurance company and/or underwriter computers, such as, e.g., the location processing device 110 of FIG. 1). In some embodiments, the method 800 may be executed, conducted, and/or facilitated by and/or via an interface, such as the interfaces 620, 920, 1520 of FIG. 6, FIG. 9, and/or FIG. 15 herein.

According to some embodiments, the method 800 may comprise providing (e.g., by a processing device and/or via a GUI and/or an electronic communications network) an interface, at 802. The interface may, for example, comprise a graphical depiction of a geographical area, such as a map interface. In some embodiments, the interface may be provided via a website and/or mobile device application and/or other software program. The interface may, in some embodiments, automatically display a graphical depiction of a geographical area in which a user (and/or user device) is located. According to some embodiments, the interface may display representations of various certified location data, such as parcels, structures, buildings, etc.

In some embodiments, the method 800 may comprise receiving (e.g., by the processing device and/or via the GUI and/or the electronic communications network) an indication of a user-defined location, at 804. The user-defined location may comprise, for example, a point, line, and/or polygon input by the user via a provided interface (e.g., the interface provided at 802). In some embodiments, the user input may comprise touch screen, mouse, other pointer, and/or other drawing input that designates one or more points and/or pixels as desired location indicators. According to some embodiments, the user input may comprise a plurality of points, lines, line segments, shapes, and/or other drawing input that defines an area (or areas) of interest for defining a value subject and/or for acquiring value subject (or other) data. In some embodiments, the user input may be provided via a user and/or network device to an application, web page, and/or server (e.g., via the interface). The user input may comprise, for example, input via the interface that is provided on (e.g., on top of, over, and/or as a layer of) the display of the graphical depiction of a geographical area, such that the input, for example, indicates one or more real-world locations (e.g., geo-spatial points and/or areas). In some embodiments, the indication may be received from a third-party. In some embodiments, the user input may comprise an indication of a particular elevation and/or data layer.

According to some embodiments, the method 800 may comprise determining (e.g., by the processing device and/or via the GUI and/or the electronic communications network) a value subject, at 806. Based on the received user input and/or user-defined location data, for example, one or more relevant value objects may be identified, defined, and/or otherwise determined. In some embodiments, the user input may be utilized for one or more of two different (but related) purposes. First, for example, the user input (e.g., the user-defined location and/or indication thereof) may be utilized to identify any value subjects for which data may already be stored and/or which themselves are already defined. In the case that a user indicates a point that is within a predetermined threshold distance from a known value subject (and/or point, line, boundary, etc., thereof), for example, that value subject (e.g., the closest known value subject to the location identified by the user) may be identified. In some embodiments, logic, rules, and/or procedures similar to those described herein with respect to resolving whether user input matches and/or indicates a particular certified location may be utilized to determine whether a known value subject is reasonably indicated by the user input and/or to identify which of a plurality of known value subjects is most likely being indicated by the user. According to some embodiments, a user may expressly indicate a selection of a particular pre-defined value subject such as by clicking (or otherwise selecting) an interface element that displays a graphical representation of the value subject. In some embodiments, such as in the case that the user input comprises elevation and/or layer data or indications, a value subject may be determined by interrogating a three-dimensional model and/or data store, such as a digital elevation model. A first value subject at a particular certified location may be associated with or correspond to a first elevation at the location, for example, while a second (e.g., different) value subject at the particular certified location may be associated with or correspond to a second (e.g., different) elevation at the location.

Second, for example, the user input (e.g., the user-defined location and/or indication thereof) may be utilized to define one or more value subjects. In the case that the user input is known or determined not to be indicative of any known value subject, for example, a new value subject may be defined based on the user input. The user input may comprise a drawing of a boundary and/or shape such as a polygon on a provided GUI, for example, and the bounded area may define the boundaries of a new value subject. According to some embodiments, the definition of value subject points, lines, boundaries, and/or areas (e.g., polygons) may be conducted in accordance with one or more rules and/or preference settings. User-drawn lines or points, for example, may be "snapped" to a grid, coordinate grid, and/or location features or attributes such as building corners, lot lines, parcel boundaries, flood plain boundaries, roadway boundaries, etc. According to some embodiments, the value subject defined (or identified) by the user input may comprise a provisional, draft, proposed, and/or initial (e.g., first) value subject (e.g., later to be modified, altered, and/or adjusted).

In some embodiments, the method 800 may comprise determining (e.g., by the processing device and/or via the GUI and/or the electronic communications network) value subject data, at 808. In the case that the user-defined location data is utilized to identify or select one or more known value subjects at 806, for example, data stored in association with the known value subject may be retrieved from data storage. In some embodiments, such retrieval may require data transformation and/or manipulation. The value subject data may be stored, for example, in one or more databases, such as a third-party database, in a particular format. Typical stored location data, for example, requires a street address as a key and/or query term to locate appropriate corresponding data. According to some embodiments, such as in the case that the user-defined location data is not presented in the same form or format required for querying the database (e.g., a vendor database), the user-defined data may be transformed and/or mapped to an appropriate format for conducting one or more queries. User input received via the interface may simply comprise graphical points, lines, and/or polygons overlaid on a map of a geographical area, for example. In some embodiments, the points, lines, and/or polygons may be converted to and/or assigned to one or more geospatial and/or geo-referenced coordinates such as a latitude and longitude coordinate, a GPS coordinate, and/or a certified location certificate, number, identifier, etc. The assigned geospatial coordinates/data may, in some embodiments, be utilized to determine one or more address and/or other locational information that are required as keys and/or search or query terms to appropriately access and/or search the desired database schema. The location keys and/or converted location data may then, for example, be utilized to conduct one or more queries to determine the value subject data appropriately associated with the user-defined and/or indicated value subject(s).

In some embodiments, such as in the case that the user-defined location data is utilized to define one or more new value subjects at 806, for example, data stored in association with certified (and/or other) locations associated with the new value subject may be determined. The coordinate boundaries of the new value subject may be determined, for example, and utilized to query various data stored in one or more databases, such as historical claim loss data, weather data, crime reports, etc. In some embodiments, such as in the case that differing data types and/or values are applicable to the user-defined value subject (e.g., the user input polygon includes portions of two land parcels and/or two different buildings), data totals, maximums, averages, minimums, medians, and/or other statistical and/or mathematical metrics based on the underlying data may be determined to be applicable with respect to the user-defined value subject. Values of various data variables applicable to locations encompassed by the value subject, for example, may be aggregated, analyzed, and/or otherwise processed.

According to some embodiments, the method 800 may comprise providing (e.g., by the processing device and/or via the GUI and/or the electronic communications network) the value subject data, at 810. The data determined to be associated with the identified and/or defined value subject, for example, may be provided to one or more end-users, such as via the interface (e.g., provided at 802). In some embodiments, different data types and/or values may be represented via the graphical depiction of the geographical area as different layers, colors, and/or other graphical attributes (e.g., different data heights or 'elevations'). In such a manner, for example, value subject data for user-selected and/or defined value subjects may be readily (and accurately) identified and provided to end-users, such as to facilitate various business decisions and/or processes (such as value subject risk assessment). In some embodiments, the end-user may be charged for access to and/or for the provision of the value subject data. The method 800 may comprise, in accordance with some embodiments for example, a value subject and/or certified location data sales portal method.

Figure 9:
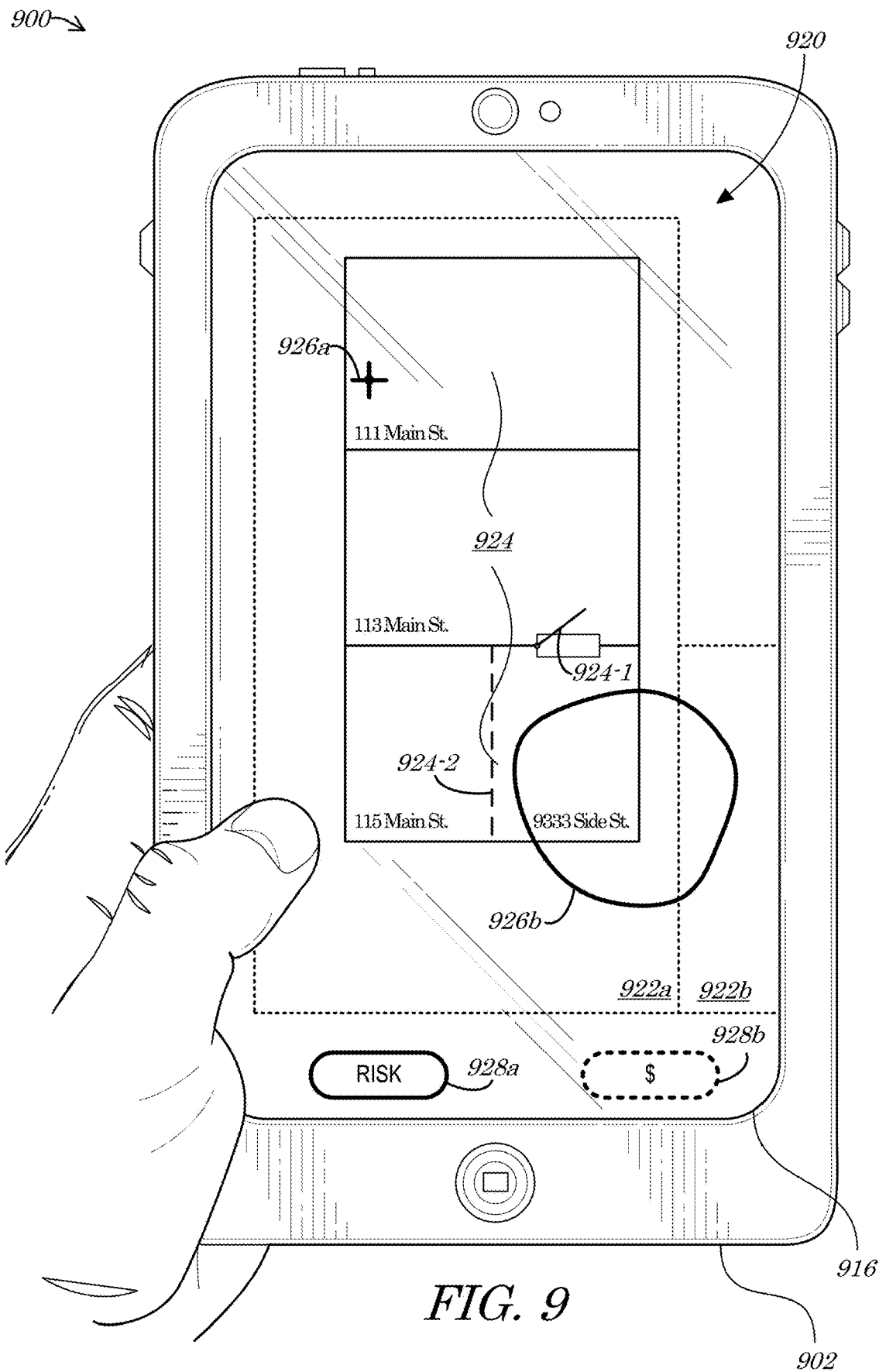
FIG. 9 is a diagram of a system according to some embodiments.

Referring now to FIG. 9, a diagram of a system 900 according to some embodiments is shown. In some embodiments, the system 900 may comprise a user device 902 comprising a display device 916 that outputs an interface 920. The interface 920 may, for example, comprise graphical representations of one or more land parcels 922*a-b* and/or a structure 924 (e.g., being situated on a first land parcel 922*a*). In some embodiments, a user (not explicitly shown, at least in full, in FIG. 9) of the system 900 and/or the user device 902 may provide input 926*a-b* via the interface 920. In the case that the display device 916 is configured to accept input, such as a touch screen display device and/or touch-enabled display device, for example, as well as provide output, the user may provide input 926*a-b* via the display device 916 and/or via the interface 920 displayed thereby. In the case that the display device 916 is configured only as an output device, the user may interact with and/or control an application executed by the user device 902 to define input 926*a-b* to the interface 920.

In some embodiments, the user input 926*a-b* may comprise point input 926*a*. The point input 926*a* may, for example, comprise a point defined and/or selected by the user via the interface 920. In some embodiments, the point input 926*a* may be provided (and accordingly received by the user device 902) as an indication of a location for which the user desires to acquire data. In the case of certified locations and/or certified location data as described herein, for example, the user may choose the point input 926*a* as a representation of a location for which various available data is desired. According to some embodiments, the point input 926*a* may be utilized (e.g., by a processing device as described herein) to look up relevant data associated with the indicated location. In some embodiments, the point input 926*a* may be utilized to identify a value subject for which the user desires data and/or for which the user desires to perform a risk assessment. In the example of FIG. 9, the point input 926*a* may, for example, be determined to indicate that data is desired for a value object comprising the address "111 Main Street". As depicted, the associated street address (such as a business or residence) actually resides in the same building 924 as several other addresses, even an address with a different street name.

According to some embodiments, such as described herein with respect to certified location data processing and/or analysis, the value subject determined to be associated with the point input 926*a* may be determined to comprise various extents (e.g., boundaries) based on stored rules and/or preferences. In the case that the user desires to perform a risk assessment for the indicated address with respect to fire and/or business operations, for example, it may be determined that the address "111 Main Street", while residing in the same building 924 as "113 Main Street", "115 Main Street", and "9333 Side Street", is separated by fire-rated walls from the other addresses (e.g., the solid building lines in FIG. 9), and accordingly should be assessed individually, without respect to characteristics or data descriptive of the other addresses. In other words, the value subject associated with the point input 926a may be determined to be defined by the boundaries of the address "111 Main Street". In other cases, different rules may produce different results establishing and/or identifying different bounds for an associated value subject(s).

In some embodiments, for example, the user may provide (and such may accordingly be received by the user device 902) polygon input 926b. The polygon input 926b may comprise, for example, a free-hand drawn and/or input shape of the interface 920 (e.g., defined by the user). According to some embodiments, the polygon input 926b may overlap, cross, and/or intersect multiple features of the interface 920 such as both the first land parcel 922a and the second land parcel 922b as well as the structure 924 and the street address "9333 Side Street". In some embodiments, the polygon input 926b may define an area for which the user desires data. In such cases, the polygon data 926b may be utilized (e.g., by the user device 902) to determine appropriate data that corresponds to any points or areas encompassed by the polygon input 926b. The user device 902 may, for example, retrieve data corresponding to weather event data for both land parcels 922a-b, structural damage data for the structure 924, and/or gross sales receipts data for a business operating at "9333 Side Street". In some embodiments, the polygon input 926b may define a new value subject. In such embodiments, the data determined to be relevant to the bounded area may be analyzed with respect to one or more various risks (or overall risk). In some embodiments, the polygon input 926b (and/or point input 926a) may be automatically defined on behalf of the user, such as utilizing data descriptive of the user's location (e.g., a location of the user device 902). The polygon input 926b may comprise, for example, a predetermined diameter area around the current location of the user device 902, such as determined via GPS and/or triangulation methodologies— e.g., low-energy Bluetooth® iBeacon®-type technology that can pinpoint a device location within a small and/or bounded area (e.g., within a building and/or store).

According to some embodiments, the value subject identified and/or defined by the polygon input 926b (and/or the data determined to be associated therewith) may be determined and/or provided in accordance with stored rules and/or preferences. In the case that the street address of "9333 Side Street" is determined to be indicated by the polygon input 926b, for example, it may be determined that the appropriate corresponding value subject (predefined or new) should also include the area assigned to the street address "113 Main Street". The two address may, for example, be separated by a wall in which a door 924-1 is disposed. The existence or usage of the door 924-1 may tie certain or all risk metrics for the two addresses together (e.g., in accordance with one rule such as a shared fire risk rule). In some embodiments, such as in the case that the "9333 Side Street" and the "115 Main Street" address are separated by a non-fire rated wall or partition, those two addresses may similarly be joined and/or aggregated with respect to risk and/or other data. In some cases, such as in the case that the polygon input 926b overlaps two value subjects and/or areas or objects that do not share a particular risk, risk type, and/or risk level or metric value, the user may be prompted (e.g., via the interface 920) to select which addresses, structures 924, land parcels 922a-b, and/or other features, objects, and/or areas to include for purposes of data retrieval, definition, and/or analysis.

In some embodiments, the interface 920 may comprise one or more input buttons 928a-b. A first input button 928a may, for example, comprise a "risk" button that the user may activate (e.g., via provided input) to initiate risk (and/or other) analysis of desired locations—e.g., defined and/or indicated by one or more of the point input 926a and/or the polygon input 926b. In some embodiments, the interface 920 may comprise a second input button 928b, such as a purchase button that the user may activate (e.g., via provided input) to initiate payment for and/or purchase of data (and/or analysis) desired with respect to the desired location.

According to some embodiments, any or all of the components 902, 916, 920, 922a-b, 924, 926a-b, 928a-b of the system 900 may be similar in configuration and/or functionality to any similarly named and/or numbered components described herein. Fewer or more components 902, 916, 920, 922a-b, 924, 926a-b, 928a-b and/or various configurations of the components 902, 916, 920, 922a-b, 924, 926a-b, 928a-b may be included in the system 900 without deviating from the scope of embodiments described herein. While multiples of some components 922a-b, 926a-b, 928a-b are depicted and while single instances of other components 902, 916, 920, 924 are depicted, for example, any component 902, 916, 920, 922a-b, 924, 926a-b, 928a-b depicted in the system 900 may comprise a single device, a combination of devices and/or components 902, 916, 920, 922a-b, 924, 926a-b, 928a-b, and/or a plurality of devices, as is or becomes desirable and/or practicable.

Figure 10:
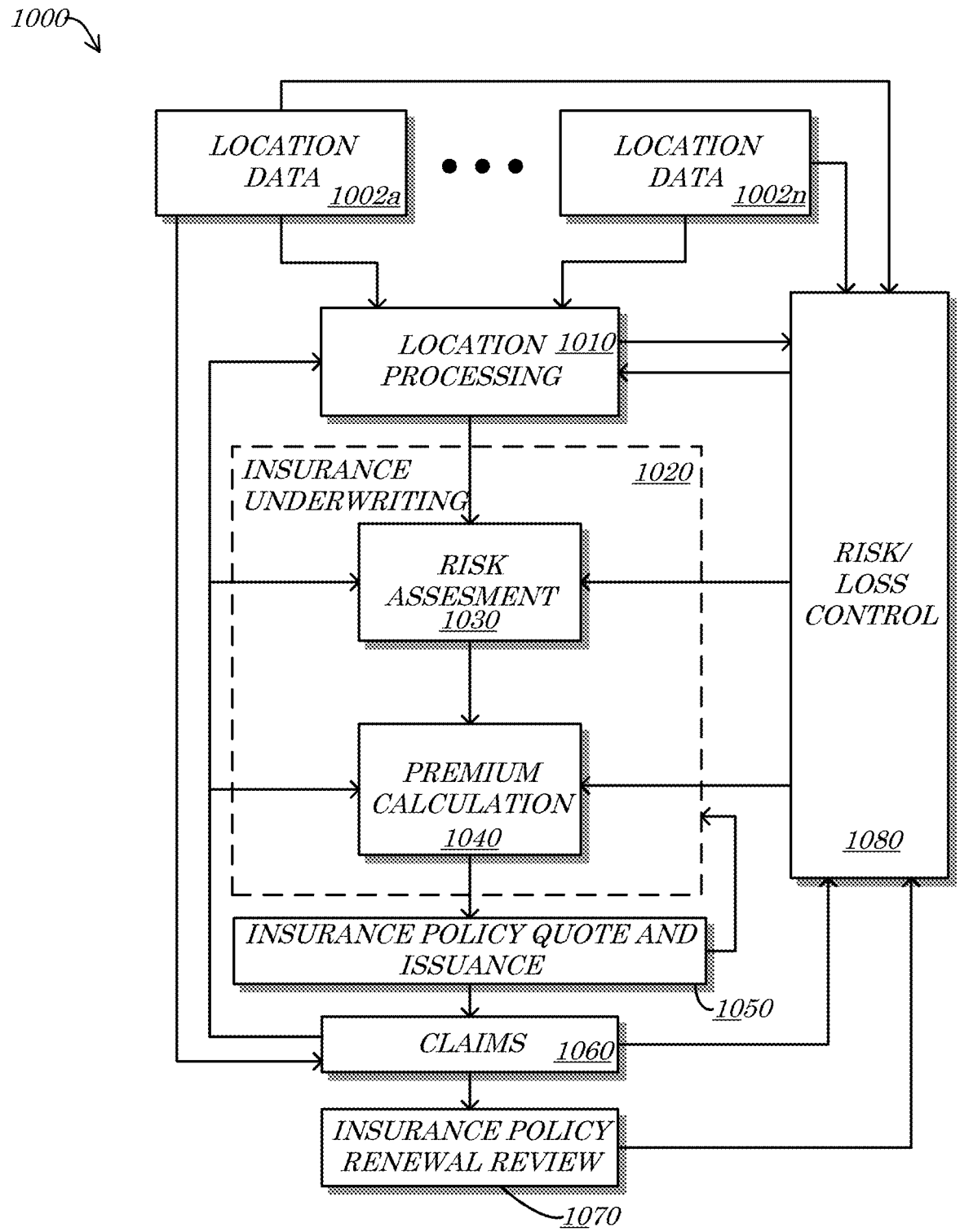
FIG. 10 is a flow diagram of a method according to some embodiments.

Referring now to FIG. 10, a flow diagram of a method 1000 according to some embodiments is shown. According to some embodiments, the method 1000 may be implemented, facilitated, and/or performed by or otherwise associated with any of the systems 100, 600 of FIG. 1 and/or FIG. 6 herein.

In some embodiments, the method 1000 may be performed and/or implemented by and/or otherwise associated with one or more specialized and/or specially-programmed computers, computer terminals, computer servers, computer systems and/or networks, and/or any combinations thereof (e.g., by one or more third-party and/or insurance company and/or underwriter computers, such as, e.g., the location processing device 110 of FIG. 1).

According to some embodiments, the method 1000 may comprise one or more actions associated with location data 1002a-n. The location data 1002a-n (e.g., certified location data) of one or more objects that may be related to and/or otherwise associated with an insurance product and/or policy (e.g., one or more value subjects), for example, may be received (e.g., via user input), defined (e.g., based on user input), determined, calculated, looked-up, and/or derived. In some embodiments, the location data 1002a-n may be gathered as raw data directly from one or more location data sources as described herein. One or more mapping and/or location determination products (e.g., maps, software, applications, and/or devices) may, for example, provide location data utilized to define the location data 1002a-n and/or may provide some or all of the location data 1002a-n. In some embodiments, location data 1002a-n may be provided by an insured/policy holder and/or by a third-party (e.g., cell phone tracking via GPS and/or social media "check-in" functionality; as received from the insured and/or from a third-party such as a GPS tracking provider and/or social media server), and/or may be defined via a GUI that receives input from such users.

As depicted in FIG. 10, location data 1002a-n from a plurality of sources may be gathered. The plurality of location data 1002a-n may comprise information indicative of one or more locations of a plurality of objects and/or types of objects. First location data 1002a may, for example, be descriptive of flood zone information descriptive of a particular location (e.g., a location associated with a first value subject), while other location data 1002n may be descriptive of weather events and/or probabilities for a location (e.g., a second value subject). In some embodiments, the first location data 1002a may be descriptive of a unique geo-coded location of a cellular telephone tower while other location data 1002n may be descriptive of a specific room in a hotel or a user-defined point, line, and/or polygon.

According to some embodiments, the method 1000 may also or alternatively comprise one or more actions associated with location processing 1010. As depicted in FIG. 10, for example, some or all of the location data 1002a-n may be determined, gathered, and/or otherwise obtained for location processing 1010. In some embodiments, location processing 100 may comprise aggregation, analysis, calculation, filtering, conversion, encoding and/or decoding (including encrypting and/or decrypting), sorting, ranking, and/or any combinations thereof. According to some embodiments, a processing device may execute specialized program instructions to process the location data 1002a-n to define a certified location and/or a value subject. Such a certified location and/or value subject may, for example, be descriptive (in a qualitative and/or quantitative manner) of a specific and/or unique location such as a geo-coded and/or geo-referenced point, line, area, and/or object/volume.

In some embodiments, location processing 1010 may comprise sophisticated, single variable or multivariate, single order or multi-order location and/or certified location models and/or equations that analyze the location data 1002a-n and correlate it to risks and/or losses, and/or for any other desired purposes. In some embodiments, there may be other inputs, variables or events that may be stored in association with and/or comprise the location data 1002a-n, such as severe weather events, natural disasters, evacuation warnings/alerts, catastrophic events, earthquakes, tornadoes, hurricanes, blizzards, mudslides, typhoons, wars, terrorist/ enemy attacks, or the like. Such correlations may be used, for example, to predict the level of risk and/or likely severity of injury and/or losses associated with one or more certified locations and/or value subjects. In some embodiments, location data 1002a-n may be utilized for planning crowd control resources, natural or man-made resources, utilities, or infrastructure management (e.g., water, electricity, fuel, etc.), or designing escape or evacuation routes, or for any other desired purpose.

According to some embodiments, there may be a correlation between a certified location and/or value subject defined by the location data 1002a-n (and/or a portion thereof) and weather events when determining risk of loss. For example, a given certified location may correlate to a higher risk when there is ice, snow, or rain likely to occur, than when it is dry (e.g., if the certified location and/or value subject comprises a roadway segment or intersection).

In some embodiments, the method 1000 may also or alternatively comprise one or more actions associated with insurance underwriting 1020. Insurance underwriting 1020 may generally comprise any type, variety, and/or configuration of underwriting process and/or functionality that is or becomes known or practicable. Insurance underwriting 1020 may comprise, for example, simply consulting a pre-existing rule, criteria, and/or threshold to determine if an insurance product may be offered, underwritten and/or issued to customers, based on any relevant location data 1002a-n. One example of an insurance underwriting 1020 process may comprise one or more of risk assessment 1030 and/or premium calculation 1040 (e.g., as shown in FIG. 10). In some embodiments, while both the risk assessment 1030 and the premium calculation 1040 are depicted as being part of an exemplary insurance underwriting 1020 procedure, either or both of the risk assessment 1030 and the premium calculation 1040 may alternatively be part of a different process and/or different type of process.

The location data 1002a-n and/or a result of the location processing 1010 may, for example, be determined and utilized to conduct risk assessment 1030 for any of a variety of purposes. In some embodiments (e.g., as shown), the risk assessment 1030 may be conducted as part of a rating process for determining how to structure an insurance product and/or offering. A "rating engine" utilized in an insurance underwriting process may, for example, retrieve location data 1002a-n and/or a result of the location processing 1010 for input into a calculation (and/or series of calculations and/or a mathematical model) to determine a level of risk likely to be associated with a particular value subject (e.g., an area, device, structure, a plurality of associated (proximate, common ownership, etc.) structures, points, coordinates, and/or locations, an entity, etc.).

According to some embodiments, the method 1000 may also or alternatively comprise one or more actions associated with premium calculation 1040 (e.g., which may be part of the insurance underwriting 1020). In the case that the method 1000 comprises the insurance underwriting 1020 process, for example, the risk assessment 1030 may be utilized by a "pricing engine" to calculate (and/or look-up or otherwise determine) an appropriate premium to charge for an insurance policy associated with the object for which the location data 1002a-n was collected and for which the risk assessment 1030 was performed. In some embodiments, the object analyzed may comprise an object (e.g., a value subject) for which an insurance product is sought (e.g., the analyzed object may comprise a building for which a home-owners policy is desired or a location for which business insurance is desired). According to some embodiments, the object analyzed may be an object other than the object for which insurance is sought (e.g., the analyzed object may comprise a building in which a business for which a business insurance policy is desired is located—or located adjacent to or in proximity to). In some embodiments, the risk assessment 1030 may comprise a comparison of a determined risk level or rating to one or more stored rules and/or thresholds (e.g., a risk aggregation limit). If it is determined that a particular structure (and/or plurality of structures, location, and/or area) exceeds a particular risk limit, for example, the method 1000 may be altered, informed, and/or influenced. A decision may be made with respect to a new insurance policy for the same structure or other object, for example, to (i) not underwrite the policy, and/or (ii) alter or set the premium and/or deductible (or other product parameters) based on the over-limit situation.

According to some embodiments, the method 1000 may also or alternatively comprise one or more actions associated with insurance policy quote and/or issuance 1050. Once a policy has been rated, priced or quoted and the customer has accepted the coverage terms, the insurance company may, for example, bind and issue the policy by hard copy and/or electronically to the customer/insured.

In general, a customer may visit a website and/or an insurance agent, for example, provide the needed information about the customer and type of desired insurance, and request an insurance policy and/or product. According to some embodiments, the insurance underwriting 1020 is performed utilizing information about the potential insured and the policy is issued based on the result thereof. Insurance coverage may, for example, be evaluated, rated, priced, and/or sold to one or more customers, at least in part based on the location data 1002*a-n*. In some embodiments, an insurance company may have the potential customer indicate electronically, on-line, or otherwise whether they have any location sensing devices (and/or which specific devices they have) and/or whether they are willing to install them or have them installed. In some embodiments, this may be done by check boxes, radio buttons, or other form of data input/selection, on a web page and/or via a mobile device application. In some embodiments, customer and/or user location data may be provided via a GUI such as by the customer/user identifying, selecting, and/or drawing or otherwise defining one or more points, liens, and/or polygons (e.g., drawn in a user-defined manner on a map-based interface).

According to some embodiments, the method 1000 may also or alternatively comprise one or more actions associated with claims 1060. In the insurance context, for example, after an insurance product is provided and/or policy is issued (e.g., via the insurance policy quote and issuance 1050), one or more insurance claims may be filed against the product/policy. In some embodiments (as depicted in FIG. 10), such as in the case that a first object associated with the insurance policy is somehow involved with one or more insurance claims 1060, first location data 1002*a* of the value subject or related objects may be gathered and/or otherwise obtained. According to some embodiments, such location data 1002*a-n* may comprise data indicative of the uniquely-identifiable location of the object at the time of casualty or loss (e.g., as defined by the one or more claims 1060). Information on claims may be provided to the location processing 1010, risk assessment 1030, and/or premium calculation 1040 to update, improve, and/or enhance these procedures and/or devices. According to some embodiments, the first location data 1002*a* may be utilized to plan, manage, and/or conduct catastrophe ("CAT") response activities. In the case of a claim event involving a particular structure (e.g., a certified location and/or value subject), for example, stored attributes of the structure (such as age, construction type, configuration) may be utilized to determine, identify, and/or select one or more CAT response agents having expertise, training, and/or knowledge relating to one or more particular attributes of the structure. According to some embodiments, such as in the case of a multi-customer loss event (e.g., a catastrophic event such as a flood, explosion, earth quake, etc.), the first location data 1002*a* may allow rapid and/or accurate prediction of the extent of the loss event (e.g., with respect to a particular company and/or customer-base). A disaster zone (such as one or more of the fall risk zone 220, the terrorist risk zone 222, and/or the weather risk zone 224 of FIG. 2D) may be compared to the first location data 1002*a* to determine, for example, how many customers and/or customer accounts are likely to be affected, the total possible or likely magnitude of loss (e.g., an aggregation of policy limits in the affected zone), and/or the type(s) of loss. In such a manner, for example, the magnitude, extent, and/or type of CAT response may be planned, determined, and/or adjusted to suit the particular loss event.

In some embodiments, the method 1000 may also or alternatively comprise insurance policy renewal review 1070. Location data 1002*a-n* may be utilized, for example, to determine if and/or how an existing insurance policy (e.g., provided via the insurance policy quote and issuance 1050) may be renewed. According to some embodiments, such as in the case that an insured is involved with and/or in charge of (e.g., responsible for) providing the location data 1002*a-n*, a review may be conducted to determine if the correct amount, frequency, and/or type or quality of the location data 1002*a-n* was indeed provided by the insured during the original term of the policy. In the case that the location data 1002*a-n* was lacking, the policy may not, for example, be renewed and/or any discount received by the insured for providing the location data 1002*a-n* may be revoked or reduced. In some embodiments, the customer may be offered a discount for having certain location sensing devices or being willing to install them or have them installed (e.g., a willingness or acceptance of "push" notifications from Bluetooth® devices such as iBeacons® available from Apple®, Inc. of Cupertino, Calif.; or be willing to adhere to certain thresholds based on measurements from such devices).

According to some embodiments, the method 1000 may also or alternatively comprise one or more actions associated with risk/loss control 1080. Any or all data gathered as part of a claims 1060 process, for example, may be gathered, collected, and/or analyzed to determine how (if at all) one or more of a rating engine (e.g., the risk assessment 1030), a pricing engine (e.g., the premium calculation 1040), the insurance underwriting 1020 process, and/or the location processing 1010 itself, should be updated to reflect actual and/or realized risk, costs, and/or other issues associated with the location data 1002*a-n*. Results of the risk/loss control 1080 may, according to some embodiments, be fed back into the method 1000 to refine the risk assessment 1030, the premium calculation 1040 (e.g., for subsequent insurance queries and/or calculations), the insurance policy renewal review 1070 (e.g., a re-calculation of an existing policy for which the one or more claims 1060 were filed), and/or the location processing 1010 to appropriately scale the output of the risk assessment 1080.

Figure 11:
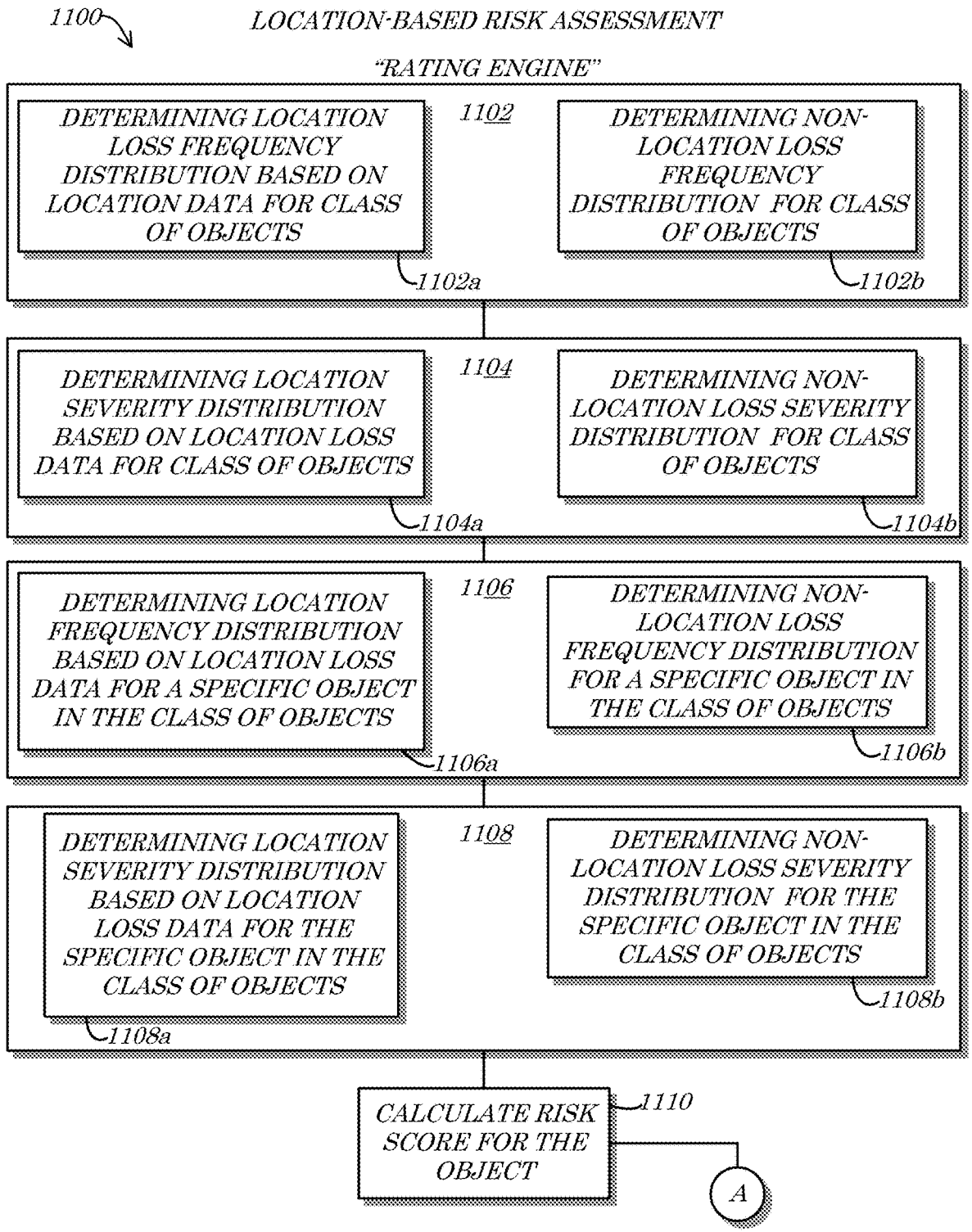
FIG. 11 is a flow diagram of a method according to some embodiments.

Turning now to FIG. 11, a flow diagram of a method 1100 according to some embodiments is shown. In some embodiments, the method 1100 may comprise a certified location-based risk assessment method which may, for example, be described as a "rating engine". According to some embodiments, the method 1100 may be implemented, facilitated, and/or performed by or otherwise associated with any of the systems 100, 600 of FIG. 1 and/or FIG. 6 herein. In some embodiments, the method 1100 may be associated with the method 1000 of FIG. 10. The method 1100 may, for example, comprise a portion of the method 1000 such as the risk assessment 1030.

According to some embodiments, the method 1100 may comprise determining one or more loss frequency distributions for a class of objects, at 1102. In some embodiments, a first loss frequency distribution may be determined, at 1102*a*, based on location data and/or metrics. Location data (such as the location data 1002*a-n* of FIG. 10) for an object class and/or type may, for example, be analyzed to determine relationships between location data and/or metrics and empirical data descriptive of actual insurance losses for the object types and/or classes of objects (e.g., a type and/or class of value subjects). A location data processing and/or analytics system (e.g., the location processing device 110 and/or the system 600 as described with respect to FIG. 1 and/or FIG. 6 herein) may, according to some embodiments, conduct regression and/or other mathematical analysis on various location metrics to determine and/or identify mathematical relationships that may exist between such metrics and actual sustained losses and/or casualties.

Similarly, at 1102*b*, a second loss frequency distribution may be determined based on non-location data. According to some embodiments, the determining at 1102*b* may comprise a standard or typical loss frequency distribution utilized by an entity (such as an insurance company) to assess risk. The non-location metrics utilized as inputs in the determining at 1102*b* may include, for example, age of a building or car, driving record of an individual, a criminal record of an individual, color of a vehicle, etc. In some embodiments, the loss frequency distribution determinations at 1102*a-b* may be combined and/or determined as part of a single comprehensive loss frequency distribution determination. In such a manner, for example, expected total loss probabilities (e.g., taking into account both location data and non-location data) for an object type and/or class (e.g., a type and/or class of value subjects) may be determined. In some embodiments, this may establish and/or define a baseline, datum, average, and/or standard with which individual risk assessments may be measured.

According to some embodiments, the method 1100 may comprise determining one or more loss severity distributions for a class of objects, at 1104. In some embodiments, a first loss severity distribution may be determined, at 1104*a*, based on location data and/or metrics. Location data (such as the location data 1002*a-n* of FIG. 10) for a class of objects and/or for a particular type of object may (e.g., a type and/or class of value subjects), for example, be analyzed to determine relationships between various location data and/or metrics and empirical data descriptive of actual insurance losses for such object types and/or classes of objects. A certified location processing and/or analytics system (e.g., the location processing device 110 and/or the system 600 as described with respect to FIG. 1 and/or FIG. 6 herein) may, according to some embodiments, conduct regression analysis on various certified location metrics to determine and/or identify mathematical relationships that may exist between such metrics and actual sustained losses and/or casualties.

Similarly, at 1104*b*, a second loss severity distribution may be determined based on non-location data. According to some embodiments, the determining at 1104*b* may comprise a standard or typical loss severity distribution utilized by an entity (such as an insurance agency) to assess risk. The non-location metrics utilized as inputs in the determining at 1104*b* may include, for example, cost of replacement or repair, ability to self-mitigate loss (e.g., if a building has a fire suppression system and/or automatically closing fire doors), etc. In some embodiments, the loss severity distribution determinations at 1104*a-b* may be combined and/or determined as part of a single comprehensive loss severity distribution determination. In such a manner, for example, expected total loss severities (e.g., taking into account both location data and non-location data) for a particular object type and/or class (e.g., a type and/or class of value subjects) may be determined. In some embodiments, this may also or alternatively establish and/or define a baseline, datum, average, and/or standard with which individual risk assessments may be measured.

In some embodiments, the method 1100 may comprise determining one or more expected loss frequency distributions for a specific object in the class of objects (e.g., a type and/or class of value subjects), at 1106. Regression and/or other mathematical analysis performed on the location loss frequency distribution derived from empirical data, at 1102*a* for example, may identify various location metrics and may mathematically relate such metrics to expected loss occurrences (e.g., based on historical trends). Based on these relationships, a location loss frequency distribution may be developed at 1106*a* for the specific object. In such a manner, for example, known location metrics for a specific object may be utilized to develop an expected distribution (e.g., probability) of occurrence of location-related loss for the specific object (e.g., a specific value subject).

Similarly, regression and/or other mathematical analysis performed on the non-location loss frequency distribution derived from empirical data, at 1102*b* for example, may identify various non-location metrics and may mathematically relate such metrics to expected loss occurrences (e.g., based on historical trends). Based on these relationships, a non-location loss frequency distribution may be developed at 1106*b* for the specific object (e.g., the specific value subject). In such a manner, for example, known non-location metrics for a specific object may be utilized to develop an expected distribution (e.g., probability) of occurrence of non-location-related loss for the specific object. In some embodiments, the non-location loss frequency distribution determined at 1106*b* may be similar to a standard or typical loss frequency distribution utilized by an insurer to assess risk.

In some embodiments, the method 1100 may comprise determining one or more expected loss severity distributions for a specific object in the class of objects (e.g., a specific value subject and/or class of value subjects), at 1108. Regression and/or other mathematical analysis performed on the location loss severity distribution derived from empirical data, at 1104*a* for example, may identify various location metrics and may mathematically relate such metrics to expected loss severities (e.g., based on historical trends). Based on these relationships, a location loss severity distribution may be developed at 1108*a* for the specific object. In such a manner, for example, known location metrics for a specific object may be utilized to develop an expected severity for occurrences of location-related loss for the specific object.

Similarly, regression and/or other mathematical analysis performed on the non-location loss severity distribution derived from empirical data, at 1104*b* for example, may identify various non-location metrics and may mathematically relate such metrics to expected loss severities (e.g., based on historical trends). Based on these relationships, a non-location loss severity distribution may be developed at 1108*b* for the specific object. In such a manner, for example, known non-location metrics for a specific object may be utilized to develop an expected severity of occurrences of non-location-related loss for the specific object. In some embodiments, the non-location loss severity distribution determined at 1108*b* may be similar to a standard or typical loss frequency distribution utilized by an insurer to assess risk.

It should also be understood that the location-based determinations 1102*a*, 1104*a*, 1106*a*, 1108*a* and non-location-based determinations 1102*b*, 1104*b*, 1106*b*, 1108*b* are separately depicted in FIG. 11 for ease of illustration of one embodiment descriptive of how certified location metrics may be included to enhance standard risk assessment procedures. According to some embodiments, the location-based determinations 1102*a*, 1104*a*, 1106*a*, 1108*a* and non-location-based determinations 1102*b*, 1104*b*, 1106*b*, 1108*b* may indeed be performed separately and/or distinctly in either time or space (e.g., they may be determined by different software and/or hardware modules or components and/or may be performed serially with respect to time). In some embodiments, the location-based determinations 1102a, 1104a, 1106a, 1108a and non-location-based determinations 1102b, 1104b, 1106b, 1108b may be incorporated into a single risk assessment process or "engine" that may, for example, comprise a risk assessment software program, package, and/or module.

In some embodiments, the method 1100 may comprise calculating a risk score for the object (e.g., a specific value subject), at 1110. According to some embodiments, formulas, charts, and/or tables may be developed that associate various location and/or non-location metric magnitudes with risk scores. High numbers of policy holders on a particular parcel of land may be represented by a first certified location metric, for example, that may equate to a risk score of two (2), while high amounts of existing risk exposure in a particular building (e.g., in a high-risk earthquake area) represented by a second location metric may equate to a risk score of ten (10). Risk scores for a plurality of location and/or non-location metrics may be determined, calculated, tabulated, and/or summed to arrive at a total risk score for the object and/or for an object class. According to some embodiments, risk scores may be derived from the location and/or non-location loss frequency distributions and the location and/or non-location loss severity distribution determined at 1106a-b and 1108a-b, respectively. More details on one similar method for assessing risk are provided in Applicants' U.S. Pat. No. 7,330,820 entitled "PREMIUM EVALUATION SYSTEMS AND METHODS" which issued on Feb. 12, 2008, the risk assessment concepts and descriptions of which are hereby incorporated by reference herein.

In some embodiments, the results of the method 1100 may be utilized to determine a premium for an insurance policy for the specific object analyzed. Any or all of the location and/or non-location loss frequency distributions of 1106a-b, the location and/or non-location loss severity distributions of 1108a-b, and the risk score of 1110 may, for example, be passed to and/or otherwise utilized by a premium calculation process via the node labeled "A" in FIG. 11.

Figure 12:
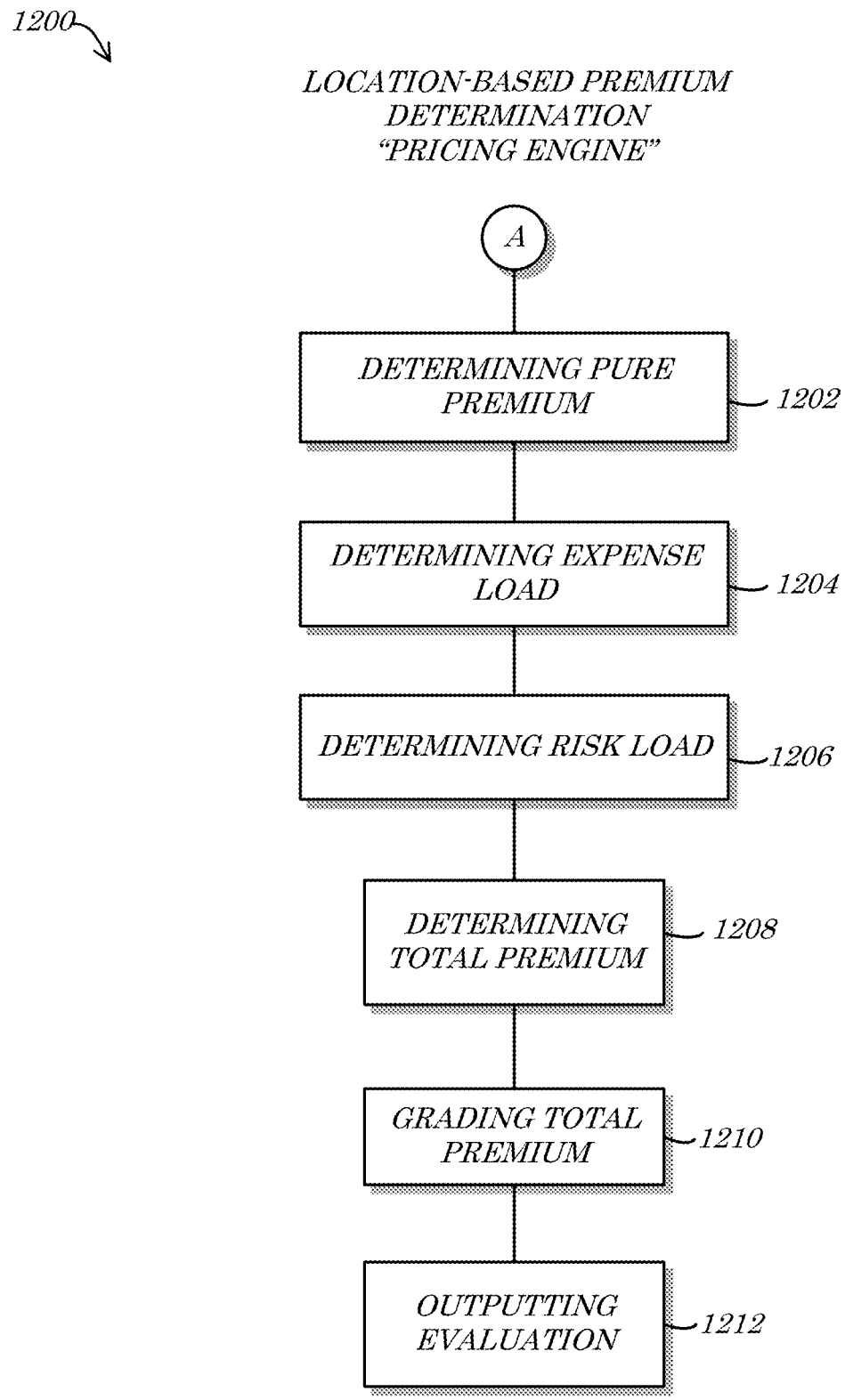
FIG. 12 is a flow diagram of a method according to some embodiments.

Referring to FIG. 12, for example, a flow diagram of a method 1200 (that may initiate at the node labeled "A") according to some embodiments is shown. In some embodiments, the method 1200 may comprise a location and/or certified location-based premium determination method which may, for example, be described as a "pricing engine". According to some embodiments, the method 1200 may be implemented, facilitated, and/or performed by or otherwise associated with any of the systems 100, 600 of FIG. 1 and/or FIG. 6 herein. In some embodiments, the method 1200 may be associated with the method 1000 of FIG. 10. The method 1200 may, for example, comprise a portion of the method 1000 such as the premium calculation 1040. Any other technique for calculating an insurance premium that utilizes location and/or certified location information described herein may be utilized in accordance with some embodiments.

In some embodiments, the method 1200 may comprise determining a pure premium, at 1202. A pure premium is a basic, unadjusted premium that is generally calculated based on loss frequency and severity distributions. According to some embodiments, the location and/or non-location loss frequency distributions (e.g., from 1106a-b in FIG. 11) and the location and/or non-location loss severity distributions (e.g., from 1108a-b in FIG. 11) may be utilized to calculate a pure premium that would be expected, mathematically, to result in no net gain or loss for the insurer when considering only the actual cost of the loss or losses under consideration and their associated loss adjustment expenses. Determination of the pure premium may generally comprise simulation testing and analysis that predicts (e.g., based on the supplied frequency and severity distributions) expected total losses (location-based and/or non-location-based) over time.

According to some embodiments, the method 1200 may comprise determining an expense load, at 1204. The pure premium determined at 1202 may not take into account operational realities experienced by an insurer. The pure premium does not account, for example, for operational expenses such as overhead, staffing, taxes, fees, etc. Thus, in some embodiments, an expense load (or factor) is determined and utilized to take such costs into account when determining an appropriate premium to charge for an insurance product. According to some embodiments, the method 1200 may comprise determining a risk load, at 1206. The risk load is a factor designed to ensure that the insurer maintains a surplus amount large enough to produce an expected return for an insurance product.

According to some embodiments, the method 1200 may comprise determining a total premium, at 1208. The total premium may generally be determined and/or calculated by summing or totaling one or more of the pure premium, the expense load, and the risk load. In such a manner, for example, the pure premium is adjusted to compensate for real-world operating considerations that affect an insurer.

According to some embodiments, the method 1200 may comprise grading the total premium, at 1210. The total premium determined at 1208, for example, may be ranked and/or scored by comparing the total premium to one or more benchmarks. In some embodiments, the comparison and/or grading may yield a qualitative measure of the total premium. The total premium may be graded, for example, on a scale of "A", "B", "C", "D", and "F", in order of descending rank. The rating scheme may be simpler or more complex (e.g., similar to the qualitative bond and/or corporate credit rating schemes determined by various credit ratings agencies such as Standard & Poors' (S&P) Financial service LLC, Moody's Investment Service, and/or Fitch Ratings from Fitch, Inc., all of New York, N.Y.) of as is or becomes desirable and/or practicable. More details on one similar method for calculating and/or grading a premium are provided in Applicants' U.S. Pat. No. 7,330,820 entitled "PREMIUM EVALUATION SYSTEMS AND METHODS" which issued on Feb. 12, 2008, the premium calculation and grading concepts and descriptions of which are hereby incorporated by reference herein.

According to some embodiments, the method 1200 may comprise outputting an evaluation, at 1212. In the case that the results of the determination of the total premium at 1208 are not directly and/or automatically utilized for implementation in association with an insurance product, for example, the grading of the premium at 1210 and/or other data such as the risk score determined at 1110 of FIG. 11 may be utilized to output the evaluation, e.g., an indication of the desirability and/or expected profitability of implementing the calculated premium. The outputting of the evaluation may be implemented in any form or manner that is or becomes known or practicable. One or more recommendations, graphical representations, visual aids, comparisons, and/or suggestions may be output, for example, to a device (e.g., a server and/or computer workstation) operated by an insurance underwriter and/or sales agent. One example of an evaluation comprises a creation and output of a risk matrix which may, for example, by developed utilizing Enterprise Risk Register® software which facilitates compliance with ISO 17799/ISO 27000 requirements for risk mitigation and which is available from Northwest Controlling Corporation Ltd. (NOWECO) of London, UK.

Figure 13:
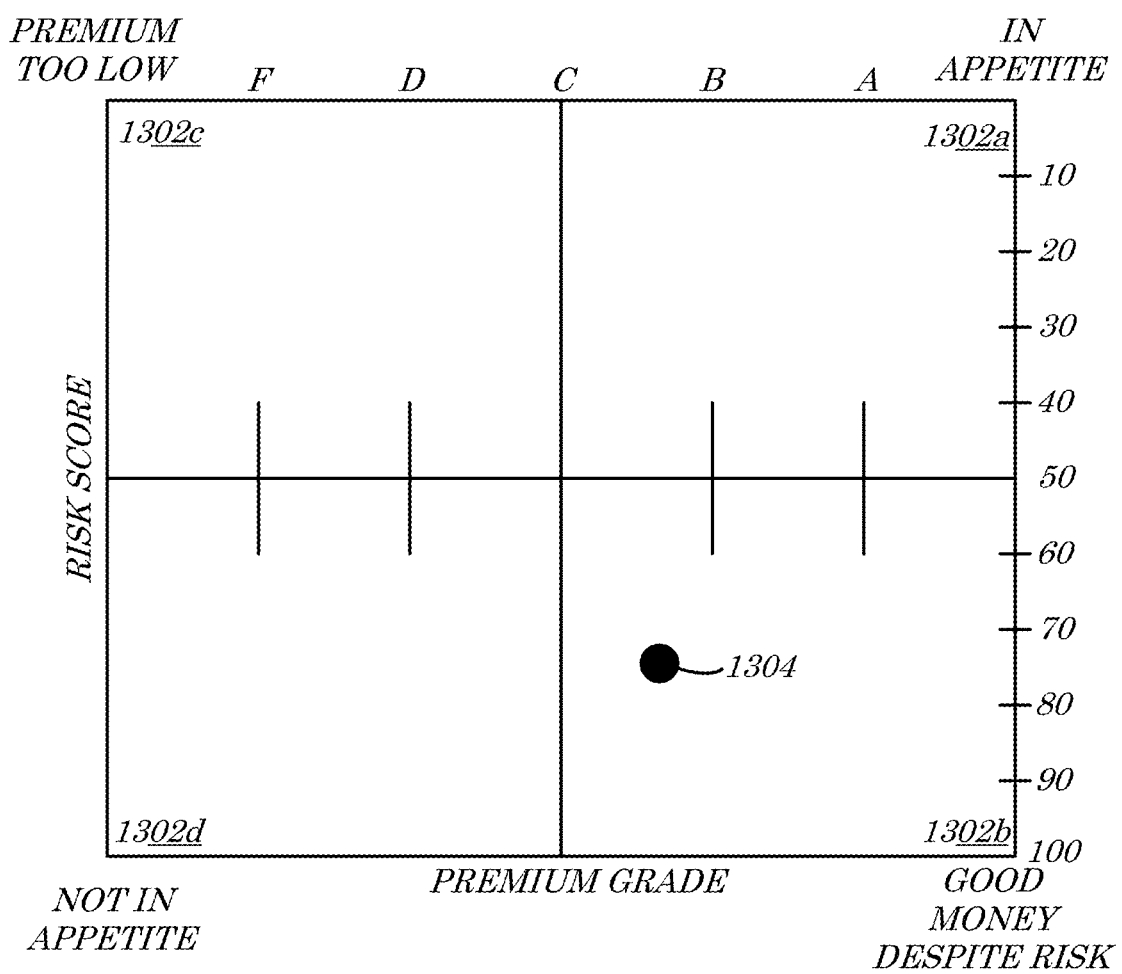
FIG. 13 is a diagram of an exemplary risk matrix according to some embodiments.

Turning to FIG. 13, for example, a diagram of an exemplary risk matrix 1300 according to some embodiments is shown. In some embodiments (as depicted), the risk matrix 1300 may comprise a simple two-dimensional graph having an x-axis and a y-axis. Any other type of risk matrix, or no risk matrix, may be used if desired. The detail, complexity, and/or dimensionality of the risk matrix 1300 may vary as desired and/or may be tied to a particular insurance product or offering. In some embodiments, the risk matrix 1300 may be utilized to visually illustrate a relationship between the risk score (e.g., from 1030 of FIG. 10 and/or from 1110 of FIG. 11) of an object and the total determined premium (e.g., from 1040 of FIG. 10 and/or 1208 of FIG. 12; and/or a grading thereof, such as from 1210 of FIG. 12) for an insurance product offered in relation to the object (e.g., value subject). As shown in FIG. 13, for example, the premium grade may be plotted along the x-axis of the risk matrix 1300 and/or the risk score may be plotted along the y-axis of the risk matrix 1300.

In such a manner, the risk matrix 1300 may comprise four (4) quadrants 1302a-d (e.g., similar to a "four-square" evaluation sheet utilized by automobile dealers to evaluate the propriety of various possible pricing "deals" for new automobiles). The first quadrant 1302a represents the most desirable situations where risk scores are low and premiums are highly graded. The second quadrant 1302b represents less desirable situations where, while premiums are highly graded, risk scores are higher. Generally, object-specific data that results in data points being plotted in either of the first two quadrants 1302a-b is indicative of an object for which an insurance product may be offered on terms likely to be favorable to the insurer. The third quadrant 1302c represents less desirable characteristics of having poorly graded premiums with low risk scores and the fourth quadrant 1302d represents the least desirable characteristics of having poorly graded premiums as well as high risk scores. Generally, object-specific data that results in data points being plotted in either of the third and fourth quadrants 1302c-d is indicative of an object for which an insurance product offering is not likely to be favorable to the insurer One example of how the risk matrix 1300 may be output and/or implemented with respect to certified location of a value subject will now be described. Assume, for example, that a home owner's policy is desired by a consumer and/or that a home owner's policy product is otherwise analyzed to determine whether such a policy would be beneficial for an insurer to issue. Typical risk metrics such as the age of the building, a city in which the building is located, and/or a type of construction of the building or insulation values (e.g., energy ratings) may be utilized to produce expected loss frequency and loss severity distributions (such as determined at 1106b and 1108b of FIG. 11).

In some embodiments, certified location metrics of the building (i.e., the value subject, i.e., object being insured) such as how many other policies have been written for the building (e.g., current, historical, for the same customer and/or for different customers), whether the building (or a portion thereof) falls within (or outside of) a particular zone (such as a flood zone, busyness zone (e.g., as described in U.S. patent application Ser. No. 12/978,535 titled "RISK ASSESSMENT AND CONTROL, INSURANCE PREMIUMS DETERMINATIONS, AND OTHER APPLICATIONS USING BUSYNESS" filed on Dec. 24, 2010 and Published as U.S. Patent Application Publication No. 2001/0161119 on Jun. 30, 2011, the busyness concepts and descriptions of which are hereby incorporated by reference herein), and/or risk zone (e.g., as described in U.S. patent application Ser. No. 13/334,897 titled "SYSTEMS AND METHODS FOR CUSTOMER-RELATED RISK ZONES" filed on Dec. 22, 2011 and/or U.S. patent application Ser. No. 13/335,476 titled "SYSTEMS AND METHODS FOR CLIENT-RELATED RISK ZONES" filed on Dec. 22, 2011, the risk zone concepts and descriptions of each of which are hereby incorporated herein by reference)), what other buildings or features are located on the same parcel of land, and/or a history of loss for the building (e.g., for the same customer and/or for different customers) may also be utilized to produce expected location loss frequency and location loss severity distributions (such as determined at 1106a and 1108a of FIG. 11). In some embodiments, location and/or certified location metrics of objects other than building (i.e., other than the object being insured) such as structural stability of an adjacent building, business activity types in adjacent apartments/units and/or buildings, and/or characteristics of a parcel of land upon which the building is situated and/or an adjacent or proximate parcel of land may also or alternatively be utilized to produce expected location loss frequency and location loss severity distributions (such as determined at 1106a and 1108a of FIG. 11). According to some embodiments, singular loss frequency and loss severity distributions may be determined utilizing both typical risk metrics as well as location and/or certified location metrics (of the object being insured and/or of other associated objects).

In the case that the building houses a plurality of high-risk businesses (e.g., other than or including a business of the potential insured), especially when compared to typical buildings of the same type, the risk score for the building may be determined to be relatively high, such as seventy-five (75) on a scale from zero (0) to one hundred (100). Of course other non-location factors such as the age of the consumer and/or the number of inhabitants (and/or other factors) may also contribute to the risk score for the building, consumer, and/or insurance product associated therewith. Also, if the typical times of day and/or days of the week are known for when particular high-risk activities occur at or near the building (e.g., on the same parcel of land), this can be correlated with historical and/or predicted risk levels of the building at those times of day to provided more accurate risk scores.

The total premium calculated for a potential insurance policy offering covering the building (e.g., determined at 1208 of FIG. 12) may, to continue the example, be graded between "B" and "C" (e.g., at 1210 of FIG. 12) or between "Fair" and "Average". The resulting combination of risk score and premium rating may be plotted on the risk matrix 1300, as represented by a data point 1304 shown in FIG. 13. The data point 1304, based on the location-influenced risk score and the accordingly certified location-influenced premium calculation, is plotted in the second quadrant 1102b, in a position indicating that while the risk of insuring the building/consumer is relatively high, the calculated premium is probably large enough to compensate for the level of risk. In some embodiments, an insurer may accordingly look favorably upon issuing such as insurance policy to the consumer to cover the building/home in question and/or may consummate a sale of such a policy to the consumer (e.g., based on the evaluation output at 1212 of FIG. 12, such as decision and/or sale may be made).

Figure 14:
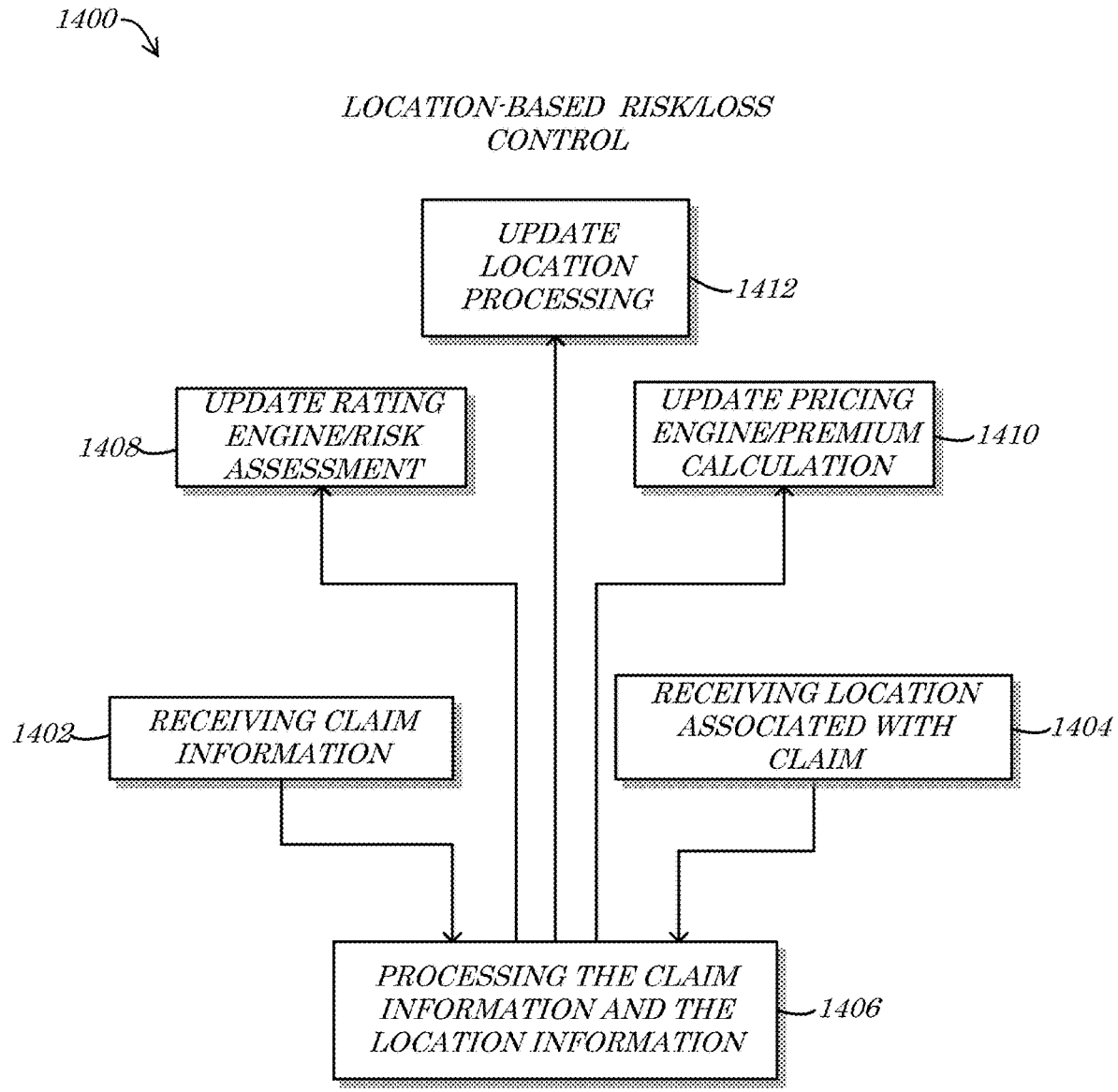
FIG. 14 is a flow diagram of a method according to some embodiments.

Turning now to FIG. 14, a flow diagram of a method 1400 according to some embodiments is shown. In some embodiments, the method 1400 may comprise a location-based risk loss control method. According to some embodiments, the method 1400 may be implemented, facilitated, and/or performed by or otherwise associated with any of the systems 100, 600 of FIG. 1 and/or FIG. 6 herein. In some embodiments, the method 1400 may be associated with the method 1000 of FIG. 10. The method 1400 may, for example, comprise a portion of the method 1000 such as the risk/loss control 1080. In some embodiments, the method 1400 may also or alternatively be associated with any of the methods 1100, 1200 described in relation to FIG. 11 and/or FIG. 12 herein. The method 1400 may comprise, in some embodiments for example, a continuation of the location-based risk assessment method 1100 of FIG. 11 and/or the location-based premium determination method 1200 of FIG. 12.

According to some embodiments, the method 1400 may comprise receiving claim information, at 1402. A claim may be received from an insured/policy holder with respect to a loss or casualty (e.g., an accident or any other loss event) sustained with respect to an object covered by an insurance policy for which an insurance company receives premiums, for example. In some embodiments, the claim may be made with respect to an insurance product for which an evaluation was output (e.g., during a sales and/or underwriting process) such as at 1212 of FIG. 12. The claim information may generally comprise and/or indicate data descriptive of the loss such as severity and/or cause, or other information.

In some embodiments, the method 1400 may comprise receiving a location metric associated with the claim, at 1404. Information descriptive of a location and/or certified location metric and/or raw location and/or certified location data associated with the severity and/or cause of the loss, for example, may be provided by the consumer as part of a claims process (e.g., may be received in conjunction with the information received at 1402). According to some embodiments, the location data and/or metric may be received from sources other than the consumer. Returning to the example of the insured building described with respect to FIG. 13, for example, the homeowner may not have access to and/or may not be capable of properly determining a number of inhabitants of the building where (and when) an accident occurred (e.g., in the case of an apartment building). Thus, in some embodiments, the insurer and/or a third-party may utilize the claim information to locate, identify, and/or retrieve certified location data for the building where the accident occurred and at and/or around the time of the accident or loss. According to some embodiments, the consumer may provide such information, the building may be configured to provide desired claim and/or location information, a third-party data provider such information, and/or the insurance company may get it directly from a sensing device.

In some embodiments, the method 1400 may comprise processing the claim information and the location information, at 1406. The loss information and/or the location information may be combined with previous and/or historic loss data and/or location information, for example, to define a new set of data that may be utilized to assess risk and/or determine premiums for new insurance policies and/or products, and/or may be utilized to update risk and/or pricing for one or more existing policies (such as the policy of the example home owner), or it may be utilized to update how the location information is determined based on specific location data/sensors.

The method 1400 may, for example, update a rating engine at 1408 and/or update a pricing engine at 1410. According to some embodiments, the new loss information and/or the new loss-related location and/or certified location information may be fed back into one or more of the rating engine and the pricing engine utilized by an insurer to evaluate and/or structure insurance products and pricing thereof. The location and/or certified location-based risk assessment method of 1100 of FIG. 11 and/or the location and/or certified location-based premium determination method 1200 of FIG. 12 may, for example, be conducted and/or re-conducted, based on the newly available claim and/or claim-related location information. In such a manner, insurance policy risk analysis and/or pricing may be updated to reflect the most recent data available, increasing the probability that the risk and pricing models will maintain appropriate levels of accuracy.

Figure 15:
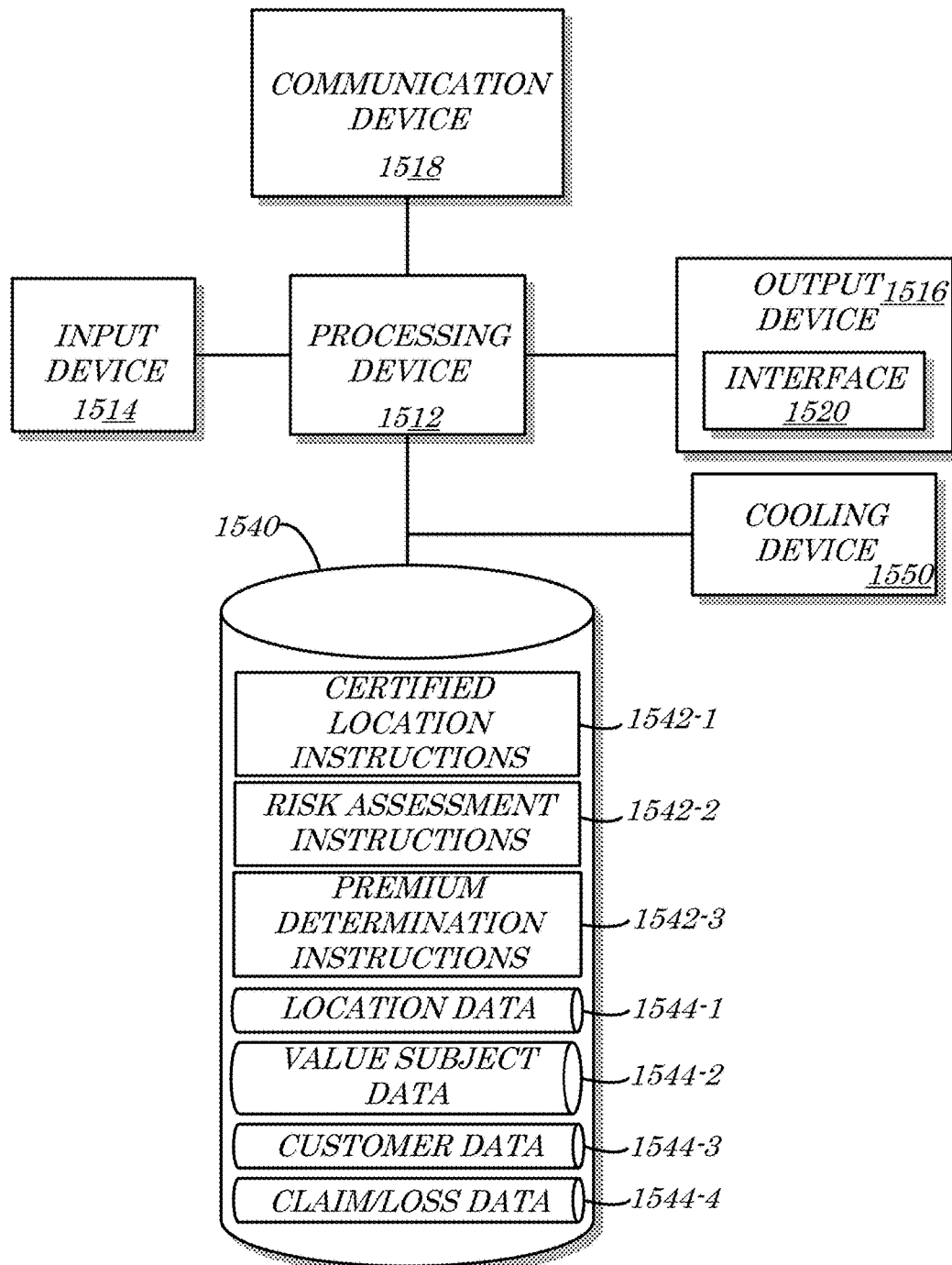
FIG. 15 is a block diagram of an apparatus according to some embodiments.
Figure 16A:
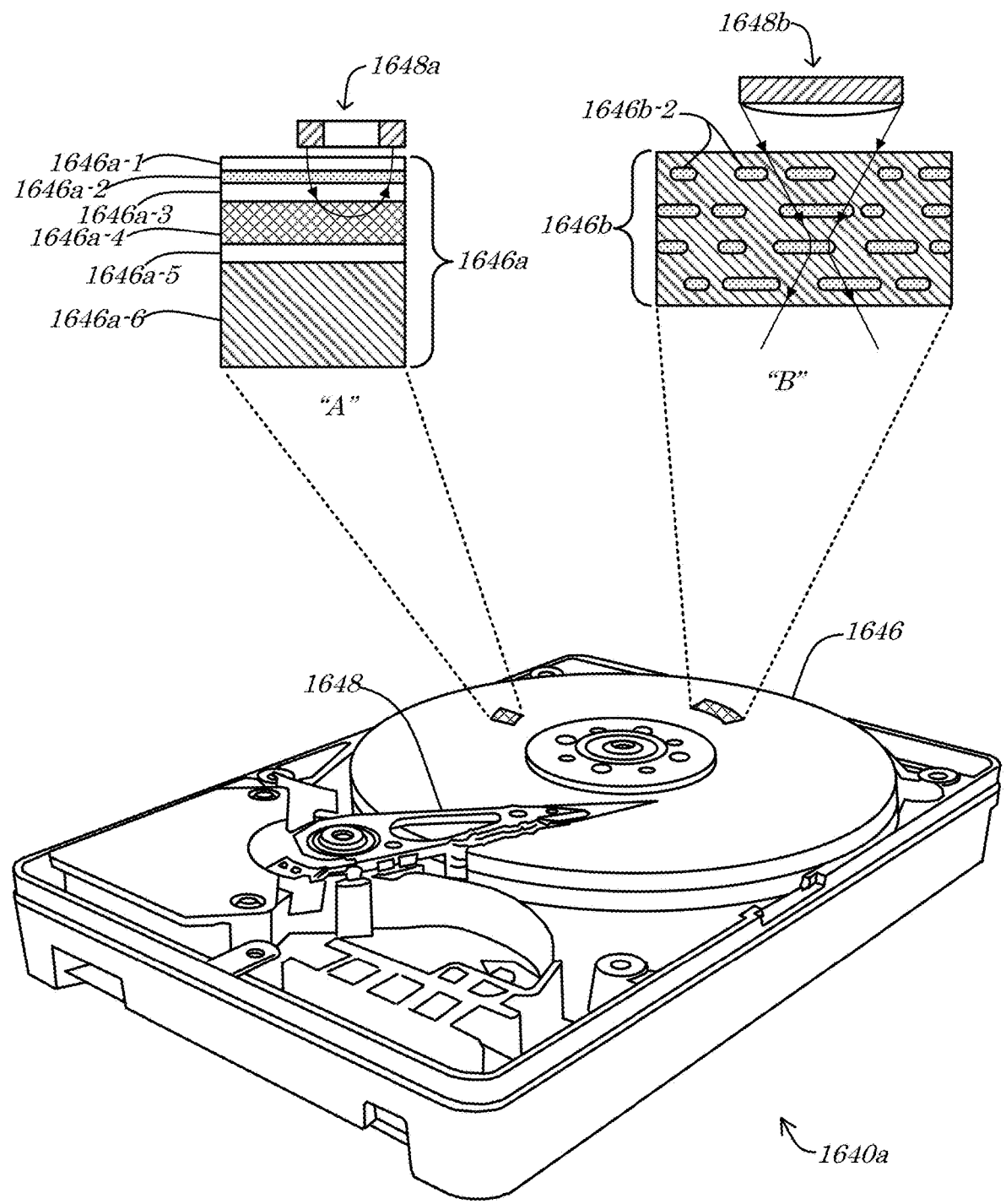
FIG. 16A, FIG. 16B, FIG. 16C, FIG. 16D, and FIG. 16E are perspective diagrams of exemplary data storage devices according to some embodiments.
Figure 16B:
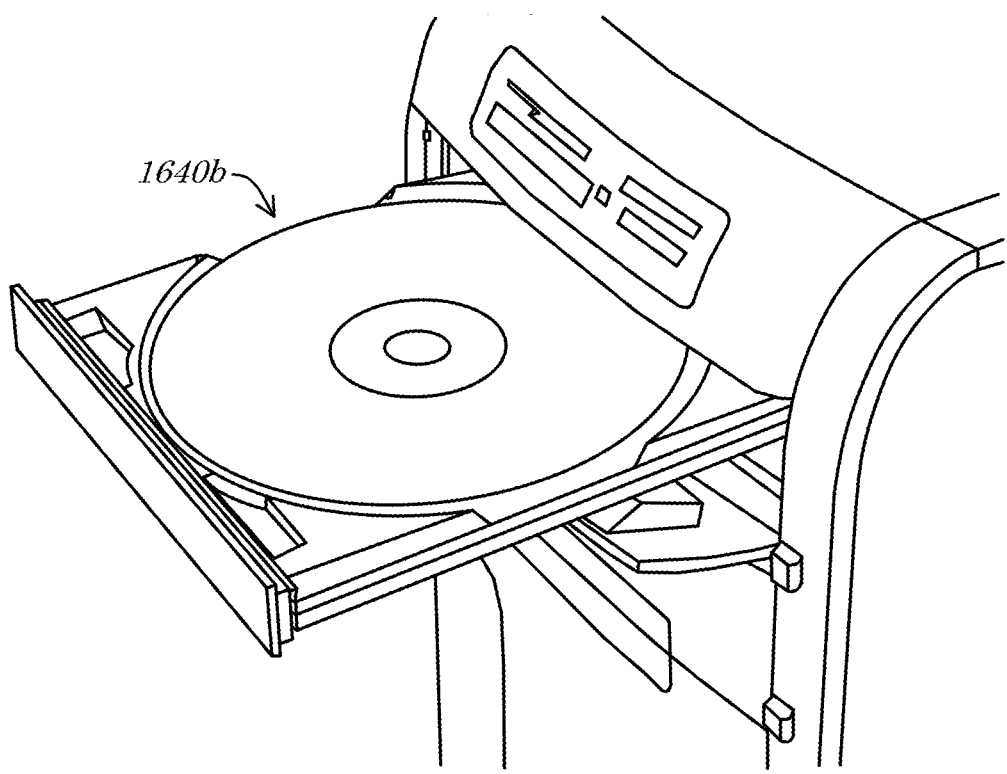
Figure 16C:
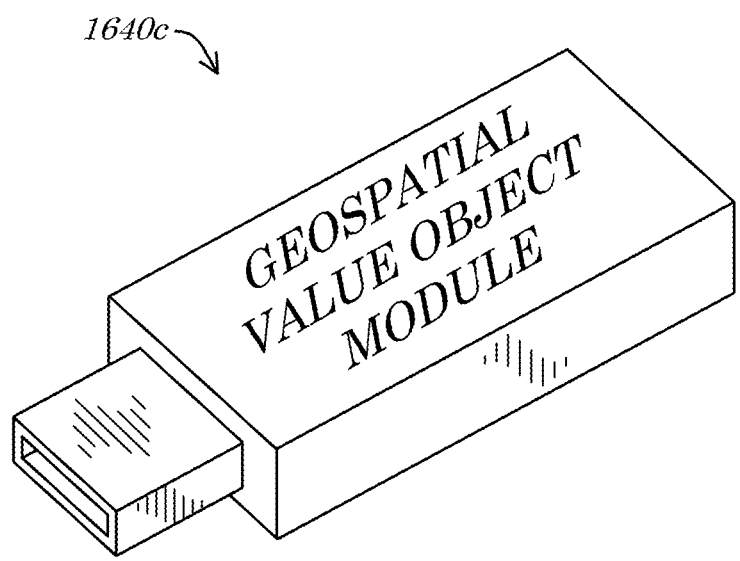
Figure 16D:
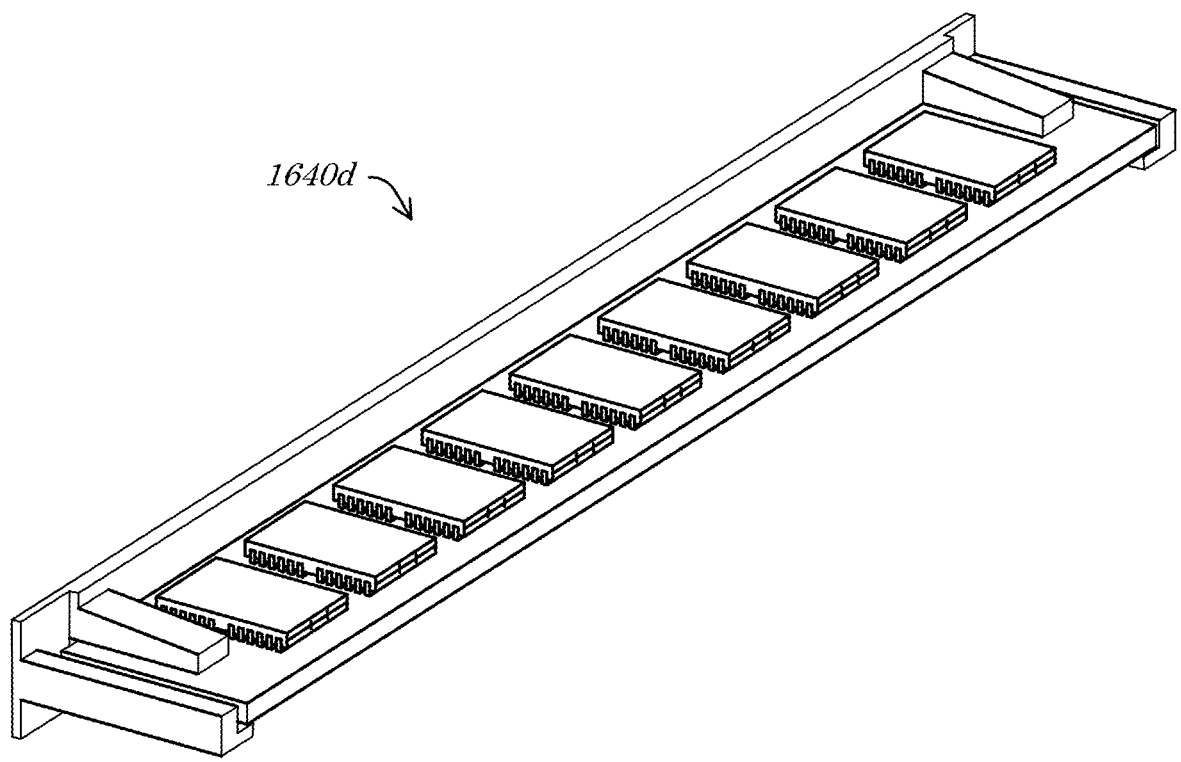
Figure 16E:
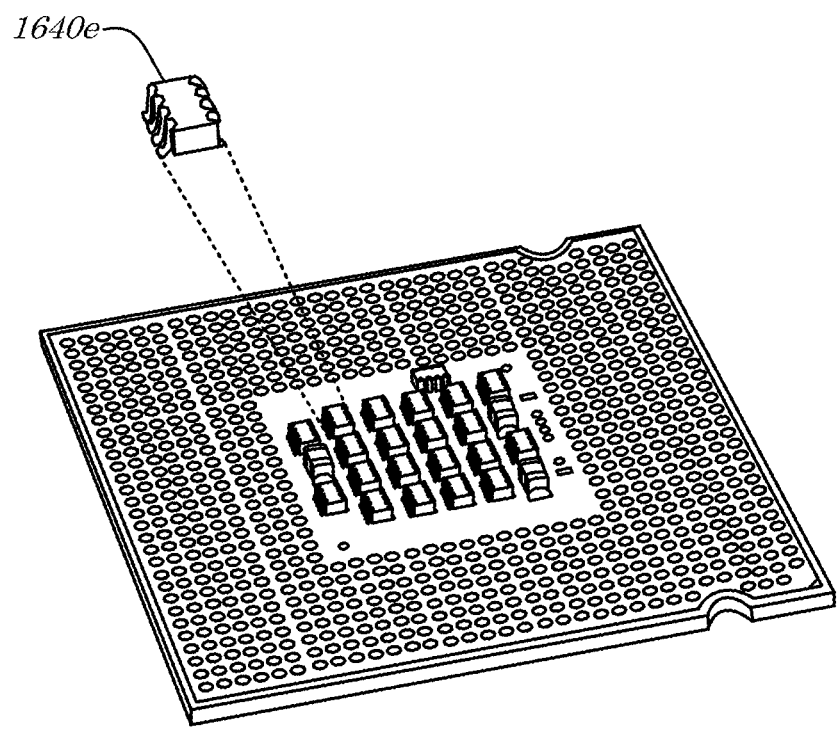

Turning to FIG. 15, a block diagram of an apparatus 1500 according to some embodiments is shown. In some embodiments, the apparatus 1500 may be similar in configuration and/or functionality to any of the location processing device 110 of FIG. 1 and/or may comprise a portion of the system 600 of FIG. 6 herein. The apparatus 1500 may, for example, execute, process, facilitate, and/or otherwise be associated with any of the methods 400, 700, 800, 1000, 1100, 1200, 1400 described in conjunction with FIG. 4, FIG. 7, FIG. 8, FIG. 10, FIG. 11, FIG. 12, and/or FIG. 14 herein. In some embodiments, the apparatus 1500 may comprise a processing device 1512, an input device 1514, an output device 1516, a communication device 1518, an interface 1520, a memory device 1540 (storing various programs and/or instructions 842 and data 844), and/or a cooling device 1550. According to some embodiments, any or all of the components 1512, 1514, 1516, 1518, 1520, 1540, 1542, 1544, 1550 of the apparatus 1500 may be similar in configuration and/or functionality to any similarly named and/or numbered components described herein. Fewer or more components 1512, 1514, 1516, 1518, 1520, 1540, 1542, 1544, 1550 and/or various configurations of the components 1512, 1514, 1516, 1518, 1520, 1540, 1542, 1544, 1550 may be included in the apparatus 1500 without deviating from the scope of embodiments described herein.

According to some embodiments, the processing device 1512 may be or include any type, quantity, and/or configuration of electronic and/or computerized processor that is or becomes known. The processing device 1512 may comprise, for example, an Intel® IXP 2800 network processor or an Intel® XEON™ Processor coupled with an Intel® E7501 chipset. In some embodiments, the processing device 1512 may comprise multiple inter-connected processors, microprocessors, and/or micro-engines. According to some embodiments, the processing device 1512 (and/or the apparatus 1500 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 1500 comprises a server such as a blade server, necessary power may be supplied via a standard AC outlet, power strip, surge protector, and/or Uninterruptible Power Supply (UPS) device.

In some embodiments, the input device 1514 and/or the output device 1516 are communicatively coupled to the processing device 1512 (e.g., via wired and/or wireless connections and/or pathways) and they may generally comprise any types or configurations of input and output components and/or devices that are or become known, respectively. The input device 1514 may comprise, for example, a keyboard that allows an operator of the apparatus 1500 to interface with the apparatus 1500 (e.g., by a consumer, such as to purchase value subject data and/or insurance policies priced utilizing certified location data and/or by an underwriter and/or insurance agent, such as to evaluate risk and/or calculate premiums for an insurance policy). In some embodiments, the input device 1514 may comprise a sensor configured to provide information such as encoded certified location information to the apparatus 1500 and/or the processing device 1512. The output device 1516 may, according to some embodiments, comprise a display screen and/or other practicable output component and/or device. The output device 1516 may, for example, provide insurance and/or investment pricing and/or risk analysis to a potential customer (e.g., via a website) and/or to an underwriter or sales agent attempting to structure an insurance (and/or investment) product (e.g., via a computer workstation), such as via the interface 1520. According to some embodiments, the input device 1514 and/or the output device 1516 may comprise and/or be embodied in a single device such as a touch-screen monitor.

In some embodiments, the communication device 1518 may comprise any type or configuration of communication device that is or becomes known or practicable. The communication device 1518 may, for example, comprise a Network Interface Card (NIC), a telephonic device, a cellular network device, a router, a hub, a modem, and/or a communications port or cable. In some embodiments, the communication device 1518 may be coupled to provide data to a customer device (not shown in FIG. 15), such as in the case that the apparatus 1500 is utilized as a certified location and/or value subject data portal. The communication device 1518 may, for example, comprise a cellular telephone network transmission device that sends signals indicative of certified locations and/or value subject data to customer and/or subscriber handheld, mobile, and/or telephone devices. According to some embodiments, the communication device 1518 may also or alternatively be coupled to the processing device 1512. In some embodiments, the communication device 1518 may comprise an IR, RF, Bluetooth™, NFC, and/or Wi-Fi® network device coupled to facilitate communications between the processing device 1512 and another device (such as a customer device and/or a third-party device).

The memory device 1540 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM). The memory device 1540 may, according to some embodiments, store one or more of certified location instructions 1542-1, risk assessment instructions 1542-2, premium determination instructions 1542-3, location data 1544-1, value subject data 1544-2, customer data 1544-3, and/or claim/loss data 1544-4. In some embodiments, the certified location instructions 1542-1, the risk assessment instructions 1542-2, and/or the premium determination instructions 1542-3 may be utilized by the processing device 1512 to provide output information via the output device 1516 (and/or interface 1520) and/or the communication device 1518 (e.g., the risk matrix 1300 of FIG. 13).

According to some embodiments, the certified location instructions 1542-1 may be operable to cause the processing device 1512 to process location data 1544-1, value subject data 1544-2, customer data 1544-3, and/or claim/loss data 1544-4 as described herein. Location data 1544-1, value subject data 1544-2, customer data 1544-3, and/or claim/loss data 1544-4 received via the input device 1514 and/or the communication device 1518 may, for example, be analyzed, sorted, filtered, decoded, decompressed, ranked, scored, plotted, and/or otherwise processed by the processing device 1512 in accordance with the certified location instructions 1542-1. In some embodiments, raw location data 1544-1 descriptive of various location-based attributes of an object and/or area and/or other location data 1544-1, value subject data 1544-2, customer data 1544-3, and/or claim/loss data 1544-4 may be fed by the processing device 1512 through one or more mathematical and/or statistical formulas and/or models in accordance with the certified location instructions 1542-1 to define one or more certified locations and/or associated data relationships that may then be utilized for various purposes as described herein (e.g., to define, identify, and/or analyze one or more value subjects).

According to some embodiments, the risk assessment instructions 1542-2 may be operable to cause the processing device 1512 to perform a risk assessment as described herein. Location data 1544-1 (e.g., certified location data and/or relationships) of an object and/or area and/or other location data 1544-1, value subject data 1544-2, customer data 1544-3, and/or claim/loss data 1544-4 may be analyzed to create loss distributions, for example, that may be utilized to generate a risk score for an object and/or area being insured (e.g., in accordance with the method 1100 of FIG. 11). The risk assessment instructions 1542-2 may, in some embodiments, utilize the location data 1544-1, value subject data 1544-2, customer data 1544-3, and/or claim/loss data 1544-4 to determine relationships between objects/areas for which insurance is sought and related objects/areas that are not the subject of an insurance product under evaluation (e.g., the location data 1544-1 may, in addition to storing information on objects such as buildings that are insured, store information relating such buildings to other buildings, roads, intersections, and/or other externality objects that may be related to the building). According to some embodiments, the risk assessment instructions 1542-2 may be utilized to accept user-defined point, line, and/or polygon data (e.g., via the interface 1520) identifying and/or defining one or more value subjects for which data and/or analysis are desired.

In some embodiments, the premium determination instructions 1542-3 may be executed by the processing device 1512 to calculate an insurance premium for an insurance product (e.g., based on the location data 1544-1, value subject data 1544-2, customer data 1544-3, and/or claim/loss data 1544-4). According to some embodiments, the risk assessment instructions 1542-2 and/or the premium determination instructions 1542-3 may utilize the location data 1544-1, value subject data 1544-2, customer data 1544-3, and/or claim/loss data 1544-4 (such as by implementing the location-based risk/loss control method 1400 of FIG. 14) to update and/or revise risk and/or premium determinations, respectively. The apparatus 1500 may function as a computer terminal and/or server of an insurance and/or underwriting company, for example, that is utilized to process insurance applications. In some embodiments, the apparatus 1500 may comprise a web server and/or other portal (e.g., an IVRU) that provides location data 1544-1, value subject data 1544-2, customer data 1544-3, and/or claim/loss data 1544-4 to consumers, data customers, and/or corporations.

Any or all of the exemplary instructions and data types described herein and other practicable types of data may be stored in any number, type, and/or configuration of memory devices that is or becomes known. The memory device 1540 may, for example, comprise one or more data tables or files, databases, table spaces, registers, and/or other storage structures. In some embodiments, multiple databases and/or storage structures (and/or multiple memory devices 1540) may be utilized to store information associated with the apparatus 1500. According to some embodiments, the memory device 1540 may be incorporated into and/or otherwise coupled to the apparatus 1500 (e.g., as shown) or may simply be accessible to the apparatus 1500 (e.g., externally located and/or situated).

In some embodiments, the apparatus 1500 may comprise a cooling device 1550. According to some embodiments, the cooling device 1550 may be coupled (physically, thermally, and/or electrically) to the processing device 1512 and/or to the memory device 1540. The cooling device 1550 may, for example, comprise a fan, heat sink, heat pipe, radiator, cold plate, and/or other cooling component or device or combinations thereof, configured to remove heat from portions or components of the apparatus 1500.

Referring now to FIG. 16A, FIG. 16B, FIG. 16C, FIG. 16D, and FIG. 16E, perspective diagrams of exemplary data storage devices 1640a-e according to some embodiments are shown. The data storage devices 1640a-e may, for example, be utilized to store instructions and/or data such as the certified location instructions 1542-1, risk assessment instructions 1542-2, premium determination instructions 1542-3, location data 1544-1, value subject data 1544-2, customer data 1544-3, and/or claim/loss data 1544-4, each of which is described in reference to FIG. 15 herein. In some embodiments, instructions stored on the data storage devices 1640a-e may, when executed by a processor (such as the electronic processor 1512 of FIG. 15), cause the implementation of and/or facilitate the methods 400, 700, 800, 1000, 1100, 1200, 1400 described in conjunction with FIG. 4, FIG. 7, FIG. 8, FIG. 10, FIG. 11, FIG. 12, and/or FIG. 14, as described herein, and/or portions or combinations thereof.

According to some embodiments, a first data storage device 1640a may comprise one or more various types of internal and/or external hard drives. The first data storage device 1640a may, for example, comprise a data storage medium 1646 that is read, interrogated, and/or otherwise communicatively coupled to and/or via a disk reading device 1648. In some embodiments, the first data storage device 1640a and/or the data storage medium 1646 may be configured to store information utilizing one or more magnetic, inductive, and/or optical means (e.g., magnetic, inductive, and/or optical-encoding). The data storage medium 1646, depicted as a first data storage medium 1646a for example (e.g., breakout cross-section "A"), may comprise one or more of a polymer layer 1646a-1, a magnetic data storage layer 1646a-2, a non-magnetic layer 1646a-3, a magnetic base layer 1646a-4, a contact layer 1646a-5, and/or a substrate layer 1646a-6. According to some embodiments, a magnetic read head 1646a may be coupled and/or disposed to read data from the magnetic data storage layer 1646a-2.

In some embodiments, the data storage medium 1646, depicted as a second data storage medium 1646b for example (e.g., breakout cross-section "B"), may comprise a plurality of data points 1646b-2 disposed with the second data storage medium 1646b. The data points 1646b-2 may, in some embodiments, be read and/or otherwise interfaced with via a laser-enabled read head 1648b disposed and/or coupled to direct a laser beam through the second data storage medium 1646b.

According to some embodiments, a second data storage device 1640b may comprise a CD, CD-ROM, DVD, Blu-Ray™ Disc, and/or other type of optically-encoded disk and/or other computer-readable storage medium that is or becomes know or practicable. In some embodiments, a third data storage device 1640c may comprise a USB keyfob, dongle, and/or other type of flash memory data storage device that is or becomes know or practicable. According to some embodiments, a fourth data storage device 1640d may comprise RAM of any type, quantity, and/or configuration that is or becomes practicable and/or desirable. In some embodiments, the fourth data storage device 1640d may comprise an off-chip cache such as a Level 2 (L2) or Level 3 (L3) cache memory device. According to some embodiments, a fifth data storage device 1640e may comprise an on-chip memory device such as a Level 1 (L1) cache memory device.

The data storage devices 1640a-e may generally store program instructions, code, and/or modules that, when executed by an electronic and/or computerized processing device cause a particular machine to function in accordance with embodiments described herein. In some embodiments, the data storage devices 1640a-e depicted in FIG. 16A, FIG. 16B, FIG. 16C, FIG. 16D, and FIG. 16E are representative of a class and/or subset of computer-readable media that are defined herein as "computer-readable memory" (e.g., memory devices as opposed to transmission devices). While computer-readable media may include transitory media types, as utilized herein, the term computer-readable memory is limited to non-transitory computer-readable media.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A non-transitory memory device storing instructions that when executed by a processing device result in:
   receiving, via a graphical user interface comprising a graphical depiction of a geographical area, an indication of a user-defined location on the graphical depiction of the geographical area, wherein the indication of the user-defined location comprises a user-defined polygon received as drawing input via the graphical user interface;
   querying, utilizing the user-defined polygon, a database storing value subject data and location data related to the value subject data, the value subject data and location data related to the value subject data being descriptive of a plurality of locations;
   identifying, based on the querying of the database, a subset of the locations of the plurality of locations that are bounded by the user-defined polygon of the user-defined location, wherein the subset comprises more than one location;
   selecting, based on the identifying of the subset of the locations of the plurality of locations that are bounded by the user-defined polygon of the user-defined location, value subject data descriptive of an attribute value for each of the locations of the subset of the locations of the plurality of locations that are bounded by the user-defined polygon of the user-defined location;

summing the selected data attribute values for the subset of the locations of the plurality of locations that are bounded by the user-defined polygon of the user-defined location; and providing, via the graphical user interface, an indication of the summation of the selected attribute values for the subset of the locations of the plurality of locations that are bounded by the user-defined polygon of the user-defined location.

2. The non-transitory memory device of claim 1, wherein the identifying of the subset of the locations of the plurality of locations that are bounded by the user-defined polygon of the user-defined location, comprises:

identifying, based on the user-defined polygon indicative of the user-defined location, a plurality of coordinates descriptive of the user-defined location;

identifying, based on the querying of the database, and utilizing the plurality of coordinates, a plurality of possible value subjects; and selecting, from the plurality of possible value subjects and based on a stored association with at least one of the coordinates from the plurality of coordinates, the value subject from the plurality of possible value subjects.

3. The non-transitory memory device of claim 1, wherein the indication of the user-defined location comprises the user-defined polygon, and wherein the querying comprises:

identifying a plurality of points defining the user-defined polygon indicative of the user-defined location;

converting data descriptive of the plurality of points into a coordinate point format; and querying, utilizing the coordinate point formatted data descriptive of the plurality of points, the database.

4. The non-transitory memory device of claim 1, wherein the data attribute values comprise values for a data attribute comprising total realized loss.

5. The non-transitory memory device of claim 1, wherein the data attribute values comprise values for a data attribute comprising total risk.

6. The non-transitory memory device of claim 1, wherein the data attribute values comprise values for a data attribute comprising total exposure.

7. The non-transitory memory device of claim 1, wherein the instructions, when executed by the processing device, further result in:

providing the graphical user interface.

8. The non-transitory memory device of claim 1, wherein the instructions, when executed by the processing device, further result in:

receiving a fee in exchange for the providing of the indication of the summation of the selected attribute values for the subset of the locations of the plurality of locations that are bounded by the user-defined polygon of the user-defined location.

9. A method for obtaining a summation of attribute values for a plurality of locations that are bounded by a user-defined polygon, comprising:

receiving, via a graphical user interface comprising a graphical depiction of a geographical area, an indication of a user-defined location on the graphical depiction of the geographical area, wherein the indication of the user-defined location comprises a user-defined polygon received as drawing input via the graphical user interface;

querying, utilizing the user-defined polygon, a database storing value subject data and location data related to the value subject data, the value subject data and location data related to the value subject data being descriptive of a plurality of locations;

identifying, based on the querying of the database, a subset of the locations of the plurality of locations that are bounded by the user-defined polygon of the user-defined location, wherein the subset comprises more than one location;

selecting, based on the identifying of the subset of the locations of the plurality of locations that are bounded by the user-defined polygon of the user-defined location, value subject data descriptive of an attribute value for each of the locations of the subset of the locations of the plurality of locations that are bounded by the user-defined polygon of the user-defined location;

summing the selected data attribute values for the subset of the locations of the plurality of locations that are bounded by the user-defined polygon of the user-defined location; and providing, via the graphical user interface, an indication of the summation of the selected attribute values for the subset of the locations of the plurality of locations that are bounded by the user-defined polygon of the user-defined location.

10. The method of claim 9, wherein the identifying of the subset of the locations of the plurality of locations that are bounded by the user-defined polygon of the user-defined location, comprises:

identifying, based on the user-defined polygon indicative of the user-defined location, a plurality of coordinates descriptive of the user-defined location;

identifying, based on the querying of the database, and utilizing the plurality of coordinates, a plurality of possible value subjects; and selecting, from the plurality of possible value subjects and based on a stored association with at least one of the coordinates from the plurality of coordinates, the value subject from the plurality of possible value subjects.

11. The method of claim 9, wherein the indication of the user-defined location comprises the user-defined polygon, and wherein the querying comprises:

identifying a plurality of points defining the user-defined polygon indicative of the user-defined location;

converting data descriptive of the plurality of points into a coordinate point format; and querying, utilizing the coordinate point formatted data descriptive of the plurality of points, the database.

12. The method of claim 9, wherein the data attribute values comprise values for a data attribute comprising total realized loss.

13. The method of claim 9, wherein the data attribute values comprise values for a data attribute comprising total risk.

14. The method of claim 9, wherein the data attribute values comprise values for a data attribute comprising total exposure.

15. The method of claim 9, further comprising:

providing the graphical user interface.

16. The method of claim 9, further comprising:

receiving a fee in exchange for the providing of the indication of the summation of the selected attribute values for the subset of the locations of the plurality of locations that are bounded by the user-defined polygon of the user-defined location.

* * * * *